United States Patent
Ahn et al.

(10) Patent No.: US 12,271,570 B2
(45) Date of Patent: Apr. 8, 2025

(54) WEARABLE DEVICE GROUPING AND PROVIDING A PLURALITY OF APPLICATION EXECUTION SCREENS AND METHOD FOR CONTROLLING THE SAME

(71) Applicant: Samsung Electronics Co., Ltd., Suwon-si (KR)

(72) Inventors: Stephanie Ahn, Suwon-si (KR); Sanga Yoo, Suwon-si (KR); Eunbin Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/152,445

(22) Filed: Jan. 10, 2023

(65) Prior Publication Data

US 2023/0221832 A1     Jul. 13, 2023

Related U.S. Application Data

(63) Continuation of application No. PCT/KR2023/000459, filed on Jan. 10, 2023.

(30) Foreign Application Priority Data

Jan. 10, 2022   (KR) .................. 10-2022-0003409
Jan. 28, 2022   (KR) .................. 10-2022-0013664

(51) Int. Cl.
*G06F 3/04815*    (2022.01)
*G06F 3/01*    (2006.01)

(52) U.S. Cl.
CPC .......... *G06F 3/04815* (2013.01); *G06F 3/013* (2013.01)

(58) Field of Classification Search
CPC ...... G06F 3/04815; G06F 3/013; G06F 3/011; G06F 3/0483; G06F 3/04842; G06F 3/04883

(Continued)

(56) References Cited

U.S. PATENT DOCUMENTS 10,176,783 B2   1/2019 Travers et al.
10,955,987 B2   3/2021 Alexander
(Continued)

FOREIGN PATENT DOCUMENTS

JP          6209906 B2    10/2017
KR     10-0783552 B1    12/2007
(Continued)

OTHER PUBLICATIONS

Search report dated Apr. 7, 2023, issued in an International Patent Application No. PCT/KR2023/000459.
(Continued)

*Primary Examiner* — Stephen S Hong
*Assistant Examiner* — Broderick C Anderson
(74) *Attorney, Agent, or Firm* — Jefferson IP Law, LLP

(57) ABSTRACT

A wearable device grouping and providing a plurality of application execution screens and a method for controlling the same are provided. The wearable device includes a display module and at least one processor configured to control the display module to allow an execution screen of a first application to be shown as a virtual object according to a first type, detect a first user input for executing a second application, after detecting the first user input, determine whether a second user input for requesting to allow an execution screen of the second application to be included and shown in a same group as the execution screen of the first application is detected, and allow the execution screen of the second application to be shown independently from or while forming one group with the execution screen of the first application, based on a result of the determination.

16 Claims, 56 Drawing Sheets

(58) Field of Classification Search
USPC .......................................................... 715/757
See application file for complete search history.

(56) References Cited

U.S. PATENT DOCUMENTS

| | | | |
|---|---|---|---|
| 2008/0089587 A1 | 4/2008 | Kim et al. | |
| 2012/0096395 A1* | 4/2012 | Ording | G06F 9/451 |
| | | | 715/790 |
| 2012/0272179 A1* | 10/2012 | Stafford | G06F 3/0482 |
| | | | 345/157 |
| 2014/0002352 A1* | 1/2014 | Jacob | G09G 5/00 |
| | | | 345/156 |
| 2015/0058791 A1 | 2/2015 | Robertson et al. | |
| 2015/0061974 A1* | 3/2015 | Kobayashi | G06F 3/011 |
| | | | 345/8 |
| 2015/0277699 A1* | 10/2015 | Algreatly | G06F 3/0304 |
| | | | 715/850 |
| 2015/0340010 A1* | 11/2015 | Travers | G02B 27/017 |
| | | | 345/520 |
| 2016/0034114 A1 | 2/2016 | Lee et al. | |
| 2016/0124595 A1* | 5/2016 | Kim | G06F 3/04842 |
| | | | 715/769 |
| 2018/0095633 A1* | 4/2018 | Alexander | G06F 3/04815 |
| 2018/0132088 A1 | 5/2018 | Lee | |
| 2018/0350119 A1 | 12/2018 | Kocharlakota et al. | |
| 2019/0324603 A1 | 10/2019 | Shin et al. | |
| 2020/0371646 A1 | 11/2020 | Kocharlakota et al. | |
| 2021/0263624 A1 | 8/2021 | Zurmoehle et al. | |

FOREIGN PATENT DOCUMENTS

| | | |
|---|---|---|
| KR | 10-2014-0073396 A | 6/2014 |
| KR | 10-2015-0016464 A | 2/2015 |
| KR | 10-2016-0016505 A | 2/2016 |
| KR | 10-2016-0133185 A | 11/2016 |
| KR | 10-2266198 B1 | 6/2021 |

OTHER PUBLICATIONS

Extended European Search report dated Jan. 3, 2025, issued in European Application No. 23737492.1-1218.

* cited by examiner

WEARABLE DEVICE GROUPING AND PROVIDING A PLURALITY OF APPLICATION EXECUTION SCREENS AND METHOD FOR CONTROLLING THE SAME

CROSS-REFERENCE TO RELATED APPLICATION(S)

This application is a continuation application, claiming priority under § 365(c), of an International application No. PCT/KR2023/000459, filed on Jan. 10, 2023, which is based on and claims the benefit of a Korean patent application number 10-2022-0003409, filed on Jan. 10, 2022, in the Korean Intellectual Property Office, and of a Korean patent application number 10-2022-0013664, filed on Jan. 28, 2022, in the Korean Intellectual Property Office, the disclosure of each of which is incorporated by reference herein in its entirety.

TECHNICAL FIELD

The disclosure relates to a wearable device grouping and providing a plurality of application execution screens and a method for controlling the same.

BACKGROUND ART

More and more services and additional functions are being provided via wearable devices, e.g., portable electronic devices, such as augmented reality (AR) glasses. To meet the needs of various users and raise use efficiency of electronic devices, communication service carriers or device manufacturers are jumping into competitions to develop electronic devices with differentiated and diversified functionalities. Accordingly, various functions that are provided through wearable devices are evolving more and more.

The above information is presented as background information only to assist with an understanding of the disclosure. No determination has been made, and no assertion is made, as to whether any of the above might be applicable as prior art with regard to the disclosure.

DISCLOSURE

Technical Problem

In an AR environment, various application execution screens may be provided as virtual objects. However, conventional wearable devices (e.g., AR glasses) providing various application execution screens in an AR environment individually (e.g., independently) provide a plurality of application execution screens, causing inconvenience to the users of the wearable devices (e.g., AR glasses) in controlling the plurality of application execution screens. For example, when the user desires to change the positions, in which some of a plurality of application execution screens are shown, to a specific position simultaneously, the conventional wearable device individually designates each of the execution screens and move them to a specific position, causing inconvenience. Further, the conventional wearable device (e.g., AR glasses) individually (e.g., independently) provides a plurality of application execution screens, causing the user to feel the plurality of virtual objects visually unorganized.

Aspects of the disclosure are to address at least the above-mentioned problems and/or disadvantages and to provide at least the advantages described below. Accordingly, an aspect of the disclosure is to provide a wearable device capable of grouping and providing a plurality of application execution screens provided as virtual objects and integratedly controlling the grouped application execution screens, thereby providing convenience to the user in controlling the plurality of application execution screens.

Another aspect of the disclosure is to provide a wearable device capable of grouping and providing a plurality of application execution screens provided as virtual objects and integratedly controlling the grouped application execution screens, allowing the user to feel the virtual objects visually organized.

Another aspect of the disclosure is to provide a method for controlling a wearable device capable of grouping and providing a plurality of application execution screens provided as virtual objects and integratedly controlling the grouped application execution screens, thereby providing convenience to the user in controlling the plurality of application execution screens.

Another aspect of the disclosure is to provide a method for controlling a wearable device capable of grouping and providing a plurality of application execution screens provided as virtual objects and integratedly controlling the grouped application execution screens, allowing the user to feel the virtual objects visually organized.

Additional aspects will be set forth in part in the description which follows and, in part, will be apparent from the description, or may be learned by practice of the presented embodiments.

Technical Solution

In accordance with an aspect of the disclosure, a wearable device is provided. The wearable device includes a display module and at least one processor configured to control the display module to allow an execution screen of a first application to be shown as a virtual object, the execution screen of the first application being shown according to a first type, detect a first user input for executing a second application in a state in which the execution screen of the first application is shown as the virtual object, after detecting the first user input, determine whether a second user input for requesting to allow an execution screen of the second application to be included and shown in a same group as the execution screen of the first application is detected, and control the display module to allow the execution screen of the second application to be shown independently from the execution screen of the first application or while forming one group with the execution screen of the first application, based on a result of the determination.

In accordance with another aspect of the disclosure, a method for controlling a wearable device is provided. The method includes controlling a display module of the wearable device to allow an execution screen of a first application to be shown as a virtual object, the execution screen of the first application being shown according to a first type, detecting a first user input for executing a second application in a state in which the execution screen of the first application is shown as the virtual object, after detecting the first user input, determining whether a second user input for requesting to allow an execution screen of the second application to be included and shown in a same group as the execution screen of the first application is detected, and controlling the display module to allow the execution screen of the second application to be shown independently from the execution screen of the first application or while forming one group with the execution screen of the first application, based on a result of the determination.

Advantageous Effects

According to various embodiments of the disclosure, there may be provided a wearable device capable of grouping and providing a plurality of application execution screens provided as virtual objects and integratedly controlling the grouped application execution screens, thereby providing convenience to the user in controlling the plurality of application execution screens.

According to various embodiments of the disclosure, there may be provided a wearable device capable of grouping and providing a plurality of application execution screens provided as virtual objects and integratedly controlling the grouped application execution screens, allowing the user to feel the virtual objects visually organized.

The effects set forth herein are not limited thereto, and it is apparent to one of ordinary skill in the art that various effects may be disclosed herein.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
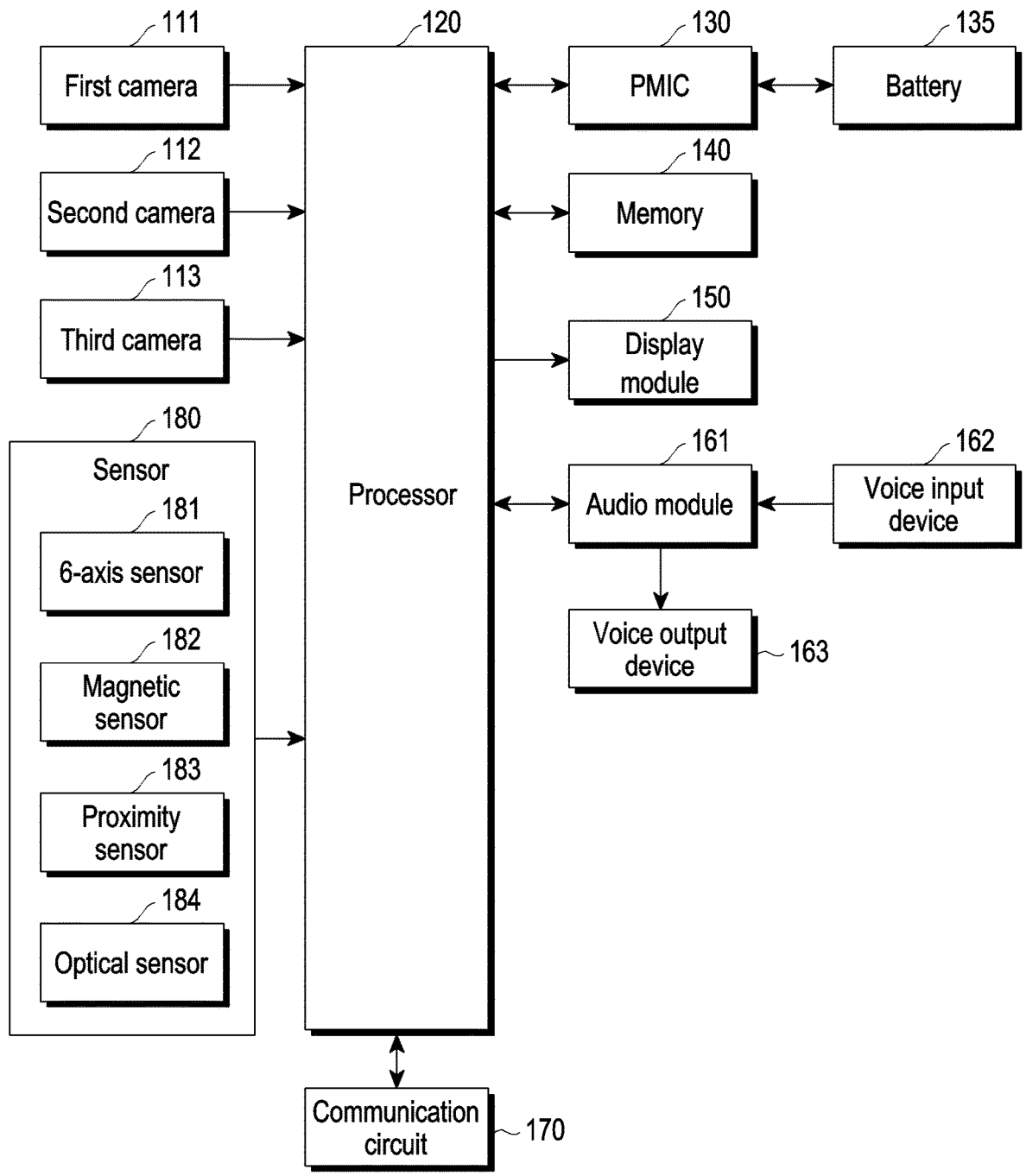
FIG. 1 illustrates a wearable device according to an embodiment of the disclosure.

FIG. 1 illustrates a wearable device according to an embodiment of the disclosure.

Referring to FIG. 1, according to an embodiment of the disclosure, a wearable device 100 may include at least one of a first camera 111, a second camera 112, a third camera 113, a processor 120, a power management integrated circuit (PMIC) 130, a battery 135, a memory 140, a display module 150, an audio module 161, a voice input device 162, a voice output device 163, a communication circuit 170, and a sensor 180. Although the wearable device 100 is described herein as an example, the disclosure is not limited thereto. For example, various embodiments of the disclosure may be applied to at least one of an accessory-type device (e.g., a watch, a ring, a bracelet, an anklet, a necklace, glasses, contact lenses, or a head-mounted device (HMD) or head-mounted display (HMD)), a fabric- or clothes-integrated device (e.g., electronic clothes), a body attaching-type device (e.g., a skin pad or tattoo), or a body implantable device.

According to an embodiment of the disclosure, an image obtained through the first camera 111 may be used for detection of the user's hand gesture, tracking the user's head, and/or spatial recognition. According to an embodiment of the disclosure, the first camera 111 may include a global shutter (GS) camera. According to an embodiment of the disclosure, the first camera 111 may perform a simultaneous localization and mapping (SLAM) operation through depth capture. According to an embodiment of the disclosure, the first camera 111 may perform spatial recognition for 6DoF. According to an embodiment of the disclosure, the first camera 111 may be configured to capture the real world corresponding to the first user's gaze when worn by the first user.

According to an embodiment of the disclosure, the image obtained through the second camera 112 may be used to detect and track the user's eye. According to an embodiment of the disclosure, the second camera 112 may include a GS camera. According to an embodiment of the disclosure, second cameras 112 may correspond to the left and right eye, respectively, and may have the same or similar performances. According to an embodiment of the disclosure, the second camera 112 may be configured to obtain an image for the user's facial expression. According to an embodiment of the disclosure, the at least one processor 120 may be configured to detect a change in the user's facial expression based on the image for the user's facial expression obtained by the second camera 112.

According to an embodiment of the disclosure, the third camera 113 may include a camera with a higher resolution than the first camera 111 and the second camera 112. According to an embodiment of the disclosure, the third camera 113 may perform auto-focusing (AF) and anti-shake functions. According to an embodiment of the disclosure, the third camera 113 may include a GS camera or a rolling shutter (RS) camera. According to an embodiment of the disclosure, the first camera 111 may be configured to capture the real world corresponding to the first user's gaze when worn by the first user.

According to an embodiment of the disclosure, the processor 120 may control the other components of the wearable device 100, e.g., the first camera 111, the second camera 112, the third camera 113, the PMIC 130, the memory 140, the display module 150, the audio module 161, the communication circuit 170, and the sensor 180 and may perform various data processing or computations. According to an embodiment of the disclosure, the processor 120 may execute, for example, software (e.g., a program) to control at least one other component (e.g., a hardware or software component) of the wearable device 100 coupled with the processor 120, and may perform various data processing or computation. According to one embodiment of the disclosure, as at least part of the data processing or computation, the processor 120 may store a command or data received from another component (e.g., the sensor module 176 or communication module 170 or a sensor module 190) onto a volatile memory, process the command or the data stored in the volatile memory, and store resulting data in a non-volatile memory. According to an embodiment of the disclosure, the processor 120 may include a main processor (e.g., a central processing unit (CPU) or an application processor (AP)), or an auxiliary processor (e.g., a graphics processing unit (GPU), a neural processing unit (NPU), an image signal processor (ISP), a sensor hub processor, or a communication processor (CP)) that is operable independently from, or in conjunction with, the main processor 121. For example, when the wearable device 100 includes the main processor and the auxiliary processor, the auxiliary processor may be configured to use lower power than the main processor or to be specified for a designated function. The auxiliary processor may be implemented as separate from, or as part of the main processor.

According to an embodiment of the disclosure, the PMIC 130 may convert the power stored in the battery 135 to have the current or voltage required by the other components of the wearable device 100 and supply it to the other components of the wearable device 100.

According to an embodiment of the disclosure, the memory 140 may store various data used by at least one component (e.g., the processor 120 or the sensor module 180) of the wearable device 100. According to an embodiment of the disclosure, the memory 140 may include a volatile or non-volatile memory.

According to an embodiment of the disclosure, the display module 150 may display a screen to be provided to the user. According to an embodiment of the disclosure, the display module 150 may output data (e.g., red-green-blue (RGB) data) for representing a virtual object (e.g., augmented reality guide). According to an embodiment of the disclosure, the display module 150 may include a first display 251, a second display 252, one or more input optical members 253-1 and 253-2, one or more transparent members 290-1 and 290-2, and one or more screen display portions 254-1 and 254-2.

According to an embodiment of the disclosure, the audio module 161 may be connected to the voice input device 162 and the voice output device 163 and may convert the data input through the voice input device 162 and may convert data to be output to the audio output device 163. According to an embodiment of the disclosure, the voice input device 162 may include at least one microphone, and that the voice output device 163 may include at least one speaker and an amplifier. According to an embodiment of the disclosure, the communication circuit 170 may support establishment of a wireless communication channel with an external electronic device connected with the wearable device 100 and performing communication through the established communication channel. According to an embodiment of the disclosure, the sensor 180 may include a 6-axis sensor 181, a magnetic sensor 182, a proximity sensor 183, and/or an optical sensor 184.

Figure 2A:
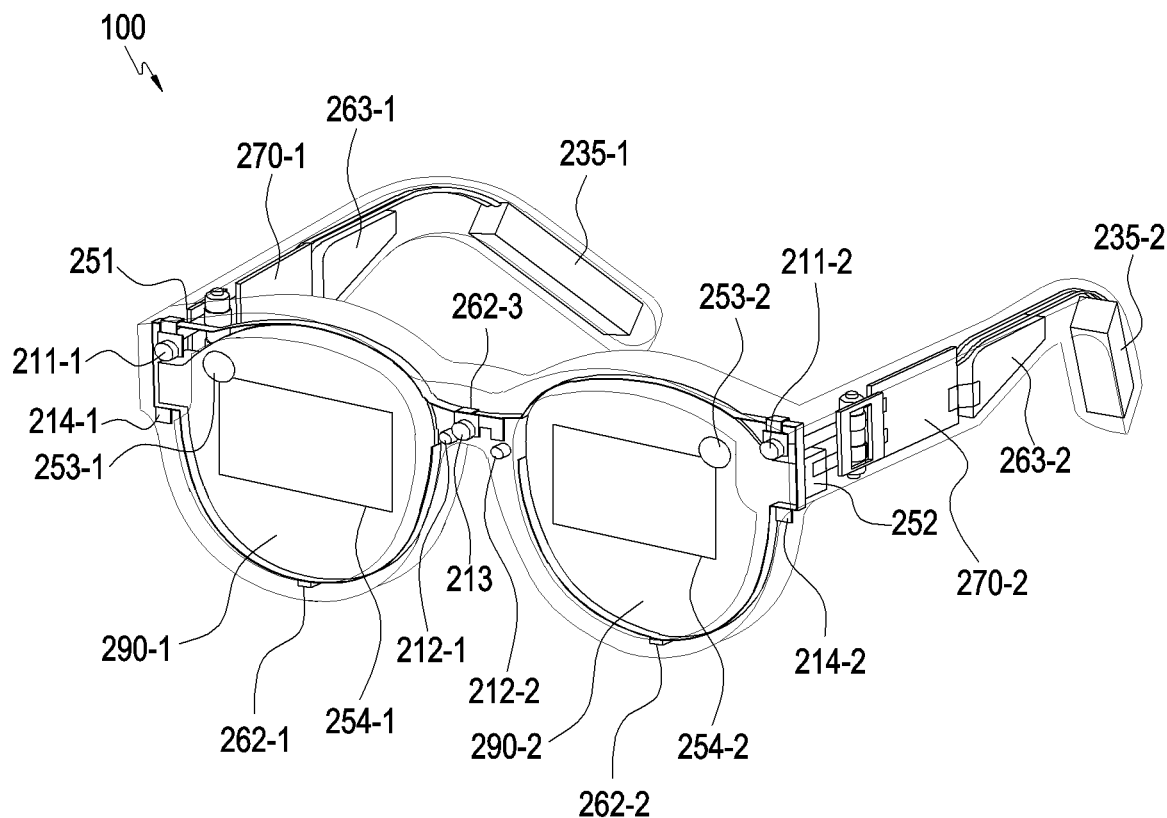
FIG. 2A illustrates a structure of a wearable device according to an embodiment of the disclosure.

FIG. 2A illustrates a structure of a wearable device according to an embodiment of the disclosure.

Referring to FIG. 2A, the wearable device 100 may include one or more light emitting devices 214-1 and 214-2. According to an embodiment of the disclosure, the light emitting elements 214-1 and 214-2 may be different from a light source, which is described below, for irradiating light to a screen output area of the display. According to an embodiment of the disclosure, the light emitting elements 214-1 and 214-2 may radiate light for facilitating eye detection in detecting and tracking the user's eye through one or more second cameras 212-1 and 212-2. According to an embodiment of the disclosure, each of the light emitting devices 214-1 and 214-2 may include a light emitting diode (LED). According to an embodiment of the disclosure, the light emitting devices 214-1 and 214-2 may irradiate light in an infrared band. According to an embodiment of the disclosure, the light emitting devices 214-1 and 214-2 may be attached around the frame of the wearable device 100. According to an embodiment of the disclosure, the light emitting devices 214-1 and 214-2 may be positioned around one or more first cameras 211-1 and 211-2 and, when the wearable device 100 is used in a dark environment, assist gesture detection, head tracking, and space recognition by one or more first cameras 211-1 and 211-2. According to an embodiment of the disclosure, the light emitting devices 214-1 and 214-2 may be positioned around the one or more third cameras 213 and may assist obtaining images by the one or more third cameras 213 when the wearable device 100 is used in a dark environment.

According to an embodiment of the disclosure, the wearable device 100 may include batteries 235-1 and 235-2. The batteries 235-1 and 235-2 may store power for operating the remaining components of the wearable device 100.

According to an embodiment of the disclosure, the wearable device 100 may include a first display 251, a second display 252, one or more input optical members 253-1 and 253-2, one or more transparent members 290-1 and 290-2, and one or more screen display portions 254-1 and 254-2. According to an embodiment of the disclosure, the first display 251 and the second display 252 may include, e.g., a liquid crystal display (LCD), a digital mirror device (DMD), a liquid crystal on silicon (LCoS), or an organic light emitting diode (OLED), or a micro light emitting diode (micro LED). According to an embodiment of the disclosure, when the first display 251 and the second display 252 are formed of one of a liquid crystal display device, a digital mirror display device, or a silicon liquid crystal display device, the wearable device 100 may include a light source for irradiating light to a screen output area of the display. According to an embodiment of the disclosure, when the first display 251 and the second display 252 may generate light on their own, e.g., when formed of either organic light emitting diodes or micro LEDs, the wearable device 100 may provide a virtual image of relatively good quality to the user even when a separate light source is not included.

According to an embodiment of the disclosure, the one or more transparent members 290-1 and 290-2 may be disposed to face the user's eyes when the user wears the wearable device 100. According to an embodiment of the disclosure, the one or more transparent members 290-1 and 290-2 may include at least one of a glass plate, a plastic plate, and a polymer. According to an embodiment of the disclosure, the user may view the outside world through the one or more transparent members 290-1 and 290-2 when the user wears the wearable device 100. According to an embodiment of the disclosure, the one or more input optical members 253-1 and 253-2 may guide the light generated by the first display 251 and the second display 252 to the user's eyes. According to an embodiment of the disclosure, images may be formed on one or more screen display portions 254-1 and 254-2 on one or more transparent members 290-1 and 290-2, based on the light generated from the first display 251 and the second display 252, and the user may see the images formed on the one or more screen display portions 254-1 and 254-2.

According to an embodiment of the disclosure, the wearable device 100 may include one or more optical waveguides (not shown). According to an embodiment of the disclosure, the optical waveguides may transfer the light generated by the first display 251 and the second display 252 to the user's eyes. The wearable device 100 may include one optical waveguide corresponding to each of the left eye and the right eye. According to an embodiment of the disclosure, the optical waveguide may include at least one of glass, plastic, or polymer. According to an embodiment of the disclosure, the optical waveguide may include a nano-pattern formed inside or on one outer surface, e.g., a polygonal or curved grating structure. According to an embodiment of the disclosure, the optical waveguide may include a free-form type prism, and in this case, the optical waveguide may provide incident light to the user through a reflective mirror. According to an embodiment of the disclosure, the optical waveguide may include at least one of at least one diffractive element (e.g., a diffractive optical element (DOE) or a holographic optical element (HOE)) or a reflective element (e.g., a reflective mirror) and guide the display light emitted from the light source to the user's eyes using at least one diffractive element or reflective element included in the optical waveguide. According to an embodiment of the disclosure, the diffractive element may include input/output optical elements. According to an embodiment of the disclosure, the reflective element may include a member causing total reflection.

According to an embodiment of the disclosure, the wearable device 100 may include one or more voice input devices 262-1, 262-2, and 262-3 and one or more voice output devices 263-1 and 263-2.

According to an embodiment of the disclosure, the wearable device 100 may include a first printed circuit board (PCB) 270-1 and a second PCB 270-2. The first PCB 270-1 and the second PCB 270-2 may be configured to transfer electrical signals to components included in the wearable device 100, such as a first camera 111, a second camera 112, a third camera 113, a display module 150, an audio module 161, and a sensor 180. According to an embodiment of the disclosure, the first PCB 270-1 and the second PCB 270-2 may include a flexible printed circuit board (FPCB). According to an embodiment of the disclosure, the first PCB 270-1 and the second PCB 270-2 each may include a first substrate, a second substrate, and an interposer disposed between the first substrate and the second substrate.

Figure 2B:
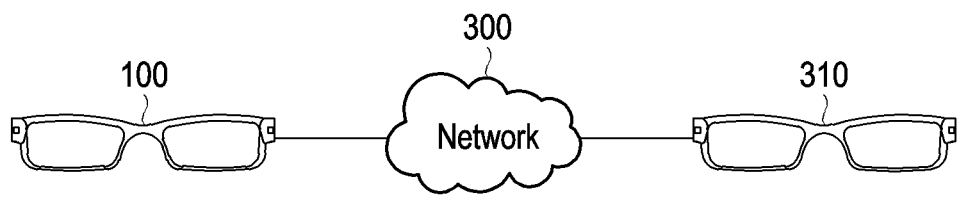
FIGS. 2B and 2C illustrate a connection relationship of a wearable device according to various embodiments of the disclosure.
Figure 2C:
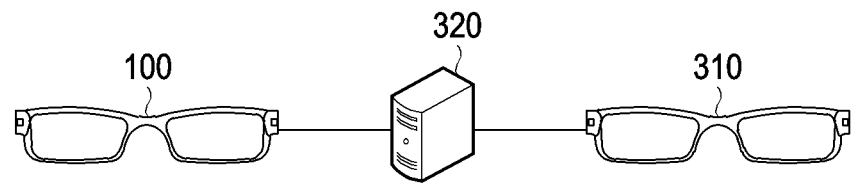

FIGS. 2B and 2C illustrate a connection relationship of a wearable device according to various embodiments of the disclosure.

Referring to FIG. 2B, according to an embodiment of the disclosure, the wearable device 100 of the first user may directly be connected with an external electronic device (e.g., smart glasses 310, an external electronic device 800, and a second external electronic device 2420) through the network 300. According to an embodiment of the disclosure, the network may include a first network (e.g., a short-range communication network, such as Bluetooth™, wireless-fidelity (Wi-Fi) direct, or infrared data association (IrDA)) or a second network (e.g., a long-range communication network, such as a legacy cellular network, a fifth generation (5G) network, a next-generation communication network, the Internet, or a computer network (e.g., local area network (LAN) or wide area network (WAN)). Alternatively, as shown in FIG. 2C, according to an embodiment of the disclosure, the wearable device 100 of the first user may be connected with the external electronic device (e.g., smart glasses 310, external electronic device 800, and second external device 2420) through a server 320. According to an embodiment of the disclosure, the server may include an intelligent server using machine learning and/or a neural network. Although the smart glasses 300 and the smart phone 310 are illustrated as examples of the external electronic device in FIGS. 2B and 2C, the type of the external electronic device is not limited thereto.

Figure 3:
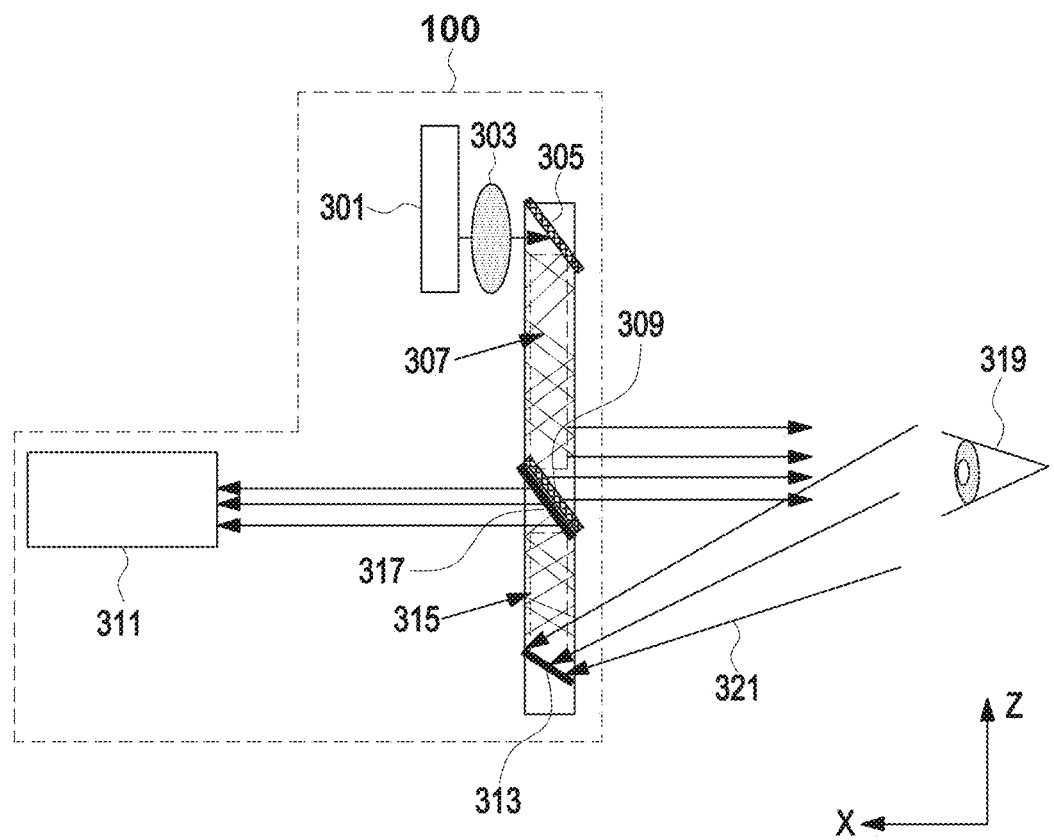
FIG. 3 illustrates an eye tracking camera structure of a wearable device according to an embodiment of the disclosure.

FIG. 3 illustrates an eye tracking camera structure of a wearable device according to an embodiment of the disclosure.

Referring to FIG. 3, the wearable device 100 may include at least one of an eye tracking (ET) camera 311 (e.g., second cameras 212-1 and 212-2), a display 301, an input optical member 305, a first waveguide 307, an output optical member 309, a first splitter 313, a second waveguide 315, and a second splitter 317.

According to an embodiment of the disclosure, the user's pupil 319 may be captured by the ET camera 311 through the first splitter 313 (e.g., a splitter for eye tracking), the second waveguide 315, and the second splitter 317. According to an embodiment of the disclosure, the ET camera 311 may detect the pupil 319 in the captured image and track the user's gaze 321 by identifying the movement of the detected pupil 319.

According to an embodiment of the disclosure, the image 303 output through the display 301 may be reflected through the input optical member 305 and the first waveguide 307 and may be displayed through the output optical member 309. According to an embodiment of the disclosure, the wearable device 100 may output the image through the display 301 while simultaneously identifying the movement of the user's pupil 319, tracking (e.g., identifying) the user's gaze (e.g., the direction of the user's gaze).

The wearable device 100 according to an embodiment herein may identify, through for example a proximity sensor included in the wearable device 100, whether the user is wearing the glasses-type wearable device 100. Alternatively, the wearable device 100 according to an embodiment herein may identify, through an angle sensor provided at a hinge part of the wearable device 100, whether a frame of the wearable device 100 is unfolded (e.g., an unfolded state), and when the approach of the user is detected while the frame of the wearable device 100 is unfolded, may determine that the wearable device 100 is worn by the user.

Figure 4:
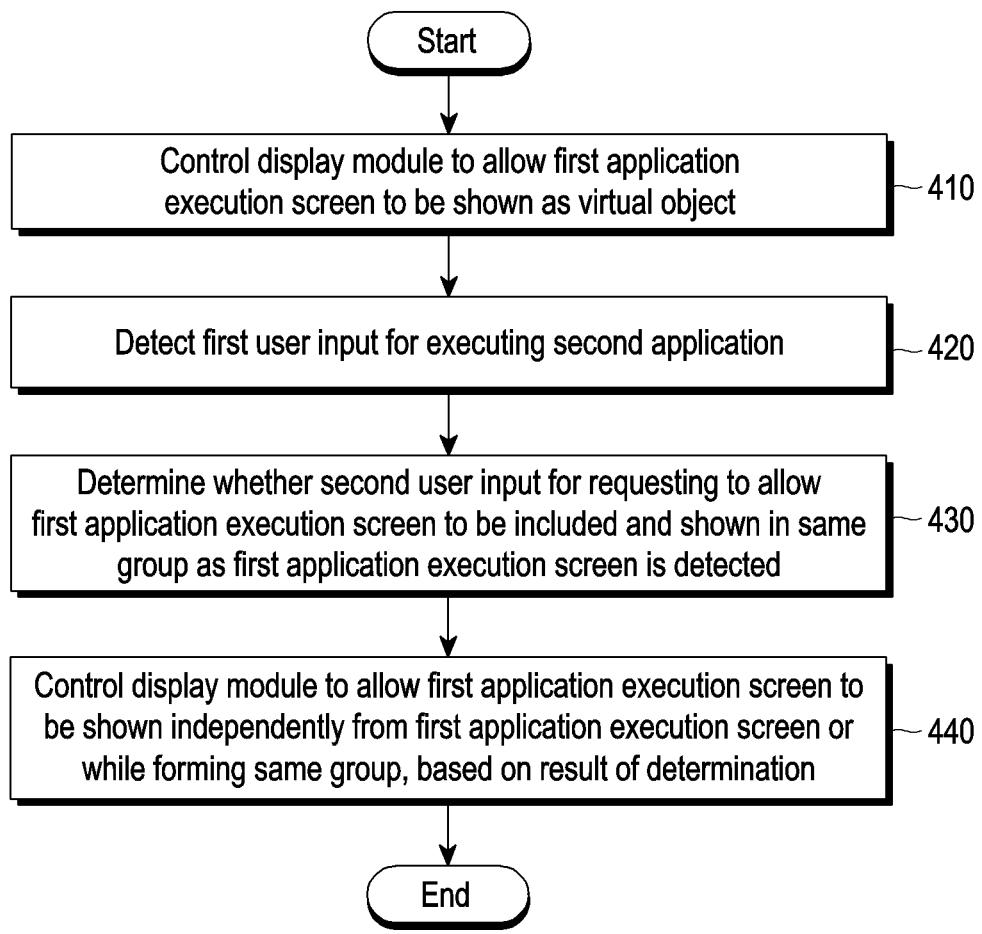
FIG. 4 illustrates a function or operation of showing a plurality of application execution screens independently or to be included in a same group according to a user input (e.g., a direction of the user's gaze) according to an embodiment of the disclosure.

FIG. 4 illustrates a function or operation of showing a plurality of application execution screens independently or to be included in a same group according to a user input (e.g., a user's gaze direction) according to an embodiment of the disclosure.

FIGS. 5A, 5B, 5C, 5D, 5E, 5F, and 5G illustrate the function or operation described in connection with FIG. 4 in light of a graphic user interface according to various embodiments of the disclosure.

Figure 5A:
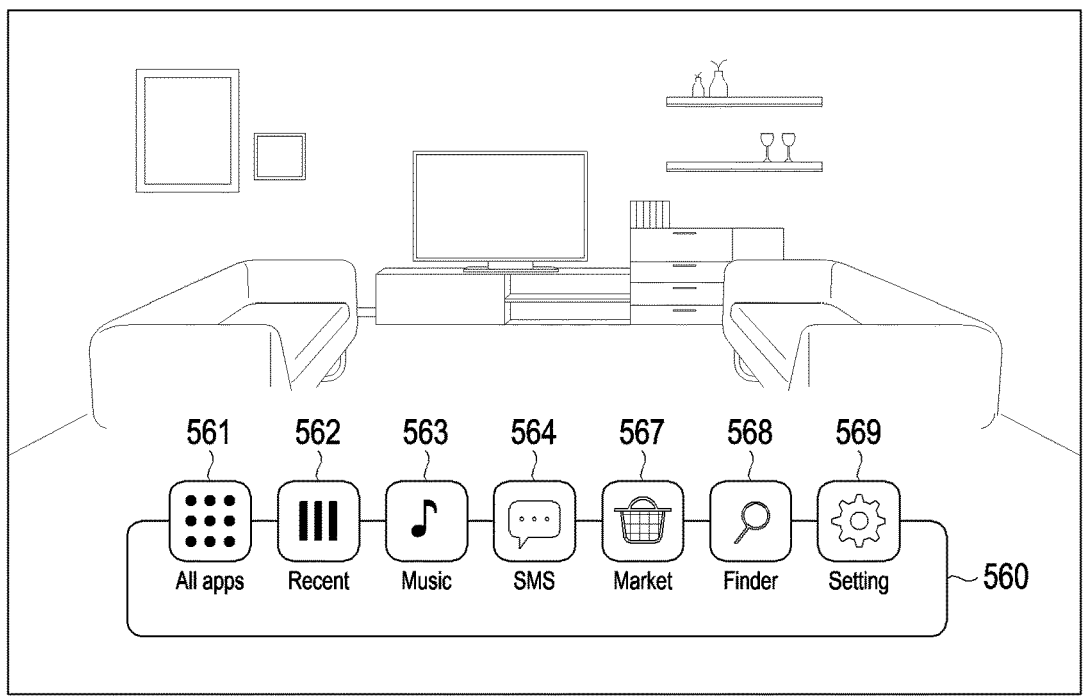
FIGS. 5A, 5B, 5C, 5D, 5E, 5F, and 5G illustrate a function or operation described in connection with FIG. 4 in light of a graphic user interface according to various embodiments of the disclosure.
Figure 5B:
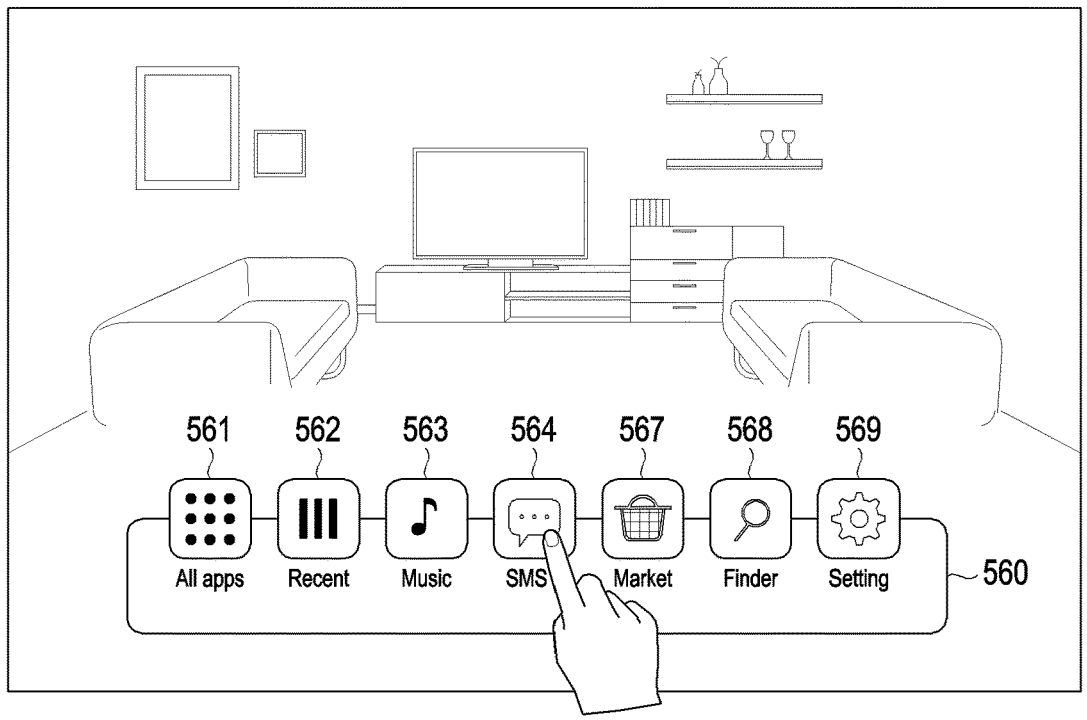
Figure 5C:
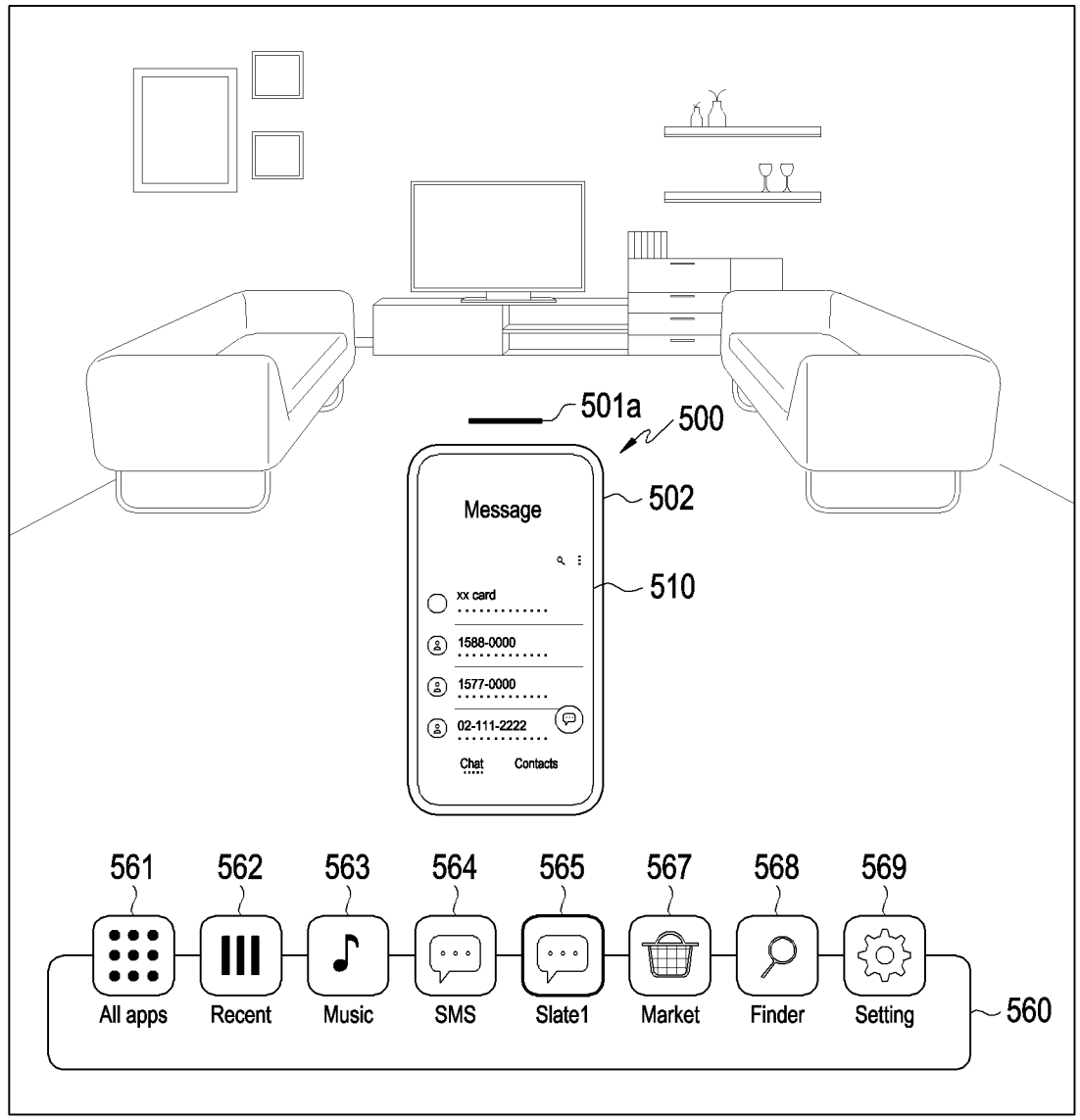
Figure 5D:
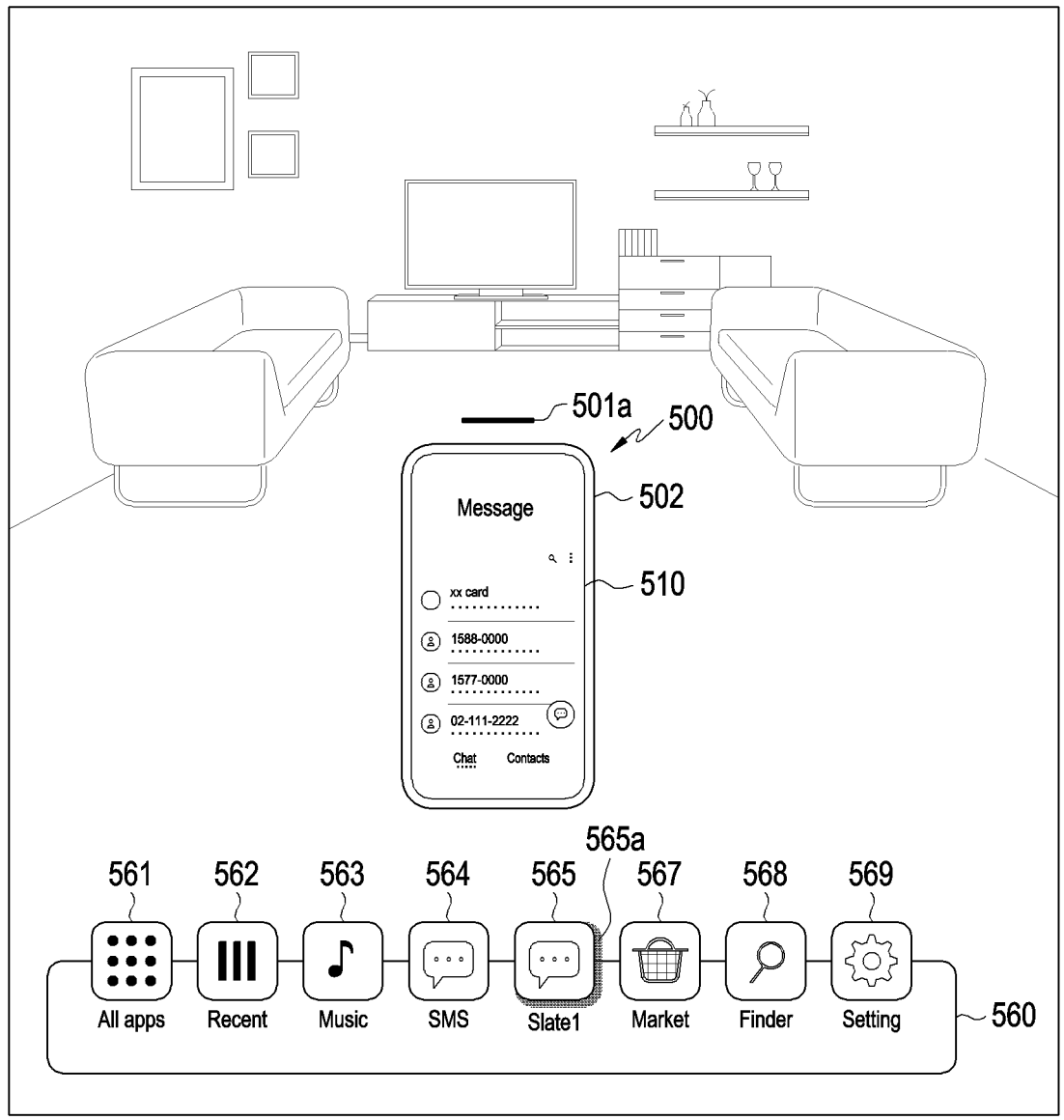

Referring to FIG. 4, according to an embodiment of the disclosure, the wearable device 100 (e.g., the processor 120) may control the display module 150 so that the execution screen of the first application is shown as a virtual object in operation 410. Referring to FIG. 5A, according to an embodiment of the disclosure, the wearable device 100 may control the display module 150 to allow a plurality of visual elements (e.g., a first icon 561, a second icon 562, a third icon 563, a fourth icon 564, a fifth icon 567, a sixth icon 568, or a seventh icon 569) to be shown on the application tray 560. According to an embodiment of the disclosure, the wearable device 100 may control the display module 150 to allow the plurality of visual elements (e.g., the first icon 561, the second icon 562, the third icon 563, the fourth icon 564, the fifth icon 567, the sixth icon 568, or the seventh icon 569) and the application tray 560 to be shown as moving according to a movement (e.g., turning right the head) of the user's body. According to an embodiment of the disclosure, the first icon 561 may be a visual element for providing icons corresponding to various applications installed (e.g., stored in memory) on the wearable device 100 and/or various applications installed on the external electronic device operably connected with the wearable device 100 100 according to the user's virtual touch input to the first icon 561. According to an embodiment of the disclosure, the second icon 562 may be a visual element for providing information about the application currently running (e.g., showing the application execution screen as a virtual object) through the wearable device 100. According to an embodiment of the disclosure, the third icon 563 and the fourth icon 564 may include an icon corresponding to at least one predesignated application or set by the user to be fixedly shown (e.g., to be provided along with the application tray 560 when the application tray 560 is shown) on the application tray 560. FIG. 5A illustrates an embodiment in which as fixed applications, a music application and a text message application are provided. According to an embodiment of the disclosure, the fifth icon 567 may include an icon corresponding to an application (e.g., market application) for downloading at least one application from the external electronic device (e.g., server). According to an embodiment of the disclosure, the sixth icon 568 may include an icon corresponding to an application for searching for various pieces of information stored in the wearable device 100. According to an embodiment of the disclosure, the seventh icon 569 may include an icon corresponding to an application for setting various states of the wearable device 100. In the disclosure, for convenience of description, the fashion of showing in the form of an icon on the application tray 560 may be referred to as a "second type". According to an embodiment of the disclosure, the application tray 560 may not be provided, but only the at least one visual element (e.g., the first icon 561, the second icon 562, the third icon 563, the fourth icon 564, the fifth icon 567, the sixth icon 568, or the seventh icon 569) may be provided as virtual objects. Referring to FIG. 5B, according to an embodiment of the disclosure, the wearable device 100 may receive a selection input (e.g., virtual touch input) to any one visual element (e.g., the fourth icon 564) among the at least one visual element (e.g., the first icon 561, the second icon 562, the third icon 563, the fourth icon 564, the fifth icon 567, the sixth icon 568, or the seventh icon 569). According to an embodiment of the disclosure, when the image for the user's body part (e.g., right hand) obtained using at least one camera (e.g., the first camera 111) is determined to at least partially overlap any one visual element (e.g., the fourth icon 564) among the at least one visual element (e.g., the first icon 561, the second icon 562, the third icon 563, the fourth icon 564, the fifth icon 567, the sixth icon 568, or the seventh icon 569) or upon detecting the movement of a finger selecting any one visual element (e.g., the fourth icon 564) in the overlapping state, the wearable device 100 may determine that a virtual touch input to any one visual element (e.g., the fourth icon 564) is received. According to another embodiment of the disclosure, it may be determined whether a virtual touch is input through a separate device (e.g., a sensor provided on the user's hand) to determine virtual touch. According to another embodiment of the disclosure, the wearable device 100 may recognize the coordinates in the space where the user's hand tip is positioned using a plurality of cameras and determine whether a virtual touch is input depending on whether the recognized coordinates in the space match the coordinates in the space where any one virtual element (e.g., the fourth icon 564) is displayed. Other various algorithms (e.g., artificial intelligence model algorithm) for determining whether a virtual touch is performed may be applied. Referring to FIG. 5C, according to an embodiment of the disclosure, the wearable device 100 may control the display module 150 to show the execution screen (e.g., a short message service (SMS) application execution screen 510) of the application corresponding to the virtual element (e.g., the fourth icon 564) selected by the user, as a virtual object. According to an embodiment of the disclosure, the wearable device 100 may identify the user's gaze direction and control the display module 150 to show the execution screen (e.g., the SMS application execution screen 510) of the application, as a virtual object, in the position corresponding to the identified user gaze direction. According to an embodiment of the disclosure, the wearable device 100 may provide a visual element (e.g., boundary line 502) indicating that at least one application execution screen is included in the same group and a handler (e.g., a first handler 501a, a second handler 501b, and a third handler 501c) for controlling the application execution screen (e.g., the SMS application execution screen 510), along with the application execution screen (e.g., the SMS application execution screen 510). However, according to another embodiment of the disclosure, the wearable device 100 may perform control so that at least one of the handler (e.g., the first handler 501a, the second handler 501b, and/or the third handler 501c) for controlling the application execution screen (e.g., SMS application execution screen 510) and the visual element (e.g., boundary line 502) indicating that at least one application execution screen is included in the same group is not shown. According to another embodiment of the disclosure, when the visual element (e.g., boundary line 502) indicating that at least one application execution screen is included in the same group is not shown, it may be identified whether it belongs to the same group by the handler (e.g., the first handler 501a, the second handler 501b, and/or the third handler 501c). For example, the plurality of application execution screens belonging to the same group may share the handler (e.g., the first handler 501a, the second handler 501b, and/or the third handler 501c). According to an embodiment of the disclosure, at least one grouped application execution screen may be controlled together (e.g., at least one grouped application execution screen is moved together or all of the at least one grouped application execution screen are terminated) according to the user's gesture for the handler (e.g., the first handler 501a, the second handler 501b, and/or the third handler 501c). According to an embodiment of the disclosure, upon detecting the user's gesture (e.g., a virtual touch input to the handler) for the handler (e.g., the first handler 501a, the second handler 501b, and/or the third handler 501c), the wearable device 100 may control the display module 150 to show various menus (e.g., an icon for terminating all of the at least one grouped application execution screen) for controlling together the at least one grouped application execution screen. In the disclosure, the expression "belong to the same group" may mean that at least one application execution screen is controlled in substantially the same manner (e.g., simultaneously repositioned or simultaneously removed) according to a specific user input (e.g., a grip gesture and drop gesture for e.g., the first handler 501a, the second handler 501b, and/or the third handler 501c). Alternatively, in the disclosure, the expression "belong to the same group" may mean that all or some of at least one application execution screen are included in the same boundary line 502. As mentioned in the disclosure, the expression "application is included in the same group" and the expression "application execution screen is included in the same group" may have substantially the same meaning. According to an embodiment of the disclosure, upon detecting a designated gesture (e.g., a gesture for gripping a visual object or a gesture for dropping a visual object) in the position where a specific visual object (e.g., SMS application execution screen 510) is shown (e.g., displayed by the wearable device 100) and/or a position, a predetermined distance apart from the position where the specific visual object (e.g., SMS application execution screen 510) is shown (e.g., displayed), the wearable device 100 may identify that a gesture for controlling the specific visual object (e.g., SMS application execution screen 510) is input from the user. In the disclosure, for convenience of description, the visual elements including the handler (e.g., the first handler 501a, the second handler 501b, and/or the third handler 501c), boundary line 502, and application execution screen 510 may be referred to as "slate". Accordingly, the expression "included in the same slate" may mean that "at least one application execution screen is included in the same group". According to an embodiment of the disclosure, when a specific application execution screen (e.g., SMS application execution screen 510) is provided as a slate, the wearable device 100 may control the display module 150 to show the visual element (e.g., an eighth icon 565) corresponding to the slate on the application tray 560. According to an embodiment of the disclosure, the visual element (e.g., the eighth icon 565) corresponding to the slate may be shown to be visually distinguished from other icons. For example, according to an embodiment of the disclosure, the visual element (e.g., the eighth icon 565) corresponding to the slate may be shown in a thicker edge than the other icons or in a different edge color than the other icons. Referring to FIG. 5D, according to an embodiment of the disclosure, the wearable device 100 may provide a predesignated visual effect 565a (e.g., a blur effect) around the visual element (e.g., the eighth icon 565) corresponding to the currently focused slate (e.g., application execution screen). According to an embodiment of the disclosure, upon detecting that the user's gaze faces a specific slate (e.g., SMS application execution screen 510) or when the specific slate (e.g., SMS application execution screen 510) is selected by the user, the wearable device 100 may determine that the specific slate is focused. FIG. 5D illustrates an embodiment in which a designated visual effect 565a is provided around the eighth icon 565 based on the user gazing at the first slate 500.

According to an embodiment of the disclosure, the wearable device 100 (e.g., the processor 120) may detect a first user input for executing a second application (e.g., music application) in operation 420.

Figure 5E:
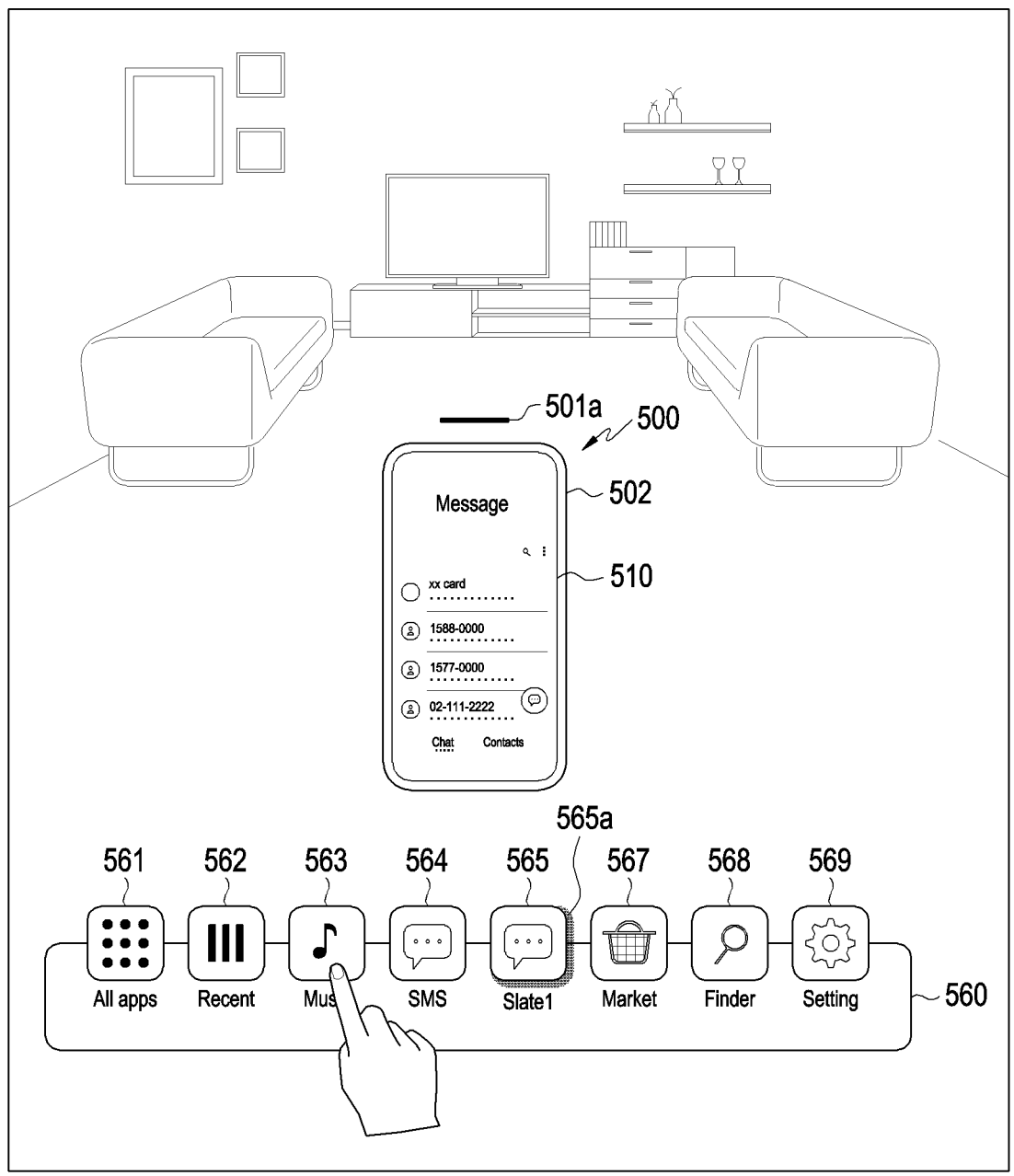

Referring to FIG. 5E, according to an embodiment of the disclosure, the wearable device 100 may detect a virtual touch input to a specific application icon (e.g., the third icon 563 indicating the music application). Or, according to another embodiment of the disclosure, the wearable device 100 may detect the first user input for executing the second application by detecting a virtual touch input to any one icon among the application icons included in an application list provided separately from the application tray 560.

Figure 5F:
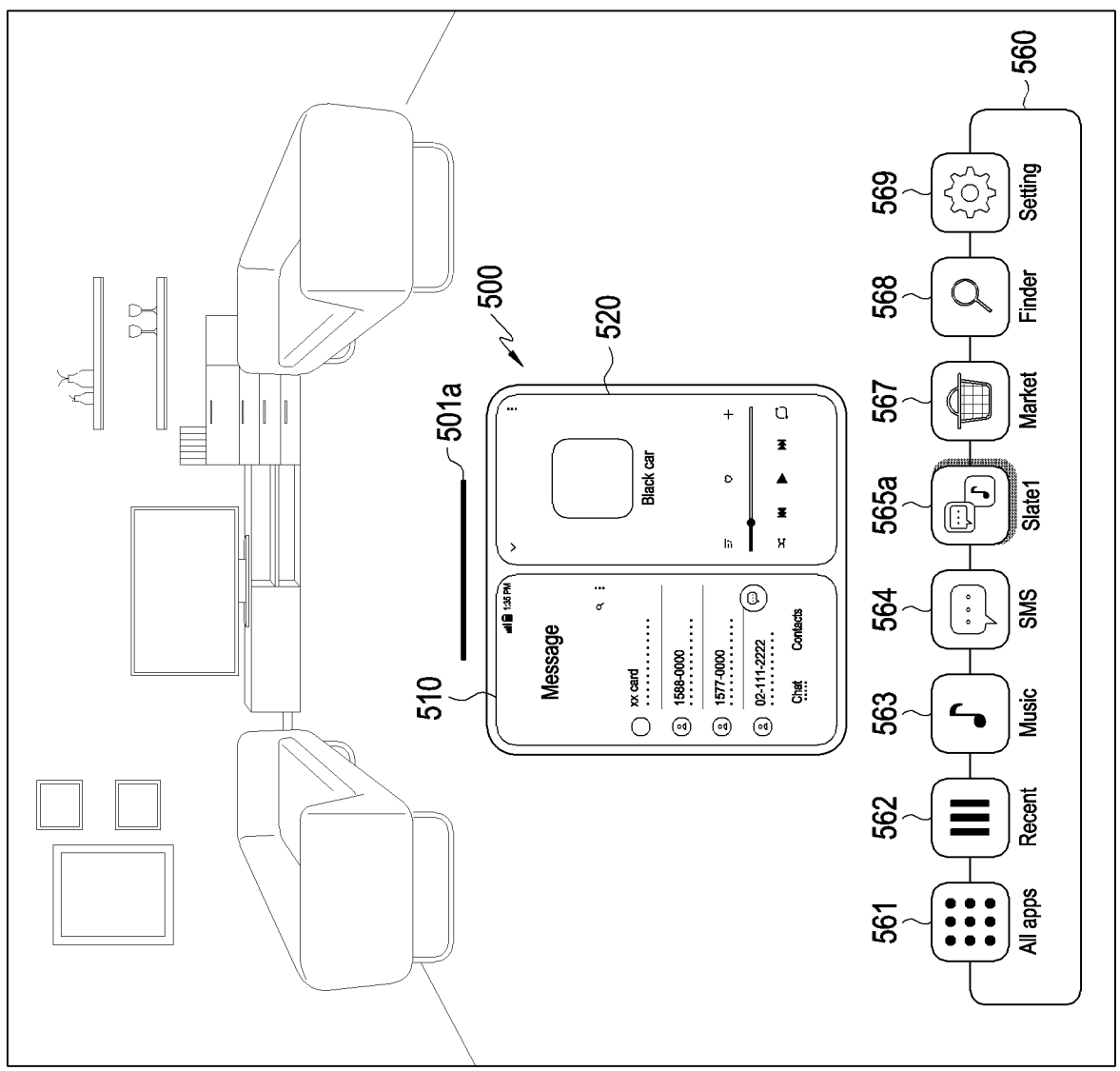
Figure 5F:
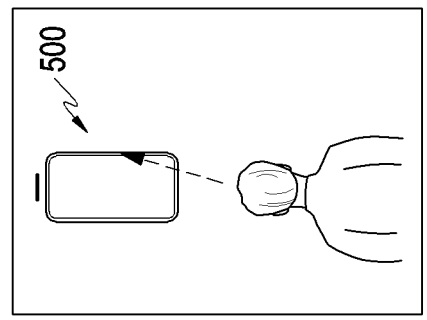

According to an embodiment of the disclosure, the wearable device 100 (e.g., the processor 120) may determine whether a second user input is detected to request that the execution screen of the second application (e.g., music application) be included and shown in the same group as the execution screen of the first application (e.g., SMS application) in operation 430. According to an embodiment of the disclosure, as shown in FIG. 5F, the wearable device 100 may detect that the user's gaze faces a specific slate (e.g., the first slate 500). According to an embodiment of the disclosure, the wearable device 100 may detect the user's gaze at the time when a virtual touch input to the specific application icon (e.g., the third icon 563 indicating the music application) is detected, times until before a predesignated time elapses from the time when a virtual touch input is detected (e.g., two seconds after a virtual touch input is detected), times before the time when a virtual touch input is detected (e.g., two seconds before a virtual touch input is detected), and/or a time when a virtual touch input is predicted to be input (e.g., a time predicted through the artificial intelligence model). In such a case, according to an embodiment of the disclosure, the wearable device 100 may determine that a second user input is obtained to request that the execution screen of the second application (e.g., music application) be included and shown in the same group as the execution screen of the first application (e.g., SMS application). In other words, the second user input may include the direction of the user's gaze toward the specific slate. According to another embodiment of the disclosure, the second user input may include a user input (e.g., virtual touch input) to the specific slate (e.g., SMS application execution screen 510) or a user input (e.g., virtual touch input) for selecting any one slate from at least one slate list provided separately from the application execution screen.

According to an embodiment of the disclosure, in operation 440, the wearable device 100 (e.g., the processor 120) may control the display module 150 to allow the execution screen of the second application (e.g., music application) to be shown while forming the same group as, or independently from, the execution screen of the first application, based on the result of determination of operation 430.

Referring to FIG. 5F, according to an embodiment of the disclosure, upon detecting that the user's gaze faces the specific slate (e.g., the first slate 500), the wearable device 100 may control the display module 150 to allow the execution screen of the second application (e.g., music application) to be shown while being included in the same group as the execution screen of the first application (e.g., SMS application). In this case, according to an embodiment of the disclosure, the wearable device 100 may update and provide the icon (e.g., the eighth icon 565) corresponding to the first slate 500 as shown in FIG. 5F. For example, according to an embodiment of the disclosure, the wearable device 100 may create and provide the icon indicating the first application (e.g., SMS application) and the icon indicating the second application (e.g., music application), as a single icon, as shown in FIG. 5F. According to an embodiment of the disclosure, upon detecting that the user's gaze does not face the specific slate (e.g., the first slate 500) as shown in FIG. 5G (e.g., when it is identified that the real world is shown without showing a certain application execution screen), the wearable device 100 may control the display module 150 to allow the slate (e.g., a second slate 505) including the execution screen of the second application (e.g., music application) to be shown independently from the first slate 500 (e.g., in such a manner that the SMS application execution screen 510 and the music application execution screen 520 are not included in the same group).

Figure 5G:
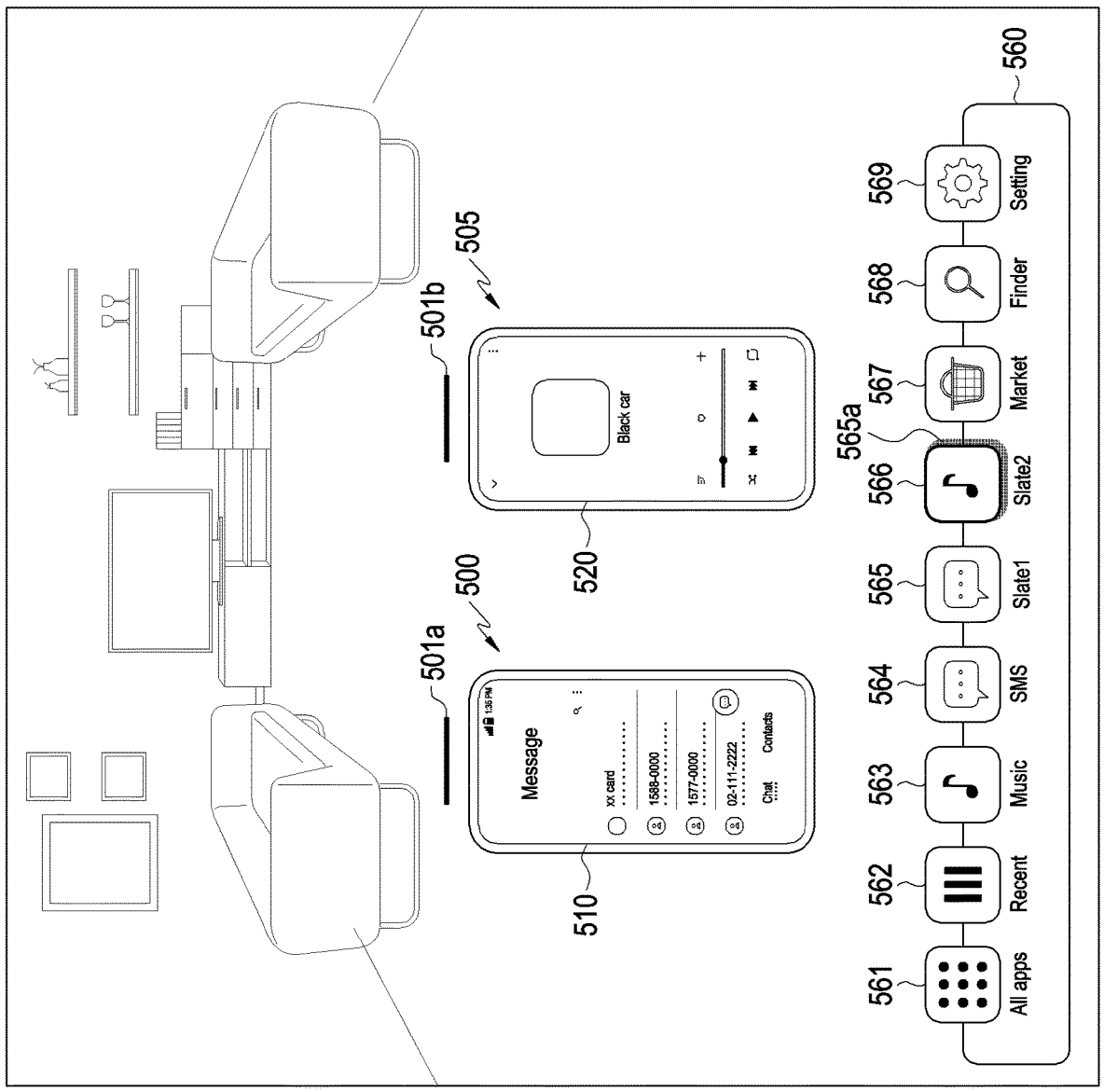

Referring to FIG. 5G, in this case, according to an embodiment of the disclosure, the wearable device 100 may provide the icon (e.g., the ninth icon 566) corresponding to the second slate 505 on the application tray 560, separately from the icon (e.g., the eighth icon 565) corresponding to the first slate 500. According to an embodiment of the disclosure, the wearable device 100 may control the display module 150 to show information (e.g., "slate 2") 1820, or 2020, or 2220 or (e.g., "slate 3") 1830 or 2030 indicating that the target icon is an icon corresponding to the second slate 505, around the icon (e.g., the ninth icon 566) corresponding to the second slate 505. FIG. 5G illustrates an embodiment in which a designated visual effect 565a is provided around the ninth icon 566 based on the user gazing at the second slate 505.

FIGS. 6A, 6B, 6C, 6D, 6E, and 6F illustrate virtual objects shown in a first type or a second type according to various embodiments of the disclosure.

Figure 6A:
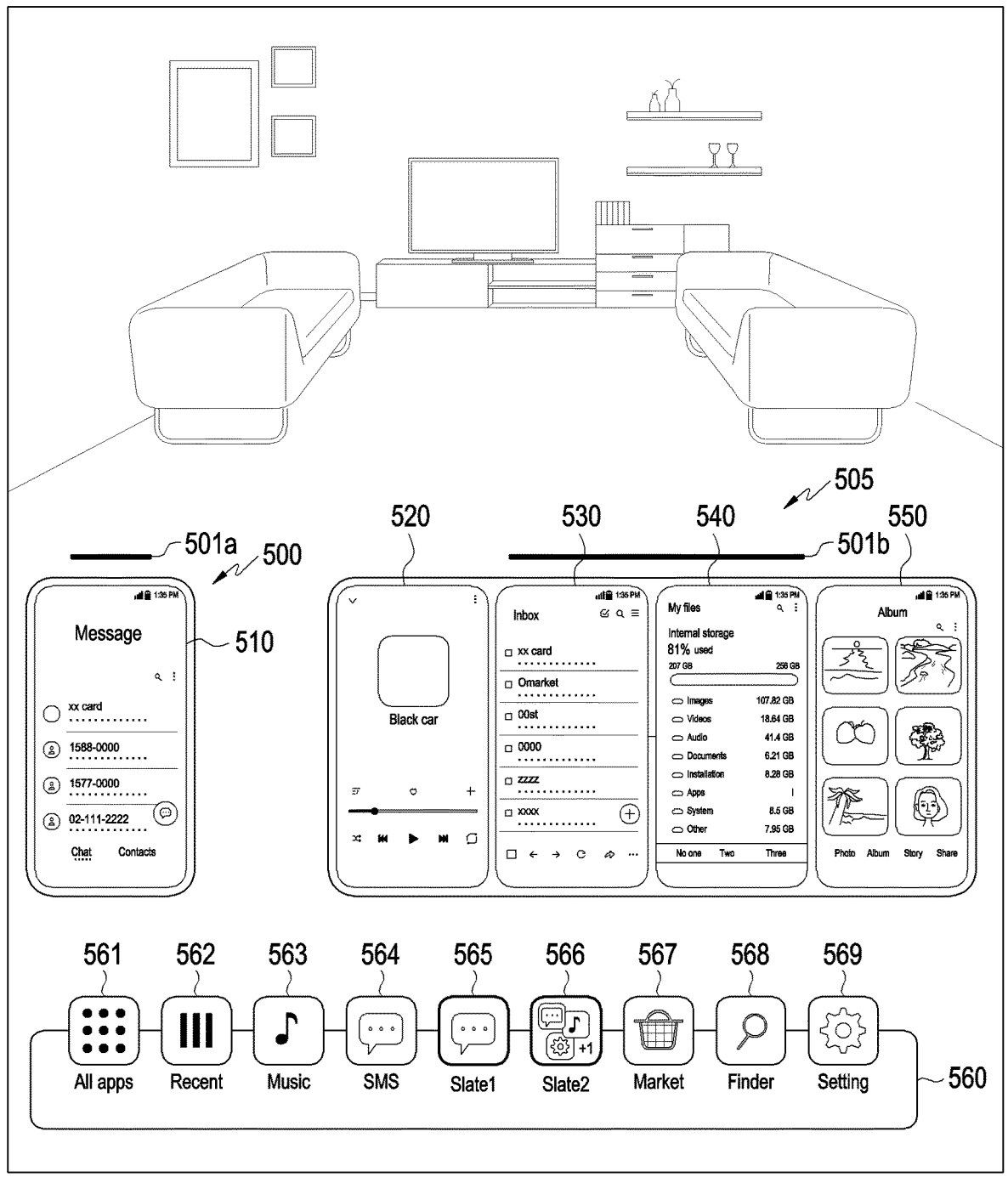
FIGS. 6A, 6B, 6C, 6D, 6E, and 6F illustrate virtual objects shown in a first type or a second type according to various embodiments of the disclosure.
Figure 6B:
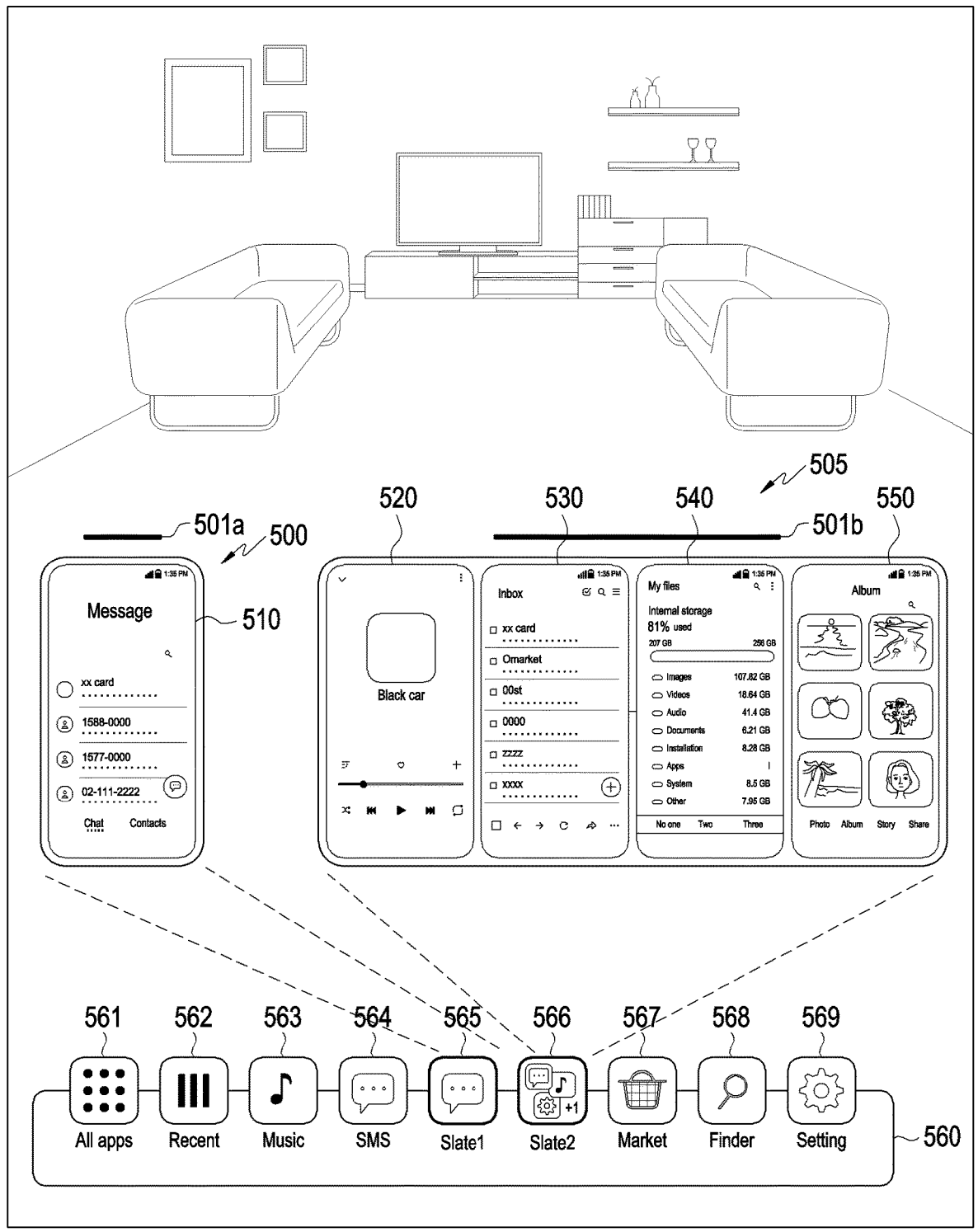

Referring to FIGS. 6A and 6B, according to an embodiment of the disclosure, the wearable device 100 may control the display module 150 to show at least one slate (e.g., the first slate 500 and/or the second slate 505) including at least one application execution screen, as a virtual object. In the disclosure, for convenience of description, a case where a specific visual object (e.g., application execution screen) is shown as a slate may be referred to as "first type" or "shown based on the first type". FIG. 6A illustrates an example in which a music application, an email application, a file application providing information about the capacity being currently used by the memory and remaining capacity, and a gallery application are designated in one group. In this case, the execution screen 520 of the music application, the execution screen 530 of the email application, the execution screen 540 of the file application, and an execution screen 550 of the gallery application may be controlled by the wearable device 100 to be included and shown in the same slate (e.g., the second slate 505). Further, FIG. 6A illustrates an example in which the SMS application is designated to be included in a group different from the music application, email application, file application, and gallery application. In this case, the execution screen 510 of the SMS application may be shown through a slate (e.g., the first slate 500) visually and/or spatially separated and provided from the second slate 505. FIGS. 6A and 6B illustrate an embodiment in which the eighth icon 565 corresponding to the first slate 500 and the ninth icon 566 corresponding to the second slate 505 are shown on the application tray 560. According to an embodiment of the disclosure, the wearable device 100 may control the display module 150 to show the first slate 500 if a user input to the eighth icon 565 is obtained. According to an embodiment of the disclosure, the wearable device 100 may control the display module 150 to show the second slate 505 if a user input to the ninth icon 566 is obtained. According to an embodiment of the disclosure, when more application execution screens than a predesignated number (e.g., three) are included in a specific slate, the wearable device 100 may control the display module 150 to show information (e.g., "+1") indicating that more application execution screens than the predesignated number (e.g., three) are included, on the icon (e.g., the ninth icon 566) corresponding to the specific slate as shown in FIG. 6A.

Figure 6C:
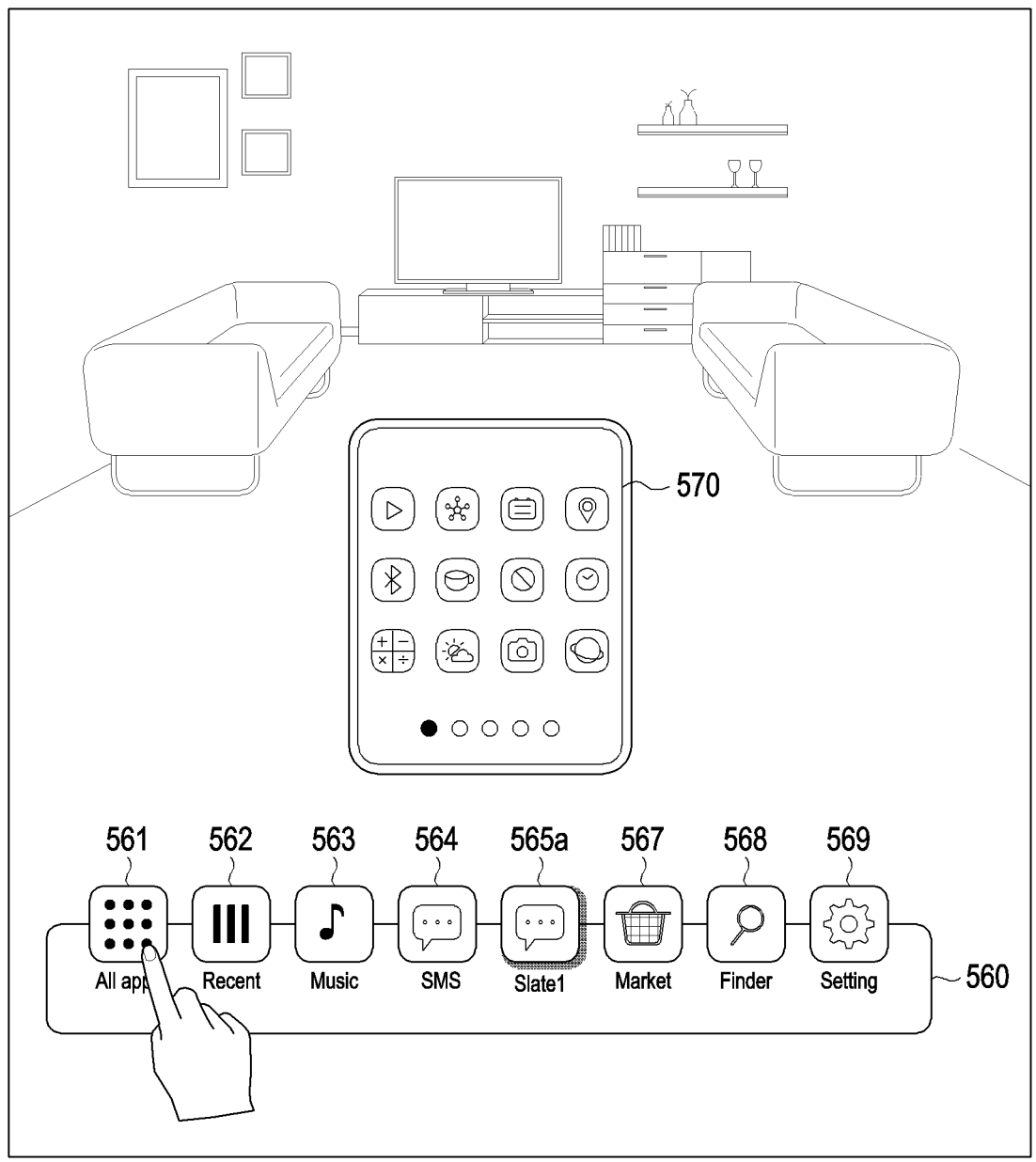

Referring to FIG. 6C, according to an embodiment of the disclosure, upon detecting a user input to the first icon 561, the wearable device 100 may control the display module 150 to show a list of icons of at least one application installed on the wearable device 100 and/or an external electronic device operably connected with the wearable device 100.

Figure 6D:
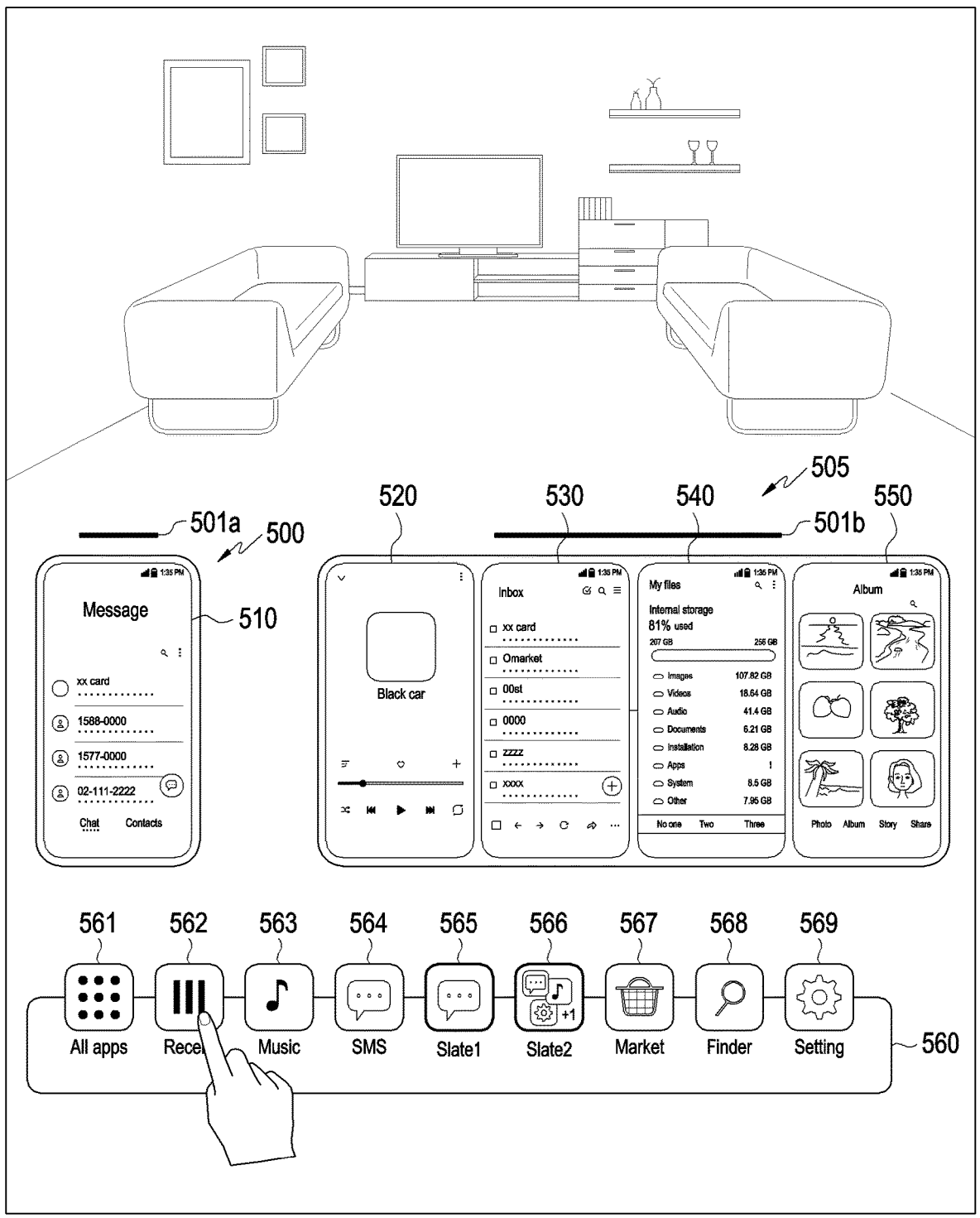
Figure 6E:
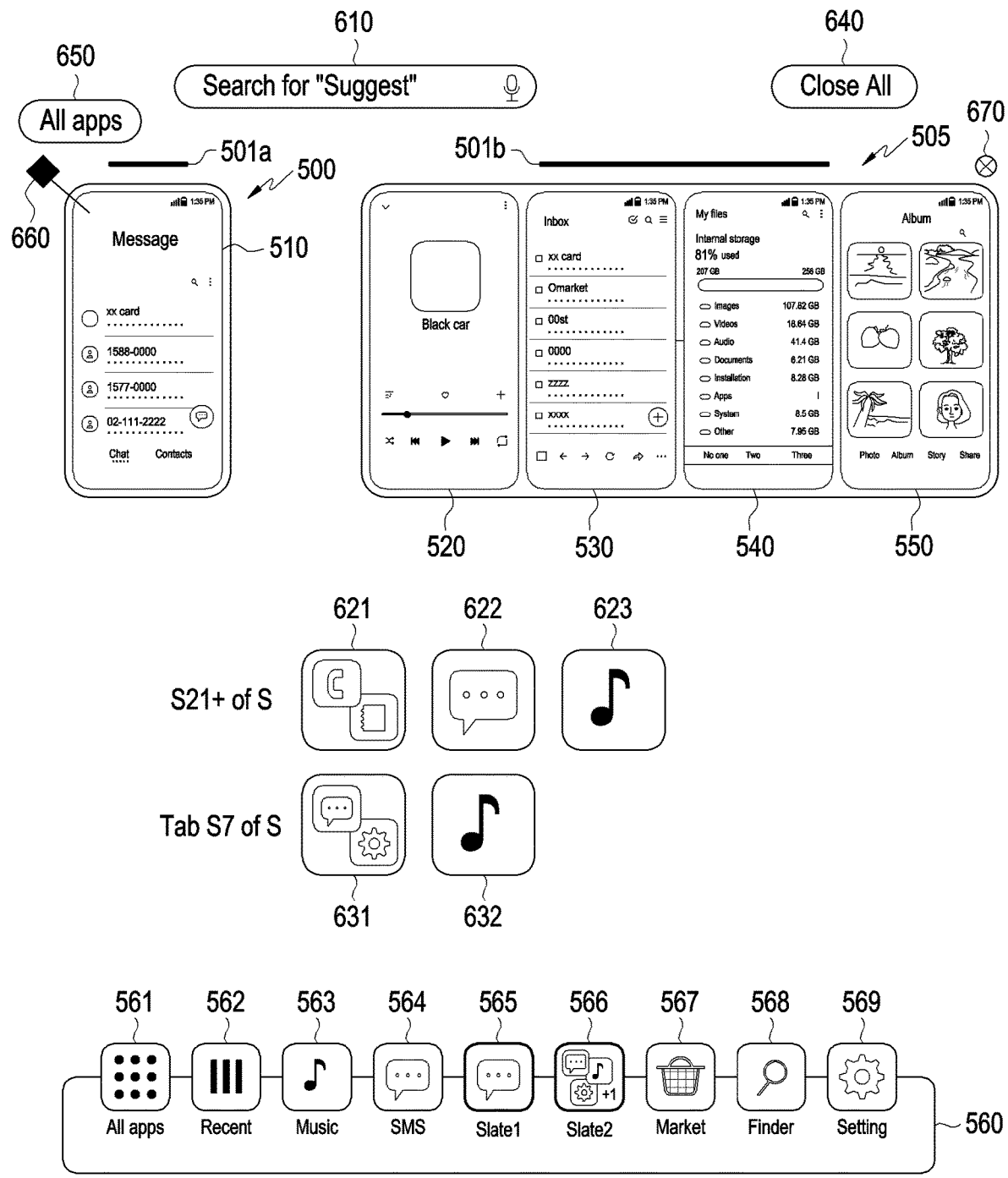

Referring to FIGS. 6D and 6E, according to an embodiment of the disclosure, the wearable device 100 may detect a user input to the second icon 562. According to an embodiment of the disclosure, upon detecting a user input to the second icon 562, the wearable device 100 may control the display module 150 to show the visual element (e.g., the tenth icon 621, the eleventh icon 622, the twelfth icon 623, the thirteenth icon 631, and the fourteenth icon 632) indicating at least one application among one or more applications (e.g., applications (including, e.g., the application currently running) executed recently (e.g., from the current time to a specific past time) in the background and foreground) running on the external electronic device (e.g., smartphone ("S21+"®) and tablet ("Tab S7"®)) operably connected with the wearable device 100 and/or at least one slate (e.g., the first slate 500 and the second slate 505) shown currently in the first type as shown in FIG. 6E. According to an embodiment of the disclosure, the wearable device 100 may control the display module 150 to show the visual element (e.g., icon) indicating the external electronic device (e.g., smart phone ("S21+"®) and tablet ("Tab S7"®)). Additionally, according to an embodiment of the disclosure, upon detecting a user input to the second icon 562, the wearable device 100 may control the display module 150 to show a visual element (e.g., search bar 610) for searching and providing information stored in the external electronic device through the network and/or information stored in the wearable device 100. According to an embodiment of the disclosure, upon detecting a user input to the second icon 562, the wearable device 100 may control the display module to show a visual element (e.g., the fifteenth icon 630) for providing the execution screen of the settings application. According to an embodiment of the disclosure, upon detecting a user input to the second icon 562, the wearable device 100 may control the display module to show a visual element (e.g., a sixteenth icon 640) for terminating (e.g., removing at least one slate) all of the application running on at least one external electronic device and/or at least one slate shown through the wearable device 100. However, according to an embodiment of the disclosure, despite detection of a user input to the visual element (e.g., the sixteenth icon 640) for terminating (e.g., removing at least one slate) all of the application running on at least one external electronic device and/or at least one slate shown through the wearable device 100, the wearable device 100 may not remove the execution screen of the fixed application (e.g., SMS application). FIG. 6E illustrates an embodiment in which a visual element (e.g., pin 660) indicating that the corresponding application is a fixed application is shown around the application execution screen. According to an embodiment of the disclosure, the wearable device 100 may control the display module 150 to show a visual element (e.g., the seventeenth icon 670) for removing only the specific slate (e.g., the second slate 505), around each slate. However, FIG. 6E illustrates an embodiment in which the visual element (e.g., the seventeenth icon 670) for removing only the specific slate (e.g., the second slate 505) is not shown since the first slate 500 is a fixed slate including a fixed application. According to an embodiment of the disclosure, the wearable device 100 may control the display module 150 to show a visual element (e.g., the fifteenth icon 650) for providing an icon list for at least one application installed on the wearable device 100 and/or the external electronic device operably connected with the wearable device 100.

Figure 6F:
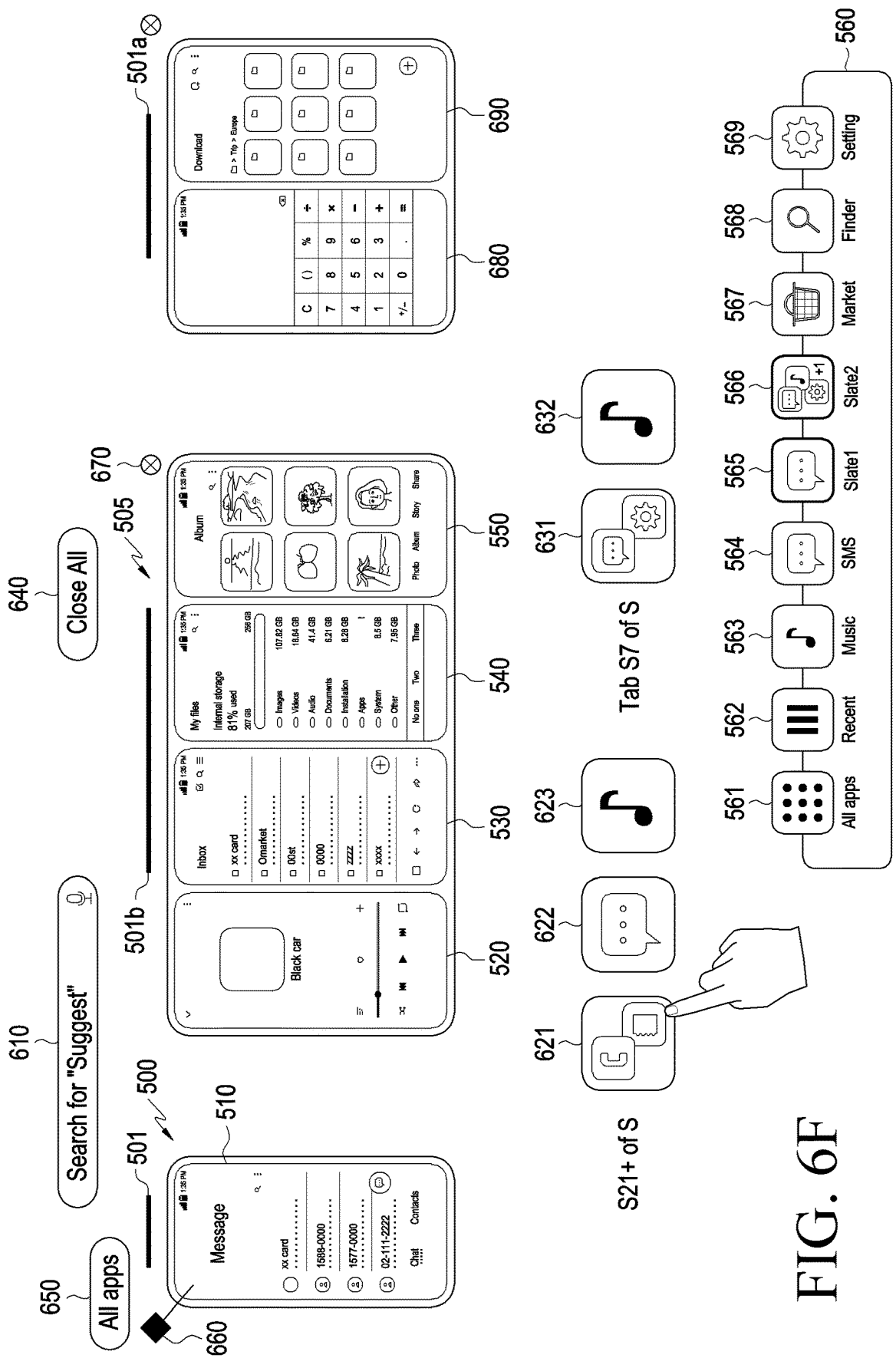

Referring to FIG. 6F, according to an embodiment of the disclosure, the wearable device 100 may detect a user input to the visual element (e.g., the tenth icon 621) indicating the application running on the external electronic device. According to an embodiment of the disclosure, upon detecting a user input to the visual element (e.g., the tenth icon 621) indicating the application running on the external electronic device, the wearable device 100 may control the display module 150 to show the execution screen of the application running on the external electronic device (e.g., "S21+"® as a smartphone) (e.g., the execution screen 680 of the calculator application and the execution screen 690 of the download application) as a virtual object. To that end, according to an embodiment of the disclosure, upon detecting a user input to the visual element (e.g., the tenth icon 621) indicating the application running on the external electronic device, the wearable device 100 (e.g., communication module) may request to provide information about the application running on the external electronic device (e.g., information about the execution screen being currently displayed on the external electronic device), corresponding to the selected visual element (e.g., the tenth icon 621). According to an embodiment of the disclosure, in response to the request for providing information, the wearable device 100 may control the display module 150 to obtain information about the execution screen being currently displayed on the external electronic device from the external electronic device and show it as a virtual object. According to an embodiment of the disclosure, as various visual elements (e.g., the tenth icon 621, the eleventh icon 622, the twelfth icon 623, the thirteenth icon 631, and the fourteenth icon 632) shown, only icons corresponding to applications commonly installed on the wearable device 100 and the external electronic device may be shown. For example, when the music application is not installed on the wearable device 100, the twelfth icon 623 corresponding to the music application may not be shown. However, according to another embodiment of the disclosure, when a specific application (e.g., music application) is not installed on the wearable device 100, the wearable device 100 may receive data for the specific application from the external electronic device (e.g., "S21+"® as a smartphone) and install the specific application and then control the display module 150 to show the twelfth icon 623. In the disclosure, for convenience of description, embodiments in which various visual elements are shown on a two-dimensional plane are illustrated but, according to another embodiment of the disclosure, various visual elements may also be shown as three-dimensional objects.

Figure 7:
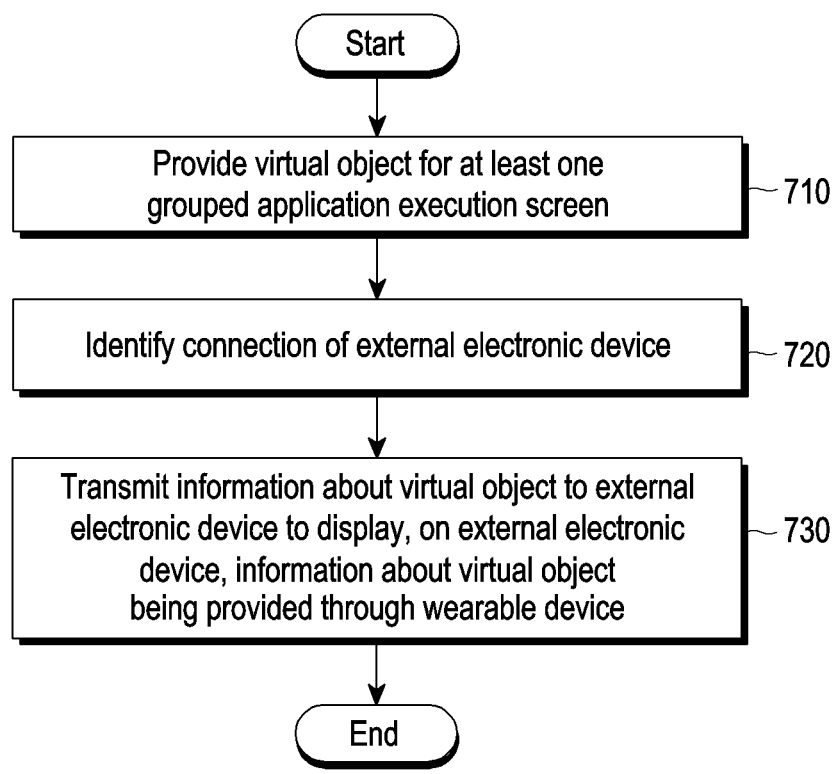
FIG. 7 illustrates a function or operation of providing, through an external electronic device, information about at least one virtual object (e.g., application execution screen) shown through a wearable device by an external electronic device operably connected with the wearable device according to an embodiment of the disclosure.

FIG. 7 illustrates a function or operation of providing, through an external electronic device (e.g., Galaxy"® Fold Z™, as a smartphone), information about at least one virtual object (e.g., application execution screen) being shown through an wearable device by the external electronic device (e.g., "S21+"® as a smartphone) operably connected with the wearable device 100 according to an embodiment of the disclosure.

FIGS. 8A, 8B, 8C, 8D, and 8E illustrate a function or operation described in connection with FIG. 7 in light of a graphic user interface according to various embodiments of the disclosure.

Referring to FIG. 7, according to an embodiment of the disclosure, a wearable device 710 may provide a virtual object for at least one grouped application execution screen in operation 710. As mentioned herein, the term "grouping" may encompass grouping one application.

Figure 8A:
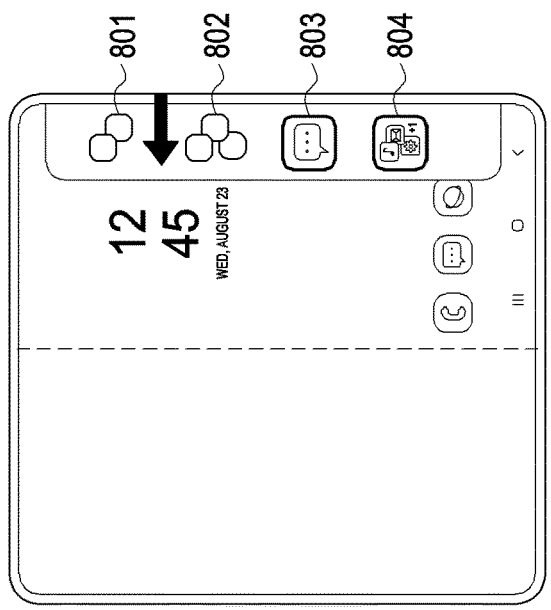
FIGS. 8A, 8B, 8C, 8D, and 8E illustrate a function or operation described in connection with FIG. 7 in light of a graphic user interface according to various embodiments of the disclosure.
Figure 8A:
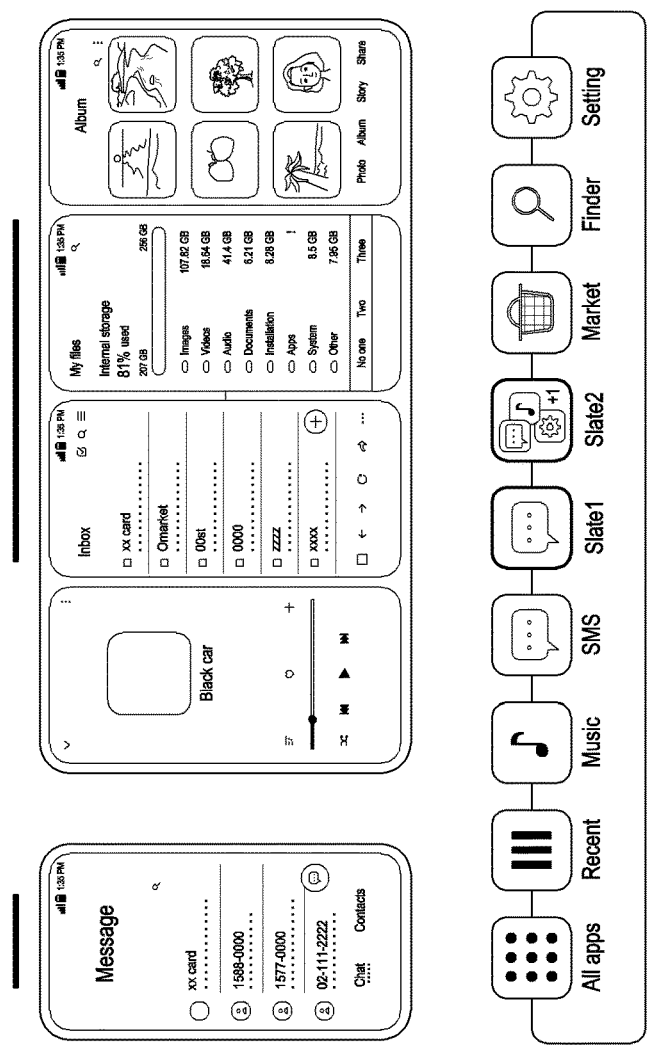

Referring to FIG. 8A, according to an embodiment of the disclosure, the wearable device 710 may control the display module 150 to show various virtual objects (e.g., the first slate 500 and the second slate 505).

Figure 8B:
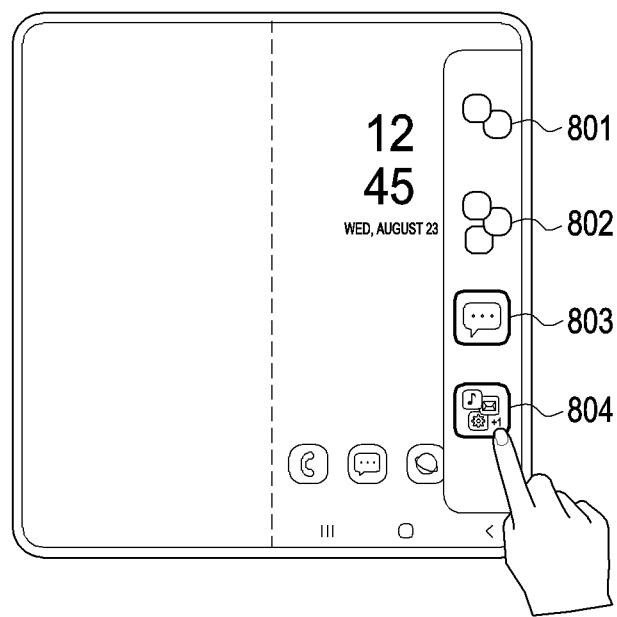
Figure 8C:
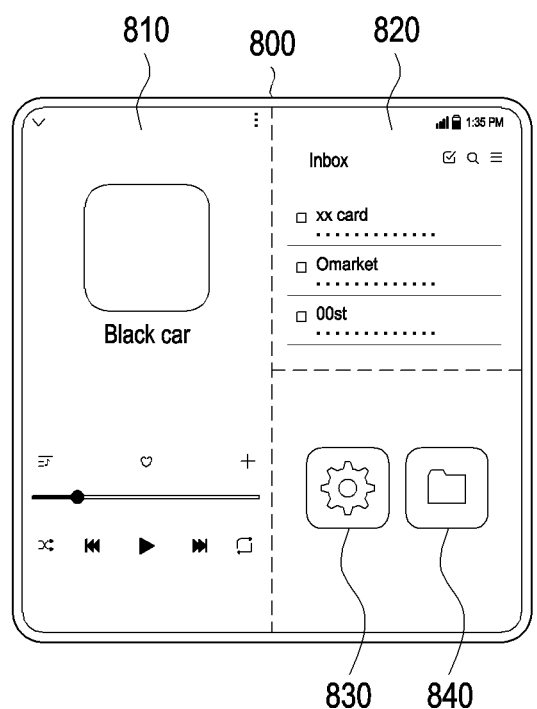
Figure 8D:
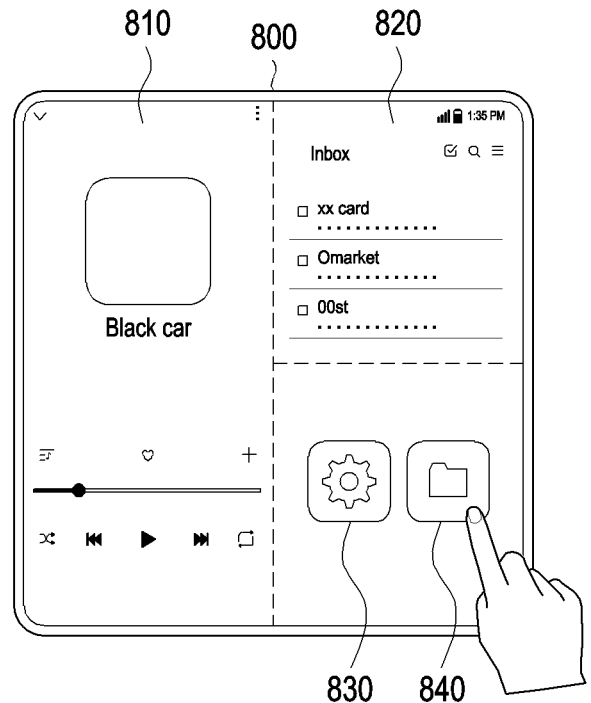
Figure 8E:
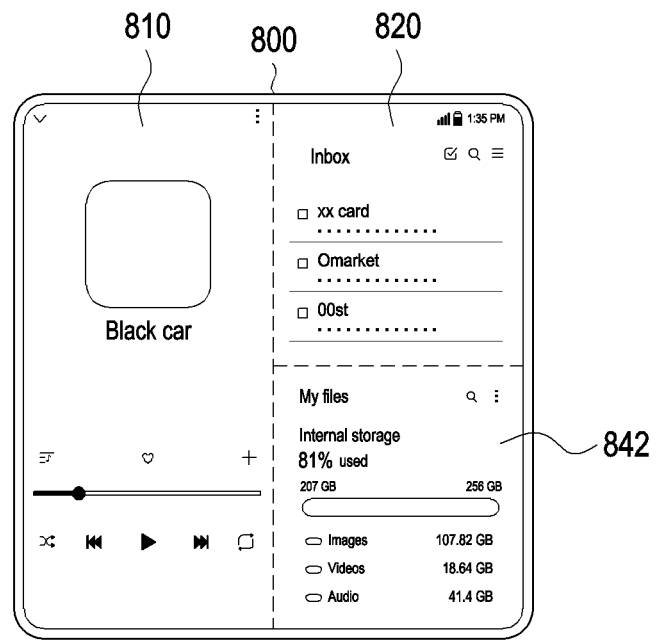

According to an embodiment of the disclosure, in operation 720, the wearable device 710 may identify that an external electronic device (e.g., Galaxy"® Fold Z™ as a smartphone) is connected. According to an embodiment of the disclosure, in operation 730, the wearable device 710 may transmit information about the virtual object to the external electronic device to display the information about the visual object being provided through the wearable device 100, on the external electronic device 800. According to an embodiment of the disclosure, as a user input (e.g., a swipe gesture to display a side bar) is detected, the external electronic device may display information (e.g., first slate icon 803 and second slate icon 804) about at least one virtual object (e.g., first slate 500 and second slate 505) being shown through the wearable device 100 based on the information obtained from the wearable device 100. According to an embodiment of the disclosure, the external electronic device may display information (e.g., first slate icon 803 and second slate icon 804) about at least one virtual object (e.g., first slate 500 and second slate 505) along with a list (e.g., first application icon 801 and second application icon 802) of applications executable through the external electronic device 800. Referring to FIGS. 8B and 8C, according to an embodiment of the disclosure, the external electronic device 800 may detect a selection input for at least one application icon (e.g., second slate icon 804). According to an embodiment of the disclosure, the application icon for which the execution screen of the specific application may be provided as a virtual object through the wearable device 100 may be displayed on the external electronic device 800 to be visually distinguished from another application icon (e.g., the icon corresponding to the application of which the execution screen may be provided only through the external electronic device 800). For example, the application icon for which the execution screen of the specific application may be provided as a virtual object through the wearable device 100 may be displayed to be distinguished in icon background color from another application icon, displayed in a different icon edge color, or provided with a predesignated visual effect (e.g., blur effect) so as to be visually distinguished from the other icon. According to an embodiment of the disclosure, the application of which the execution screen of the specific application may be provided as a virtual object through the wearable device may be set by a user input or predesignated on the wearable device and/or external electronic device 800. Further, the type of various visual effects provided for the application icon for which the execution screen of the specific application may be provided as a virtual object may be predesignated or be set by the user through the wearable device and/or the external electronic device 800. According to an embodiment of the disclosure, when a plurality of application execution screens, exceeding the number (e.g., three) of applications displayable on multiple windows of the external electronic device, are shown on the wearable device (e.g., when four application execution screens are formed as one group on the wearable device), the external electronic device 800 may display an icon list of the remaining applications (e.g., settings application and file application) except for the applications (e.g., music application and email application) displayed on the multiple windows among the icons in the second slate icon 804 to receive a selection as to what application execution screen is to be displayed on the multiple windows of the external electronic device 800. FIG. 8C illustrates an embodiment in which a settings application icon 830 and the file application icon 840 are displayed, while an execution screen 810 of the music application displayed on the external electronic device 800 and the execution screen 820 of the email application displayed on the external electronic device 800 are displayed on the multiple windows. Referring to FIGS. 8D and 8E, according to an embodiment of the disclosure, upon detecting a selection input (e.g., a touch input to the file application icon 840) for the application (e.g., the file application 842) to be displayed on the multiple windows, the external electronic device 800 may display the execution screen of the selected application (e.g., the execution screen 810 of the file application displayed on the external electronic device 800) on the multiple windows. Although FIGS. 7, 8A, 8B, 8C, 8D, and 8E illustrate an example in which smartphones are external electronic devices, various embodiments of the disclosure are not limited thereto. For example, according to other embodiments of the disclosure, the external electronic device may include a device for providing virtual reality or augmented reality, such as head mounted device (HMD), and the embodiments shown in FIGS. 7, 8A, 8B, 8C, 8D, and 8E may be provided to the user in a virtual reality or augmented reality manner.

Figure 9:
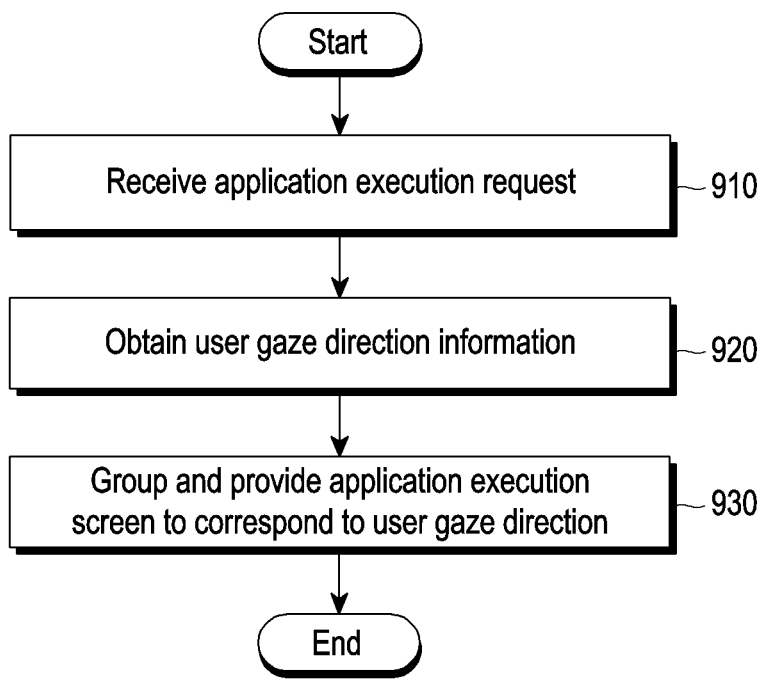
FIG. 9 illustrates a function or operation of grouping and providing a plurality of application execution screens based on a direction of a user's gaze by a wearable device according to an embodiment of the disclosure.

FIG. 9 illustrates a function or operation of grouping and providing a plurality of application execution screens based on a direction of a user's gaze by a wearable device according to an embodiment of the disclosure.

Figure 10A:
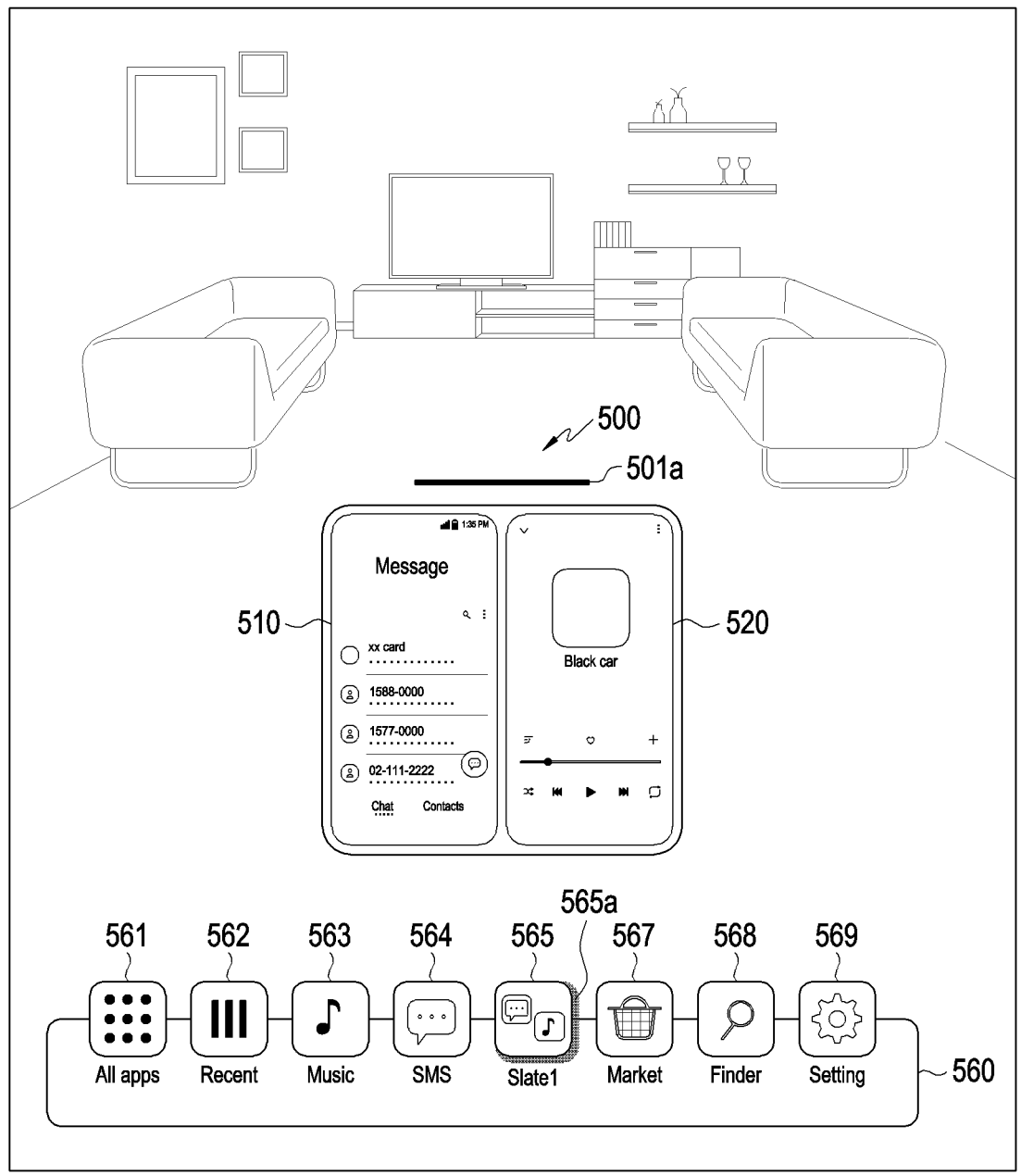
FIGS. 10A and 10B illustrate a function or operation described in connection with FIG. 9 in light of a graphic user interface according to various embodiments of the disclosure.
Figure 10B:
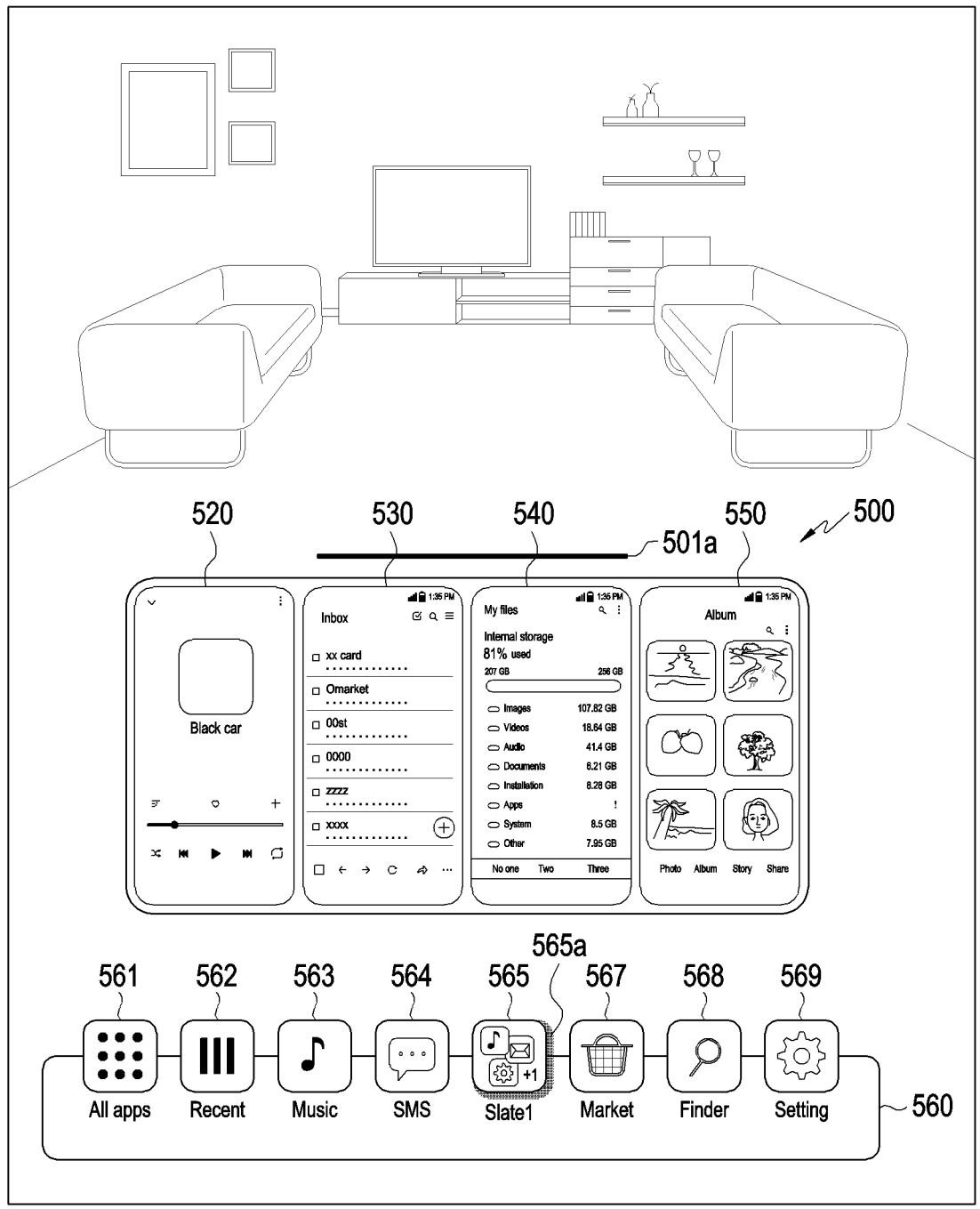

FIGS. 10A and 10B illustrate a function or operation described in connection with FIG. 9 in light of a graphic user interface according to various embodiments of the disclosure.

Referring to FIG. 9, according to an embodiment of the disclosure, the wearable device 100 may receive an application execution request in operation 910. According to an embodiment of the disclosure, the wearable device 100 may receive the application execution request by detecting a user input (e.g., a virtual touch input to the third icon 563) as shown in FIG. 5E.

According to an embodiment of the disclosure, in operation 920, the wearable device may obtain the user's gaze direction information. According to an embodiment of the disclosure, in operation 930, the wearable device may group and provide application execution screens to correspond to the user's gaze direction. FIGS. 10A and 10B illustrate an embodiment in which the direction of the user's gaze faces the first slate 500. Referring to FIGS. 10A and 10B, according to an embodiment of the disclosure, the wearable device 100 may control the display module 150 to allow the execution screen 520 of the selected application (e.g., music application) to be grouped and shown with the execution screen of another application.

Figure 11:
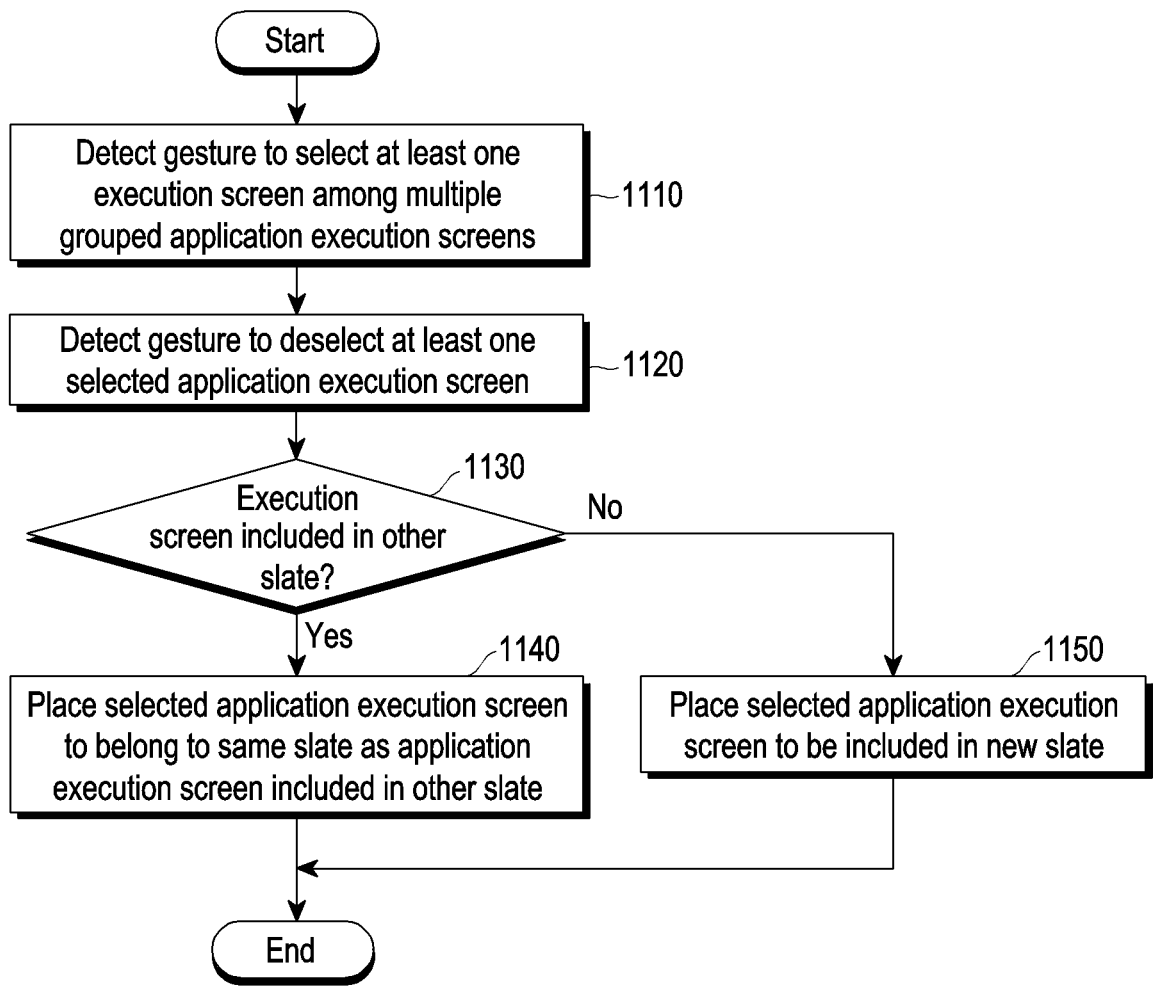
FIG. 11 illustrates a function or operation of controlling to include at least one execution screen among a plurality of grouped application execution screens in a same group as a different plurality of grouped application execution screens or control to independently show them by a wearable device according to an embodiment of the disclosure.
Figure 12A:
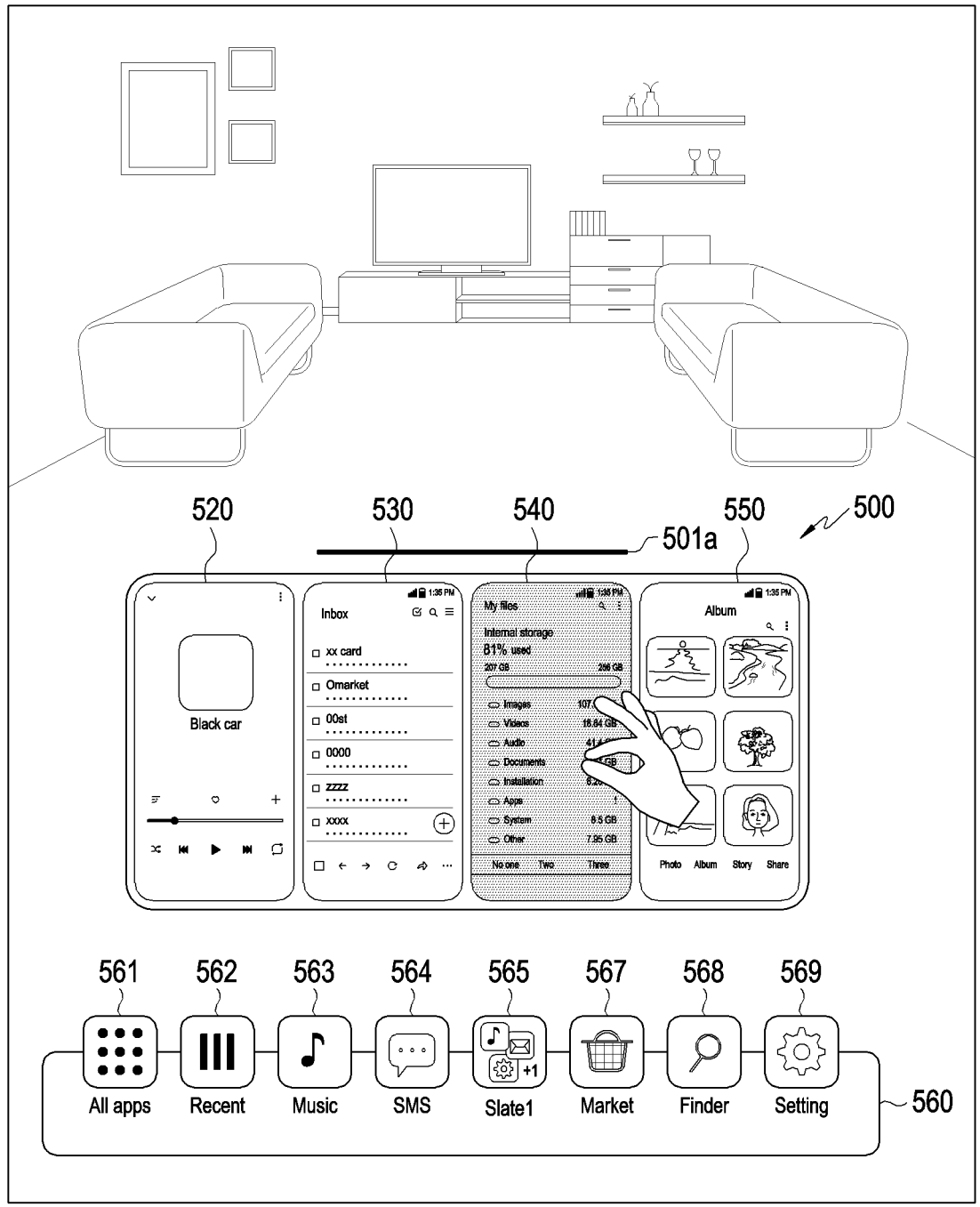
FIGS. 12A, 12B, and 12C illustrate a function or operation described in connection with FIG. 11 in light of a graphic user interface according to various embodiments of the disclosure.
Figure 12B:
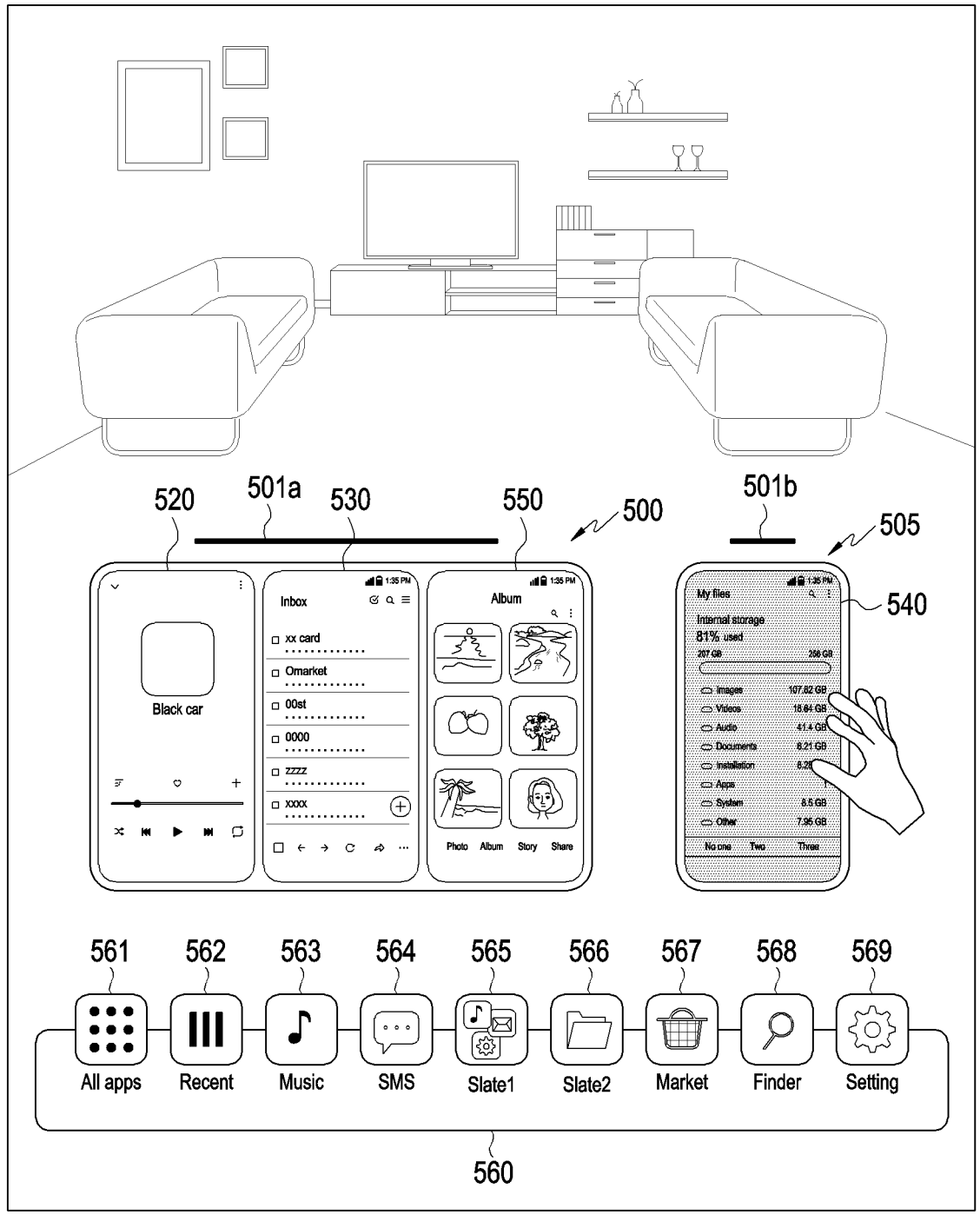
Figure 12C:
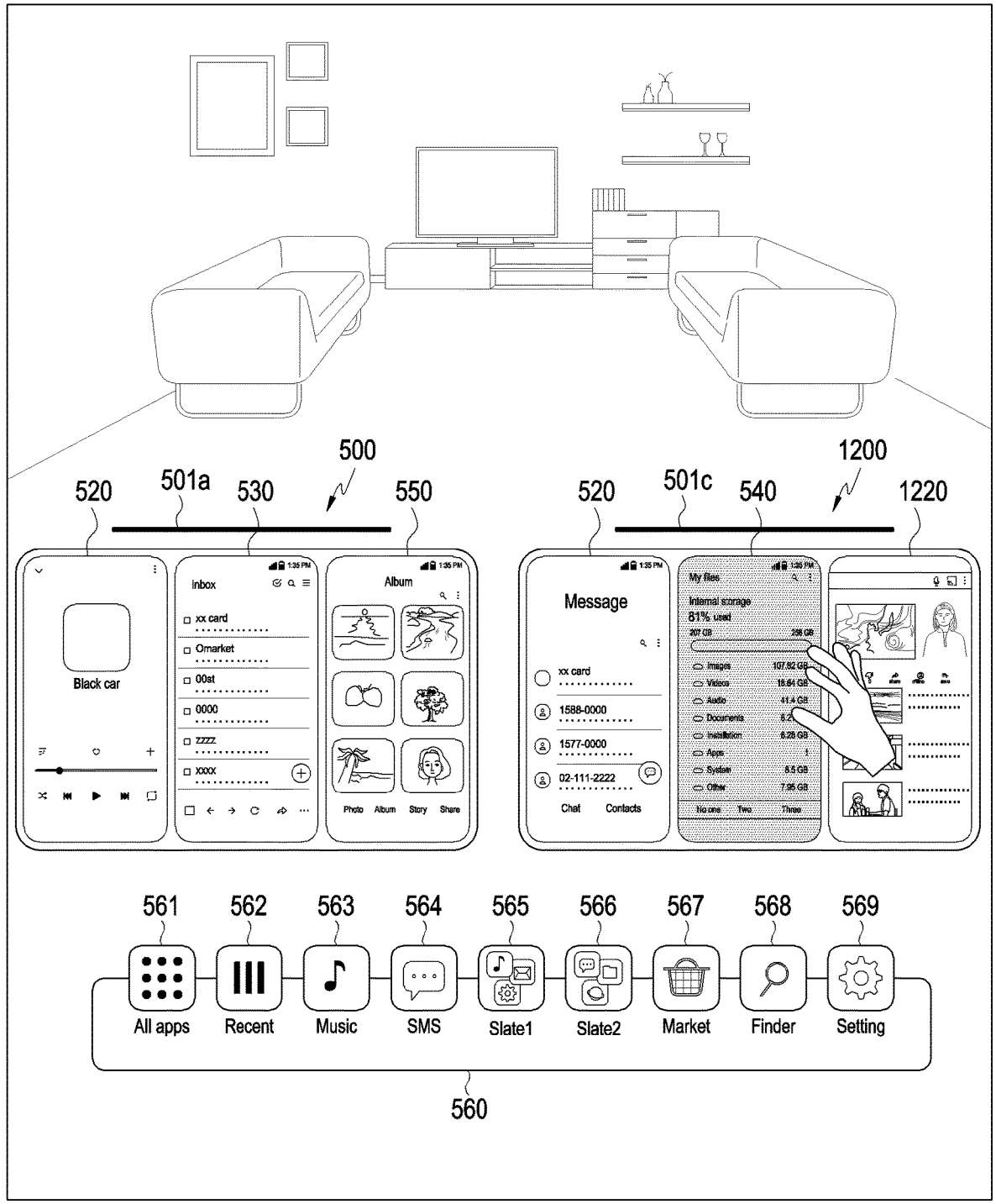

FIG. 11 illustrates a function or operation of controlling to include at least one execution screen among a plurality of grouped application execution screens in a same group as a different plurality of grouped application execution screens or control to independently show them by a wearable device 100 according to an embodiment of the disclosure. FIGS. 12A, 12B, and 12C illustrate a function or operation described in connection with FIG. 11 in light of a graphic user interface according to various embodiments of the disclosure.

Referring to FIG. 11, according to an embodiment of the disclosure, the wearable device 100 may detect a gesture for selecting at least one execution screen among a plurality of grouped application execution screens in operation 1110. Referring to FIG. 12A, according to an embodiment of the disclosure, the wearable device 100 may detect a user input (e.g., a grip gesture for the execution screen) for selecting the file application execution screen 540 from among the music application execution screen 520, the email application execution screen 530, the file application execution screen 540, and the gallery application execution screen 550. According to an embodiment of the disclosure, the wearable device 100 may provide a visual effect (e.g., shadow effect) to the selected application execution screen (e.g., the execution screen 540 of the file application) to visually distinguish the selected application execution screen (e.g., the execution screen 540 of the file application) from the other application execution screens. Referring to FIG. 12B, according to an embodiment of the disclosure, the wearable device 100 may detect a user input to move the selected application execution screen (e.g., the execution screen 540 of the file application). According to an embodiment of the disclosure, the wearable device 100 may provide the visual effect (e.g., shade effect) even while detecting the user input to move the selected application execution screen (e.g., the execution screen 540 of the file application).

According to an embodiment of the disclosure, in operation 1120, the wearable device 100 may detect a gesture (e.g., drop gesture) to deselect the at least one selected application execution screen (e.g., the execution screen 540 of the file application). According to an embodiment of the disclosure, in operation 1130, the wearable device 100 may determine whether the execution screen (e.g., the execution screen 540 of the file application) is included in another slate (e.g., a third slate 1200). According to an embodiment of the disclosure, in operation 1140, the wearable device 100 may place at least one selected application execution screen (e.g., the execution screen 540 of the file application) so that the application execution screen included in the other slate and the at least one selected application execution screen (e.g., the execution screen 540 of the file application) belong to the same slate. Referring to FIG. 12C, according to an embodiment of the disclosure, the wearable device 100 may detect a drop gesture for the at least one selected application execution screen (e.g., the execution screen 540 of the file application) in the position where the other slate (e.g., the third slate 1200 including the SMS application execution screen 520 and an Internet application execution screen 1220) is shown. In this case, according to an embodiment of the disclosure, the wearable device 100 may control the display module 150 to allow the at least one selected application execution screen (e.g., the execution screen 540 of the file application) to be included and shown in the same group as the application execution screen included in the other slate (e.g., the third slate 1200). According to an embodiment of the disclosure, when the at least one selected application execution screen (e.g., the execution screen 540 of the file application) is shown on the other slate, the wearable device 100 may control the display module 150 to allow the provided visual effect (e.g., shade effect) not to be shown.

According to an embodiment of the disclosure, in operation 1150, when no execution screen is included in the other slate according to operation 1130, the wearable device 100 may place the at least one selected application execution screen (e.g., the execution screen 540 of the file application) to be included in a new slate. For example, according to an embodiment of the disclosure, as shown in FIG. 12B, the wearable device 100 may control the display module 150 to allow the at least one selected application execution screen (e.g., the execution screen 540 of the file application) to be shown independently from the other slate (e.g., the third slate 1200). According to an embodiment of the disclosure, when the at least one selected application execution screen (e.g., the execution screen 540 of the file application) is shown independently, the wearable device 100 may control the display module 150 to allow the provided visual effect (e.g., shade effect) not to be shown.

Figure 13:
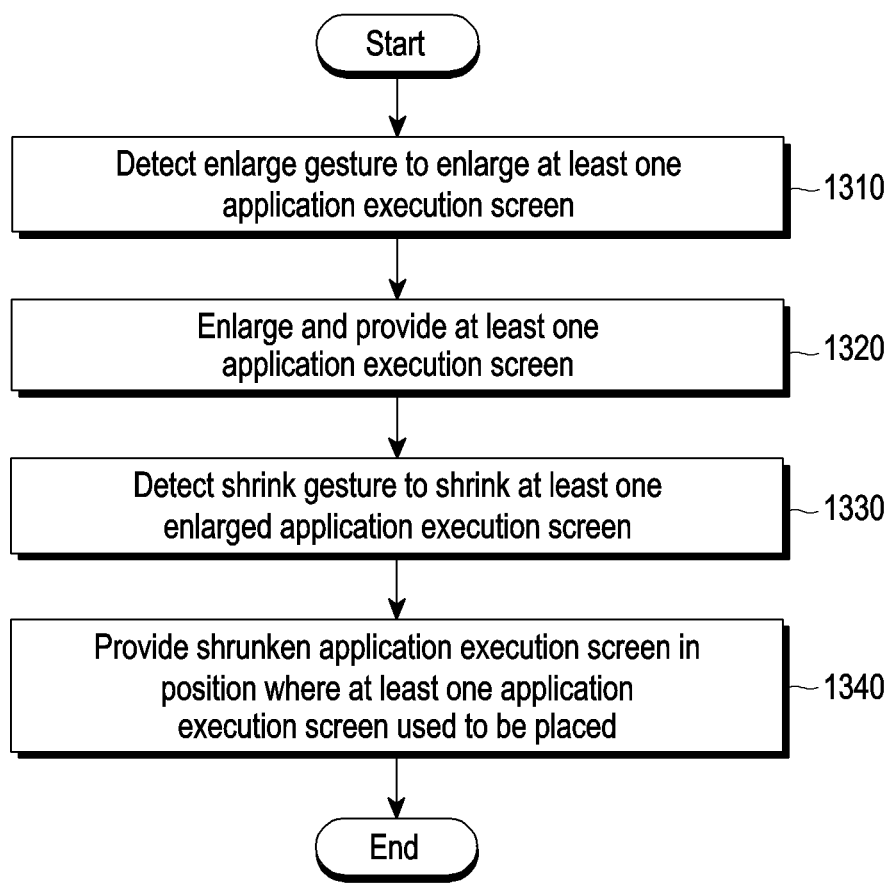
FIG. 13 illustrates a function or operation of enlarging or shrinking at least one application execution screen according to a user gesture by a wearable device according to an embodiment of the disclosure.

FIG. 13 illustrates a function or operation of enlarging or shrinking at least one application execution screen according to a user gesture by a wearable device according to an embodiment of the disclosure.

Figure 14A:
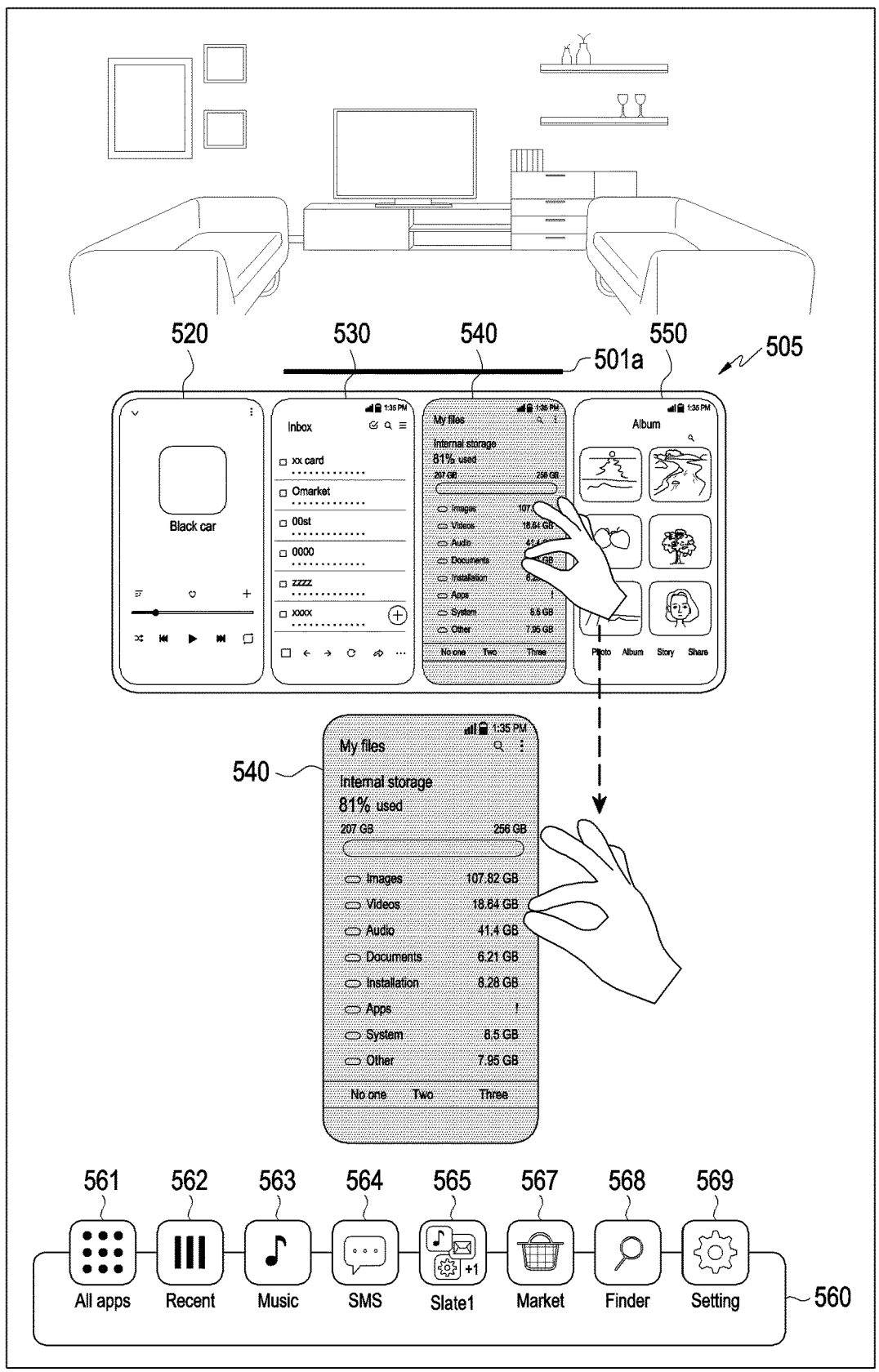
FIGS. 14A, 14B, and 14C illustrate a function or operation described in connection with FIG. 13 in light of a graphic user interface according to various embodiments of the disclosure.
Figure 14B:
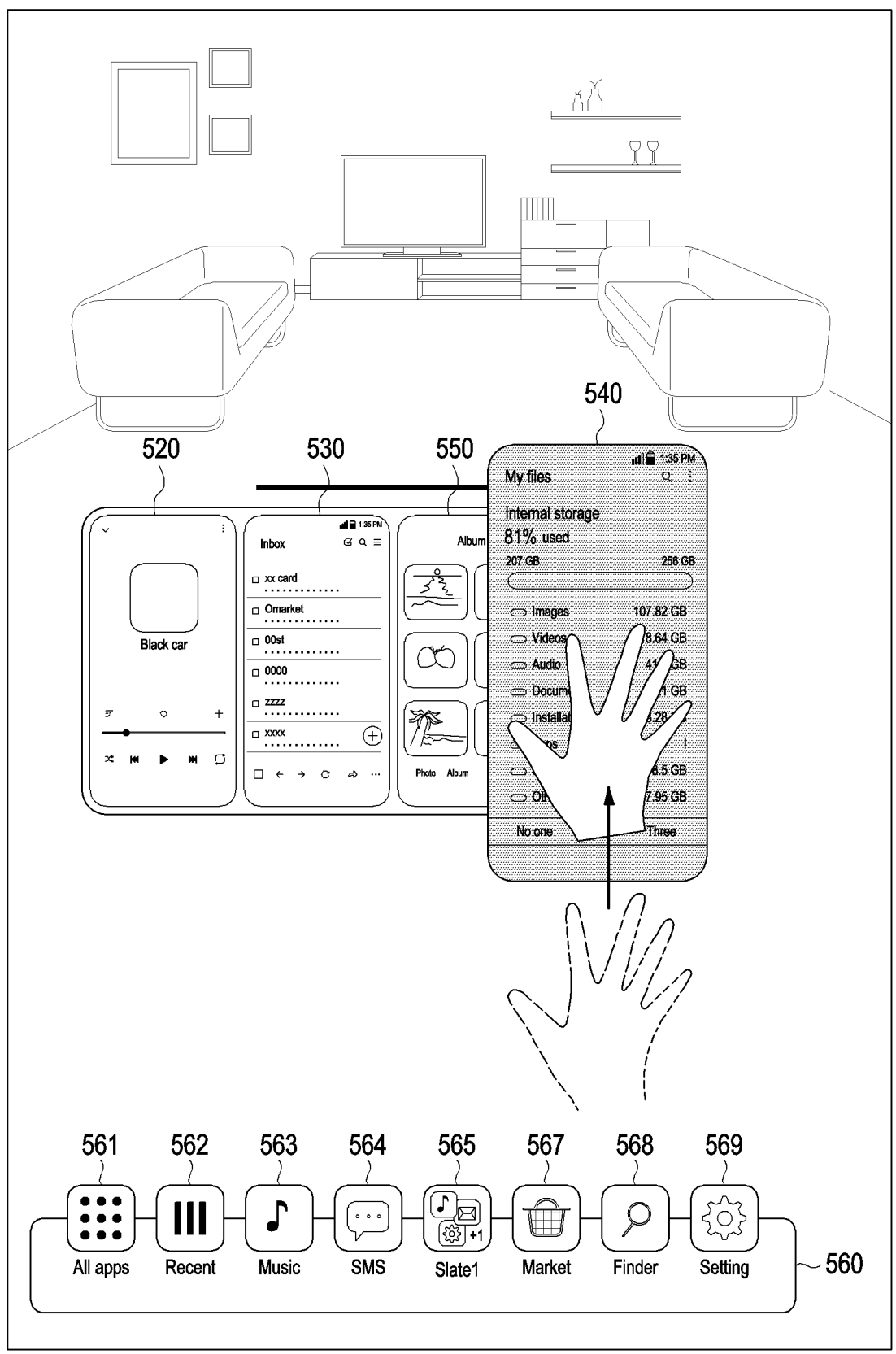
Figure 14C:
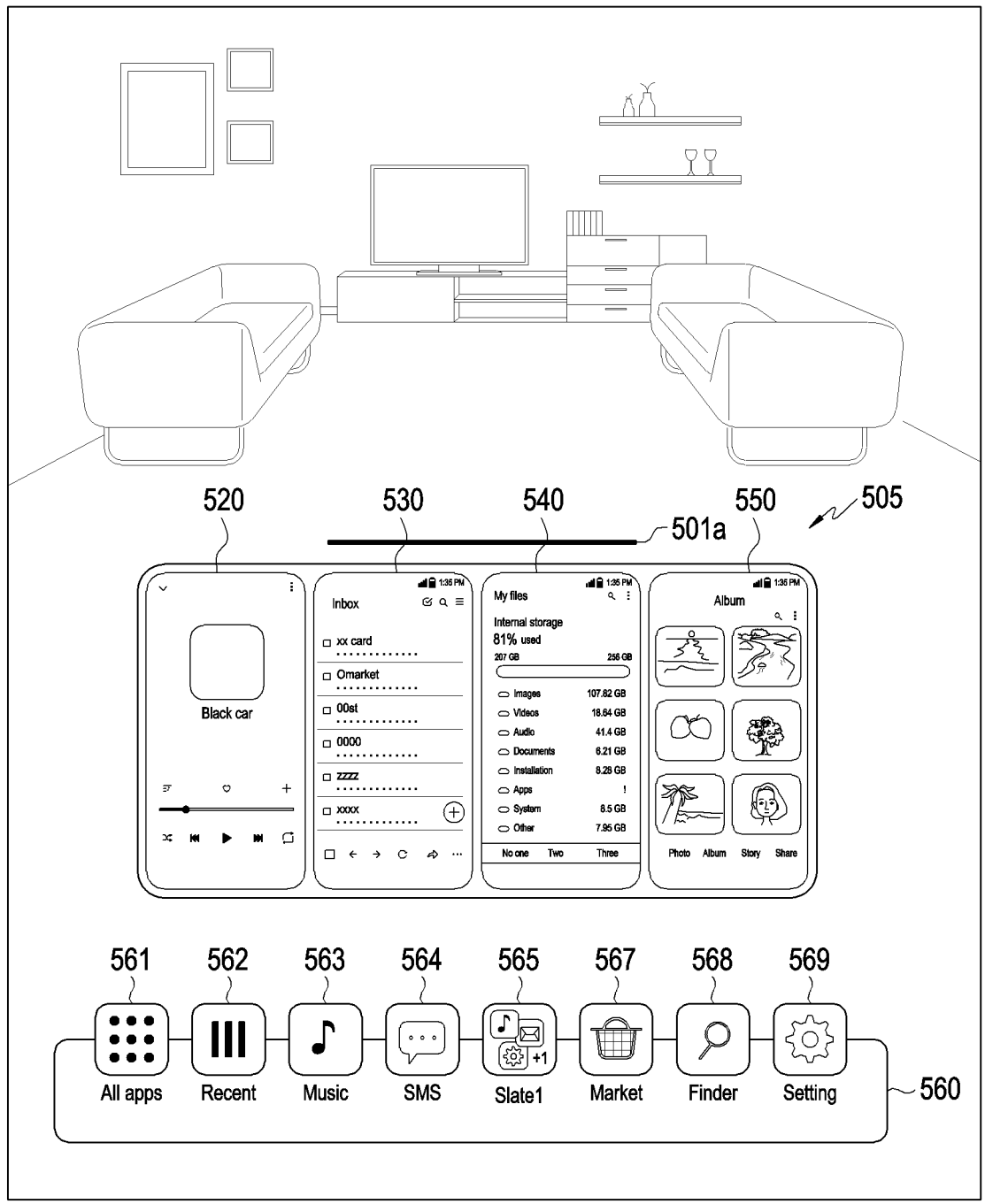

FIGS. 14A, 14B, and 14C illustrate a function or operation described in connection with FIG. 11 in light of a graphic user interface according to various embodiments of the disclosure.

Referring to FIG. 13, according to an embodiment of the disclosure, the wearable device 100 may detect an enlarge gesture to enlarge at least one application execution screen in operation 1310. According to an embodiment of the disclosure, in operation 1320, the wearable device 100 may enlarge and provide at least one application execution screen. Referring to FIG. 14A, according to an embodiment of the disclosure, upon detecting a gesture of gripping a specific application execution screen (e.g., the execution screen 540 of the file application) and moving it toward the user, the wearable device 100 may determine that the enlarge gesture to enlarge the at least one application execution screen (e.g., the execution screen 540 of the file application) is detected. According to an embodiment of the disclosure, upon detecting the enlarge gesture, the wearable device 100 may control the display module 150 to allow the at least one selected application execution screen (e.g., the execution screen 540 of the file application) to be enlarged in a designated ratio and shown as shown in FIG. 14A.

According to an embodiment of the disclosure, in operation 1330, the wearable device 100 may detect a shrink gesture to shrink the at least one enlarged application execution screen (e.g., the execution screen 540 of the file application). According to an embodiment of the disclosure, in operation 1340, the wearable device 100 may provide the shrunken application execution screen in the position where the at least one application execution screen used to be placed. Referring to FIG. 14B, according to an embodiment of the disclosure, the wearable device 100 may detect a gesture of pushing back the enlarged specific application execution screen. Referring to FIG. 14C, according to an embodiment of the disclosure, the wearable device 100 may provide the application execution screen, shrunken back (e.g., in the size before enlarged), in the position where the at least one application execution screen used to be placed. According to an embodiment of the disclosure, although the specific application execution screen is enlarged, the wearable device 100 may maintain the display state of the icon (e.g., the eighth icon 565) corresponding to the slate including the specific application execution screen, as the same state before the specific application execution screen is enlarged.

Figure 15:
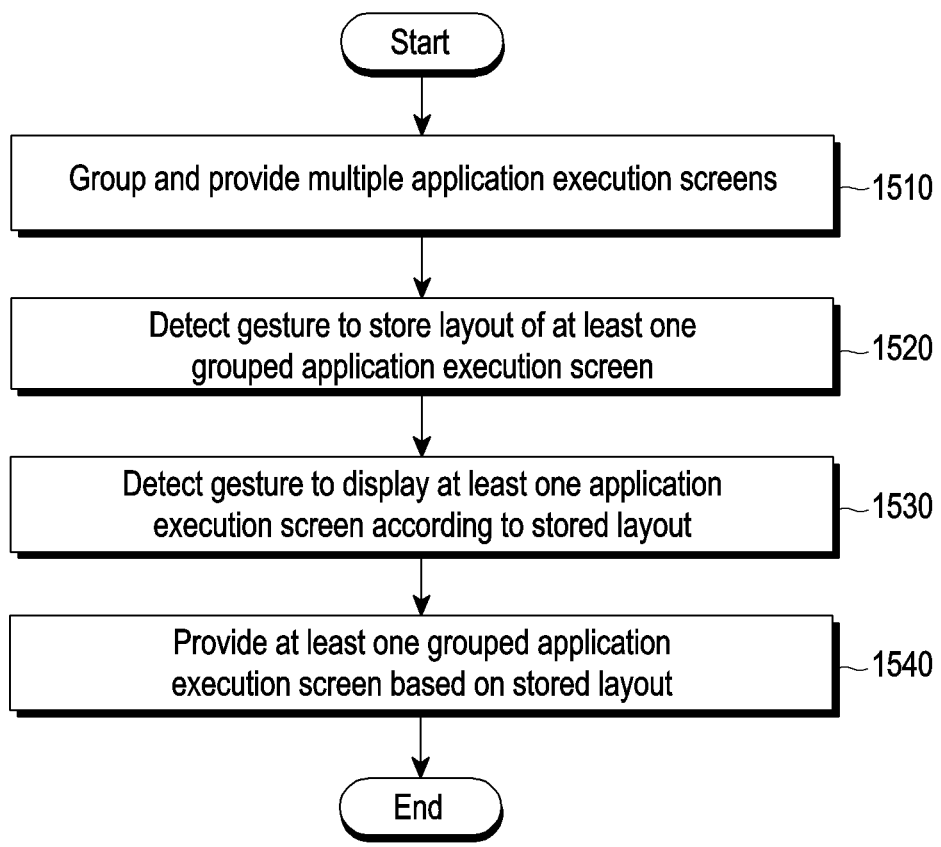
FIG. 15 illustrates a function or operation of storing a layout of at least one application execution screen and providing at least one grouped application execution screen according to the layout stored based on a user input by a wearable device according to an embodiment of the disclosure.

FIG. 15 illustrates a function or operation of storing a layout of at least one application execution screen and providing at least one grouped application execution screen according to the layout stored based on a user input by a wearable device 100 according to an embodiment of the disclosure.

FIGS. 16A, 16B, 16C, and 16D illustrate a function or operation described in connection with FIG. 15 in light of a graphic user interface according to various embodiments of the disclosure.

Figure 16A:
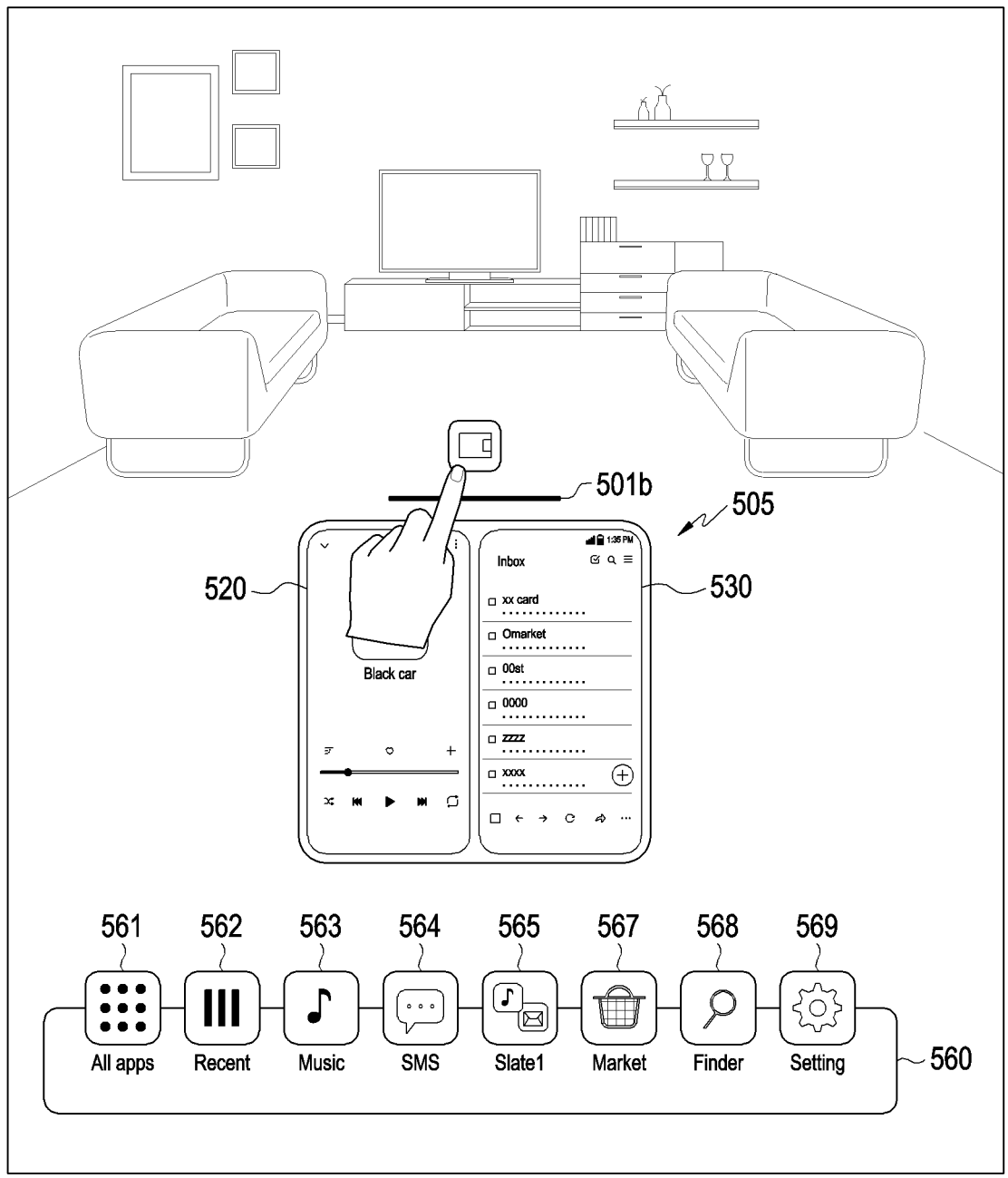
FIGS. 16A, 16B, 16C, and 16D illustrate a function or operation described in connection with FIG. 15 in light of a graphic user interface according to various embodiments of the disclosure.

Referring to FIG. 15, according to an embodiment of the disclosure, the wearable device 100 may group and provide a plurality of application execution screens in operation 1510. According to an embodiment of the disclosure, in operation 1520, the wearable device 100 may detect a gesture for storing a layout of at least one grouped application execution screen. Referring to FIG. 16A, according to an embodiment of the disclosure, the wearable device 100 may detect a selection input for the visual object configured to store the layout of the at least one application execution screen being shown through the wearable device 100, in a state in which the plurality of application execution screens (e.g., the music application execution screen 520 and the email application execution screen 530) are shown. According to an embodiment of the disclosure, upon detecting a selection input for the visual object configured to store the layout of the at least one application execution screen being shown through the wearable device 100, the wearable device 100 may control the display module 150 to allow the visual object (e.g., the eighth icon 565) corresponding to the layout to be shown on the application tray 560.

Figure 16B:
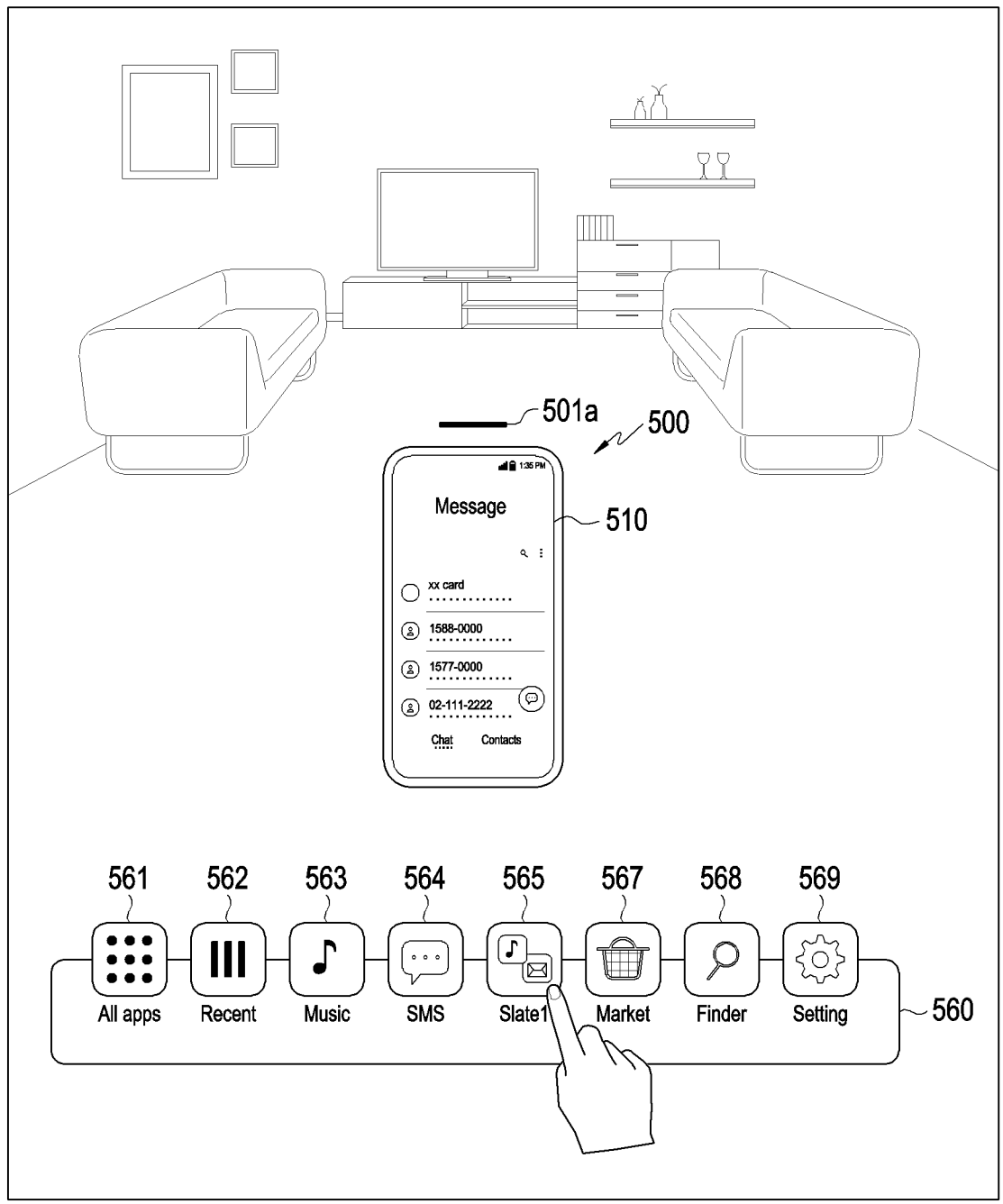
Figure 16C:
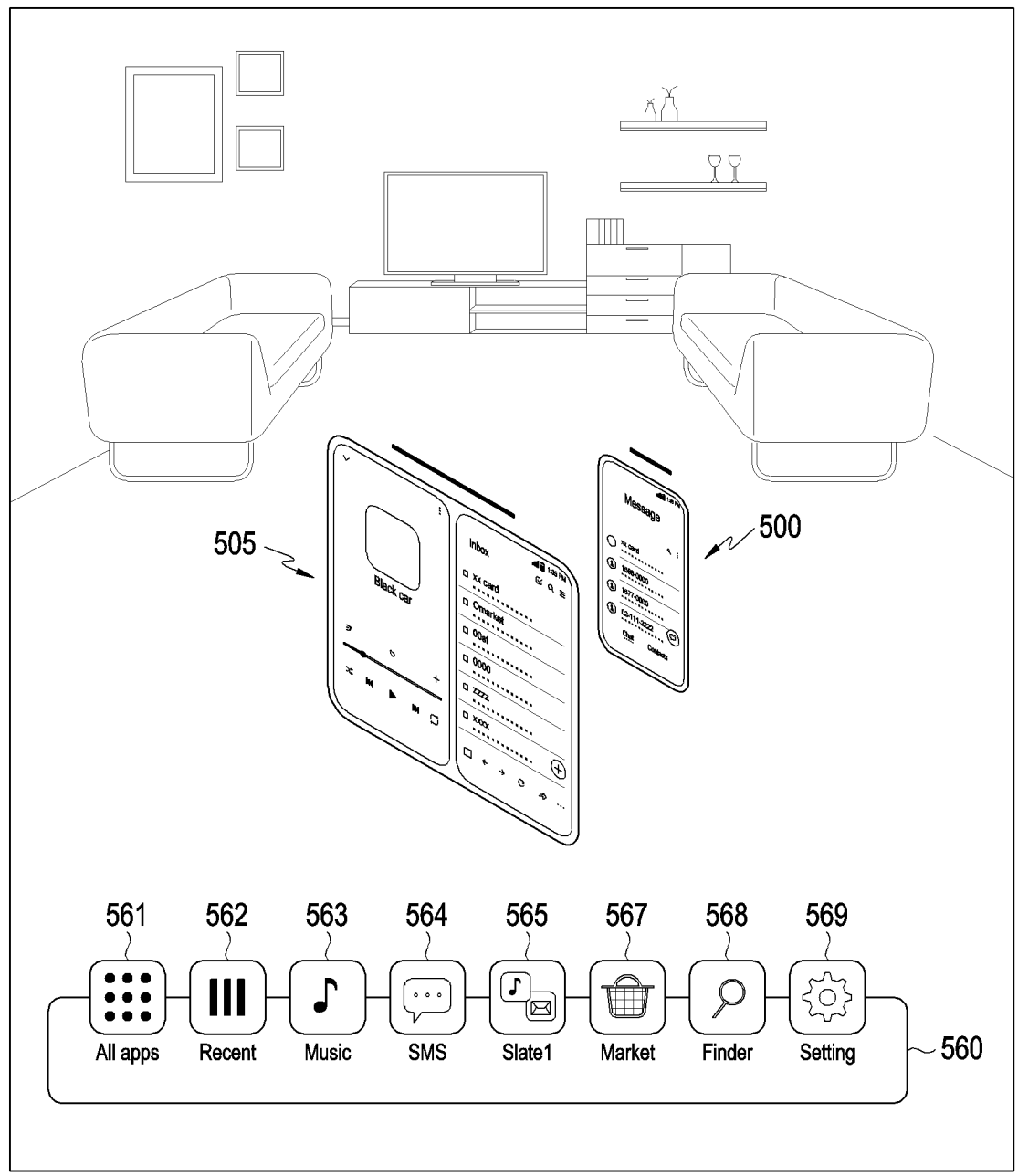

According to an embodiment of the disclosure, in operation 1530, the wearable device 100 may detect a gesture for displaying at least one application execution screen (e.g., the music application execution screen 520 and the email application execution screen 530) according to the stored layout. Referring to FIG. 16B, according to an embodiment of the disclosure, the wearable device 100 may detect a user input for selecting the visual object (e.g., the eighth icon 565) corresponding to the layout.

Figure 16D:
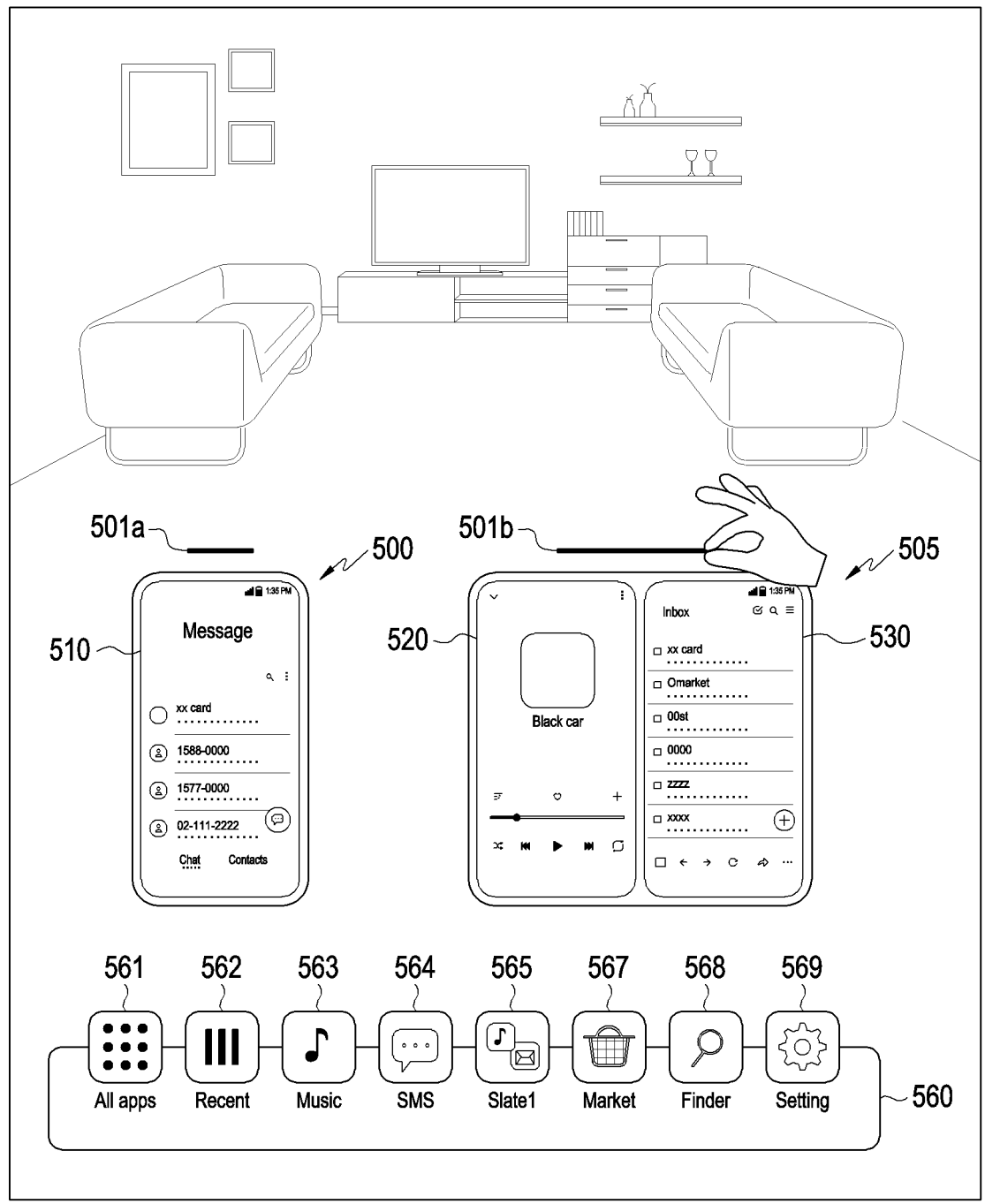

According to an embodiment of the disclosure, in operation 1540, the wearable device 100 may provide the at least one grouped application execution screen based on the stored layout. According to an embodiment of the disclosure, upon detecting a gesture according to operation 1530 when another slate is shown, the wearable device 100 may control the display module 150 to allow the at least one grouped application execution screen to be shown overlapping the application execution screen (e.g., the SMS application execution screen 510) included in the other slate while moving back and/or shrinking in a designated ratio the application execution screen (e.g., the SMS application execution screen 510) included in the other slate. Referring to FIG. 16D, according to an embodiment of the disclosure, the wearable device 100 may detect a gesture to move the at least one grouped application execution screen through the second handler 501b. In this case, according to an embodiment of the disclosure, the wearable device 100 may control the display module 150 to allow the application execution screen (e.g., the SMS application execution screen 510), which has been moved back and/or shrunken, to be moved back to the position before moved and/or enlarged back and shown in the size before shrunken.

Figure 17:
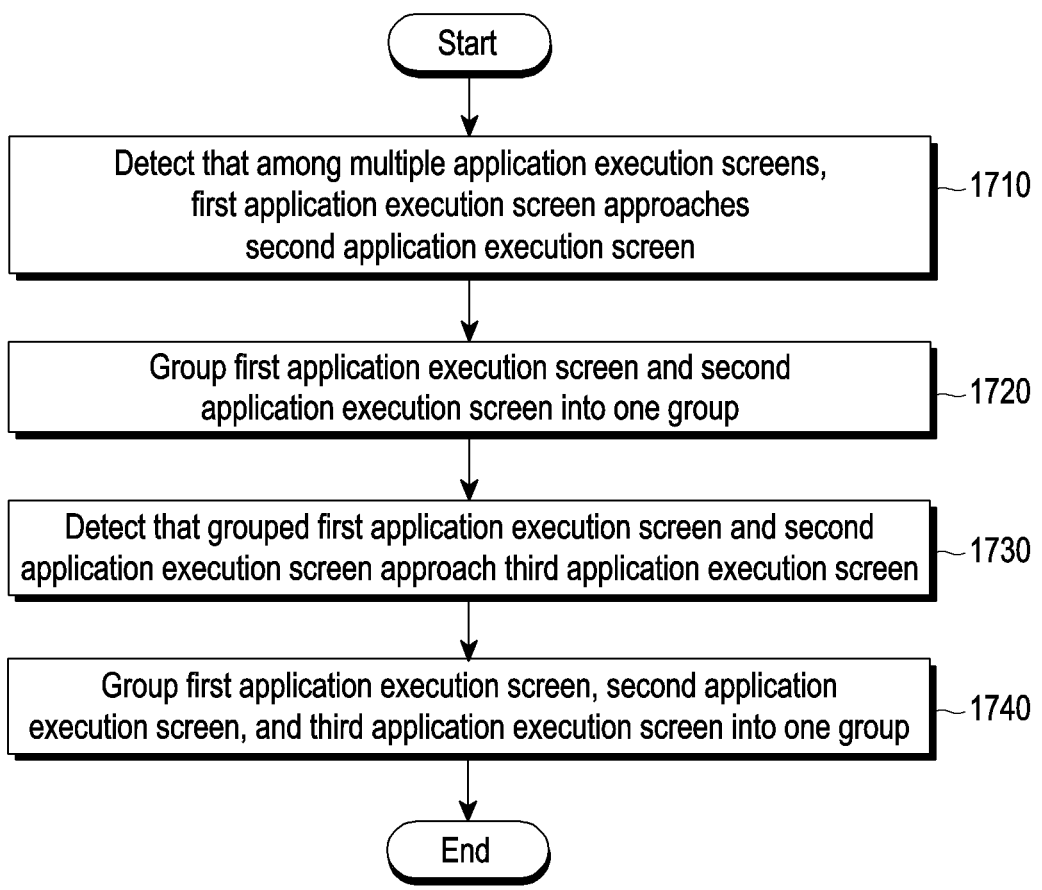
FIG. 17 illustrates a function or operation of grouping a plurality of application execution screens in a same group based on a movement of the application execution screen by a wearable device according to an embodiment of the disclosure.

FIG. 17 illustrates a function or operation of grouping a plurality of application execution screens in a same group based on a movement of the application execution screen by a wearable device according to an embodiment of the disclosure.

FIGS. 18A, 18B, 18C, 18D, and 18E illustrate a function or operation described in connection with FIG. 17 in light of a graphic user interface according to various embodiments of the disclosure.

Figure 18A:
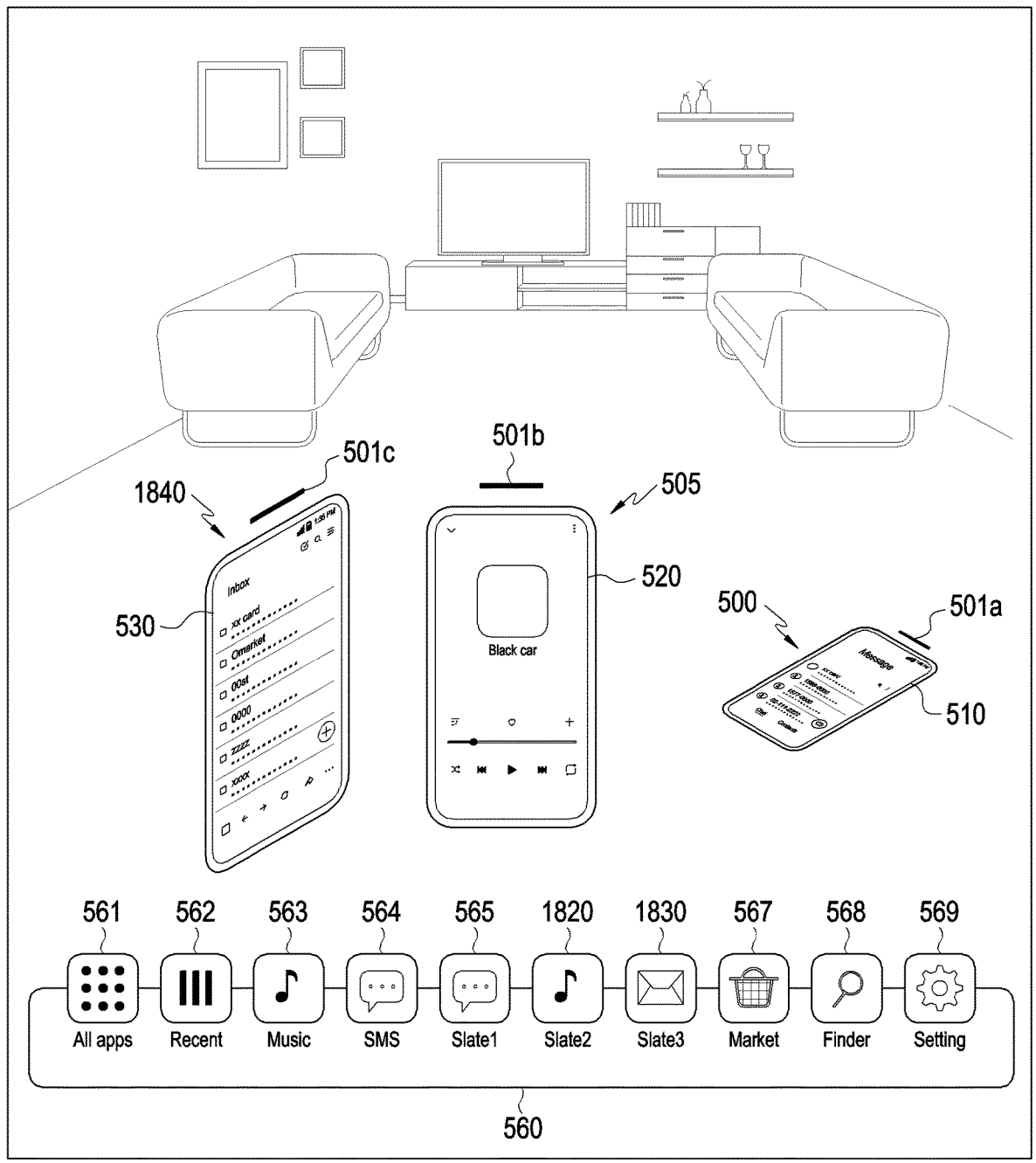
FIGS. 18A, 18B, 18C, 18D, and 18E illustrate a function or operation described in connection with FIG. 17 in light of a graphic user interface according to various embodiments of the disclosure.
Figure 18B:
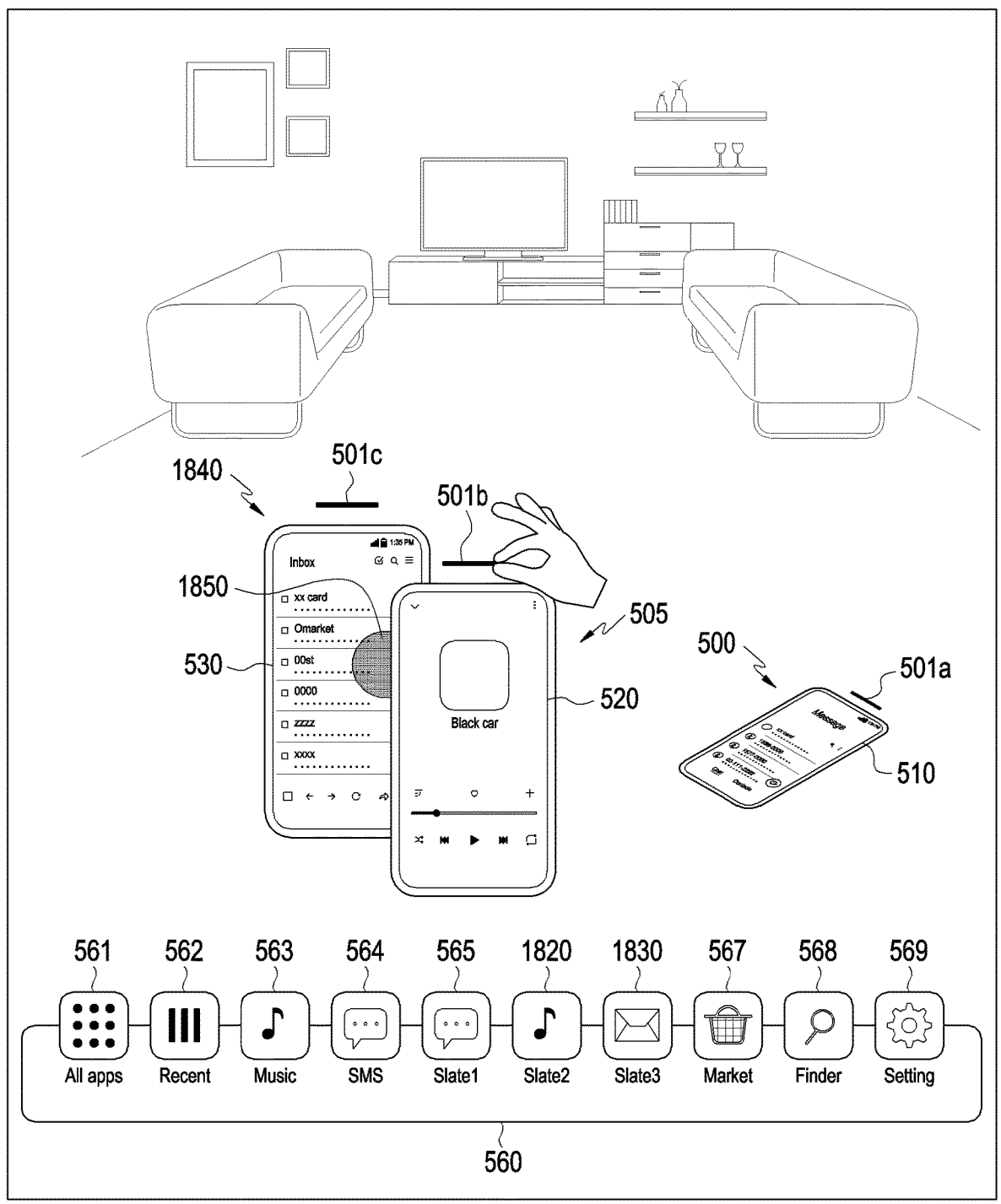

Referring to FIG. 17, according to an embodiment of the disclosure, in operation 1710, the wearable device 100 may detect that among the plurality of application execution screens, the first application execution screen (e.g., music application execution screen 520) approaches the second application execution screen (e.g., the email application execution screen 530). Referring to FIG. 18A, according to an embodiment of the disclosure, the wearable device 100 may control the display module 150 to allow a plurality of slates (e.g., the first slate 500, the second slate 505, and the fourth slate 1840) respectively including the plurality of application execution screens to be shown. Referring to FIG. 18B, according to an embodiment of the disclosure, the wearable device 100 may detect a gesture to move a specific slate (e.g., the second slate 505) to approach another specific slate (e.g., the fourth slate 1840) (e.g., to fall within a predesignated distance) using the second handler 501b. According to an embodiment of the disclosure, upon detecting the movement of the specific slate (e.g., the second slate 505) to approach the other specific slate (e.g., the fourth slate 1840) (e.g., to fall within the predesignated distance), the wearable device 100 may control the display module 150 to show a predesignated visual effect (e.g., a visual element including a designated color) 1850 indicating that the application execution screens respectively included in the slates may be formed into one group.

Figure 18C:
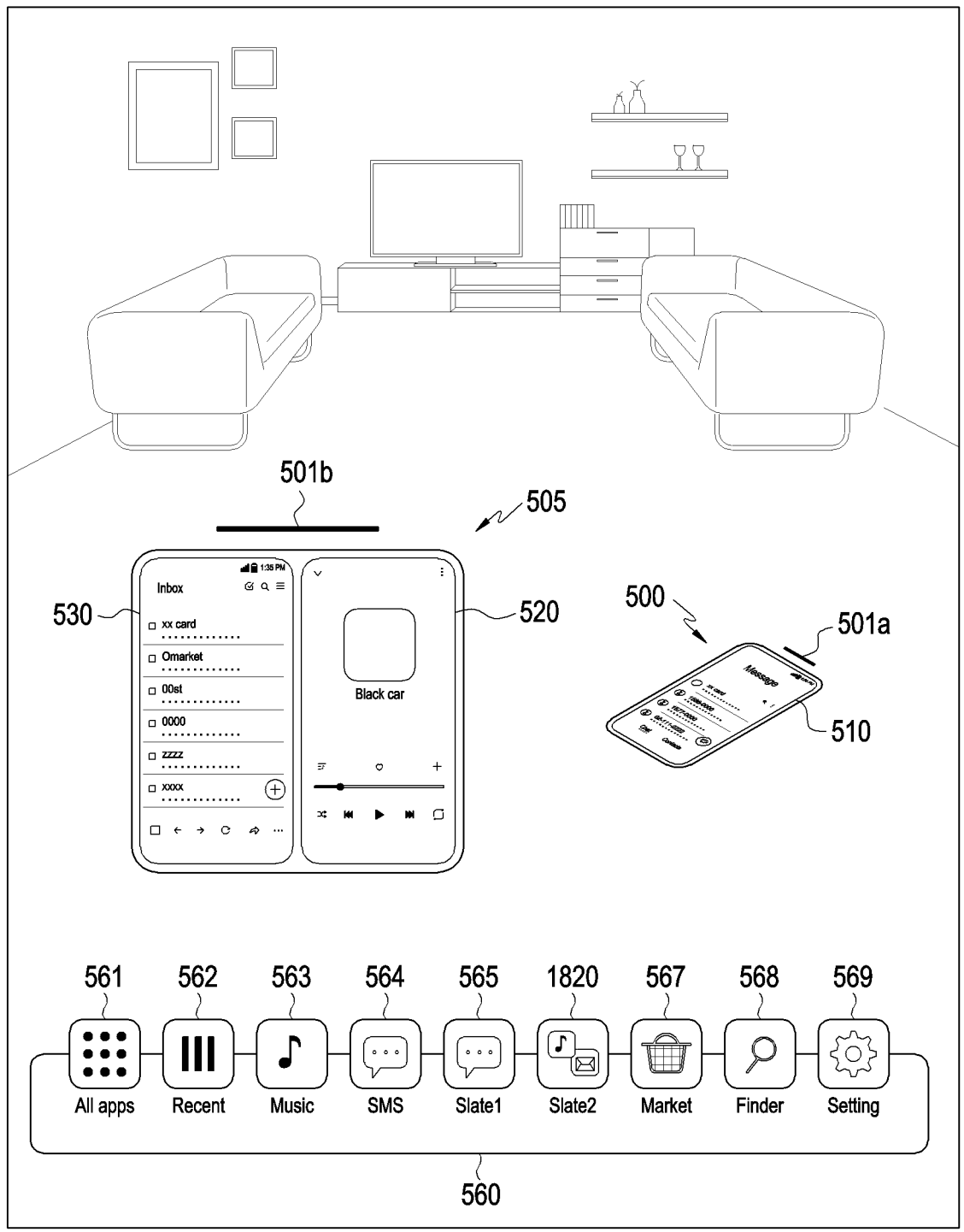

According to an embodiment of the disclosure, in operation 1720, the wearable device 100 may group the first application execution screen (e.g., music application execution screen 520) and the second application execution screen (e.g., email application execution screen 530) into one group. Referring to FIG. 18C, for example, according to an embodiment of the disclosure the wearable device 100 may control the display module 150 to allow the first application execution screen (e.g., music application execution screen 520) and the second application execution screen (e.g., email application execution screen 530) to be included and shown in one slate (e.g., the second slate 505). According to an embodiment of the disclosure, upon detecting that the specific slate (e.g., the second slate 505) approaches the other specific slate (e.g., the fourth slate 1840) (e.g., falling within a predesignated distance), the wearable device 100 may group the first application execution screen (e.g., music application execution screen 520) and the second application execution screen (e.g., email application execution screen 530) automatically (e.g., regardless of whether the user's selection input is received). Alternatively, according to another embodiment of the disclosure, the wearable device 100 may control the display module 150 to show a guide message inquiring whether to set the plurality of application execution screens to be included in one group, along with the predesignated visual effect 1850. In this case, according to an embodiment of the disclosure, the wearable device 100 may group the first application execution screen (e.g., music application execution screen 520) and the second application execution screen (e.g., email application execution screen 530) according to a user input to the guide message.

Figure 18D:
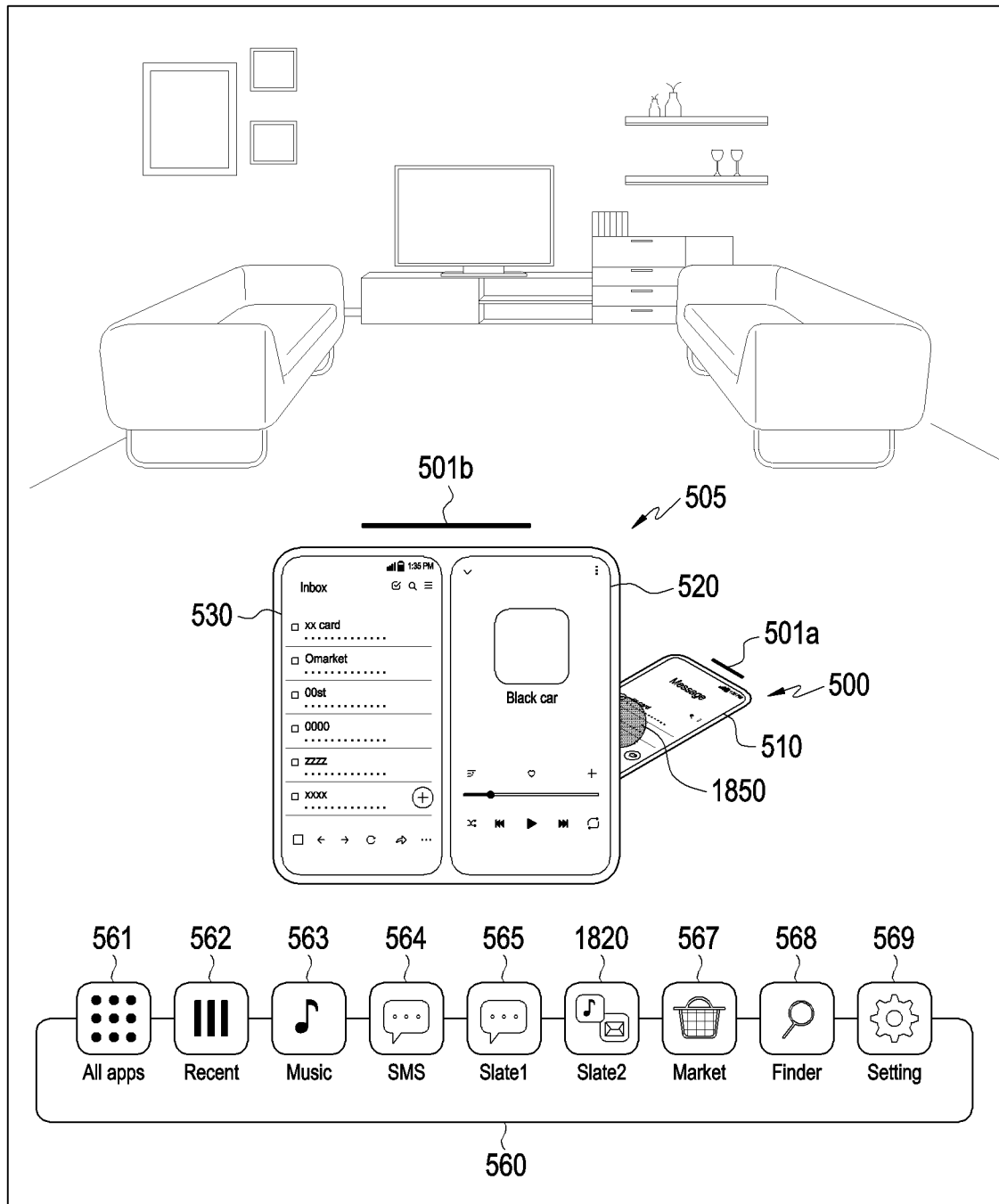

According to an embodiment of the disclosure, in operation 1730, the wearable device 100 may detect that the first application execution screen (e.g., music application execution screen 520) and second application execution screen (e.g., email application execution screen 530), which have been grouped, are moved to approach a third application execution screen (e.g., the SMS application execution screen 510). Referring to FIG. 18D, according to an embodiment of the disclosure, the wearable device 100 may detect that the first application execution screen (e.g., music application execution screen 520) and the second application execution screen (e.g., email application execution screen 530), which have been grouped, are moved to approach the third application execution screen (e.g., the SMS application execution screen 510). In this case, according to an embodiment of the disclosure, the wearable device 100 may control the display module 150 to allow a predesignated visual effect 1850 to be shown.

Figure 18E:
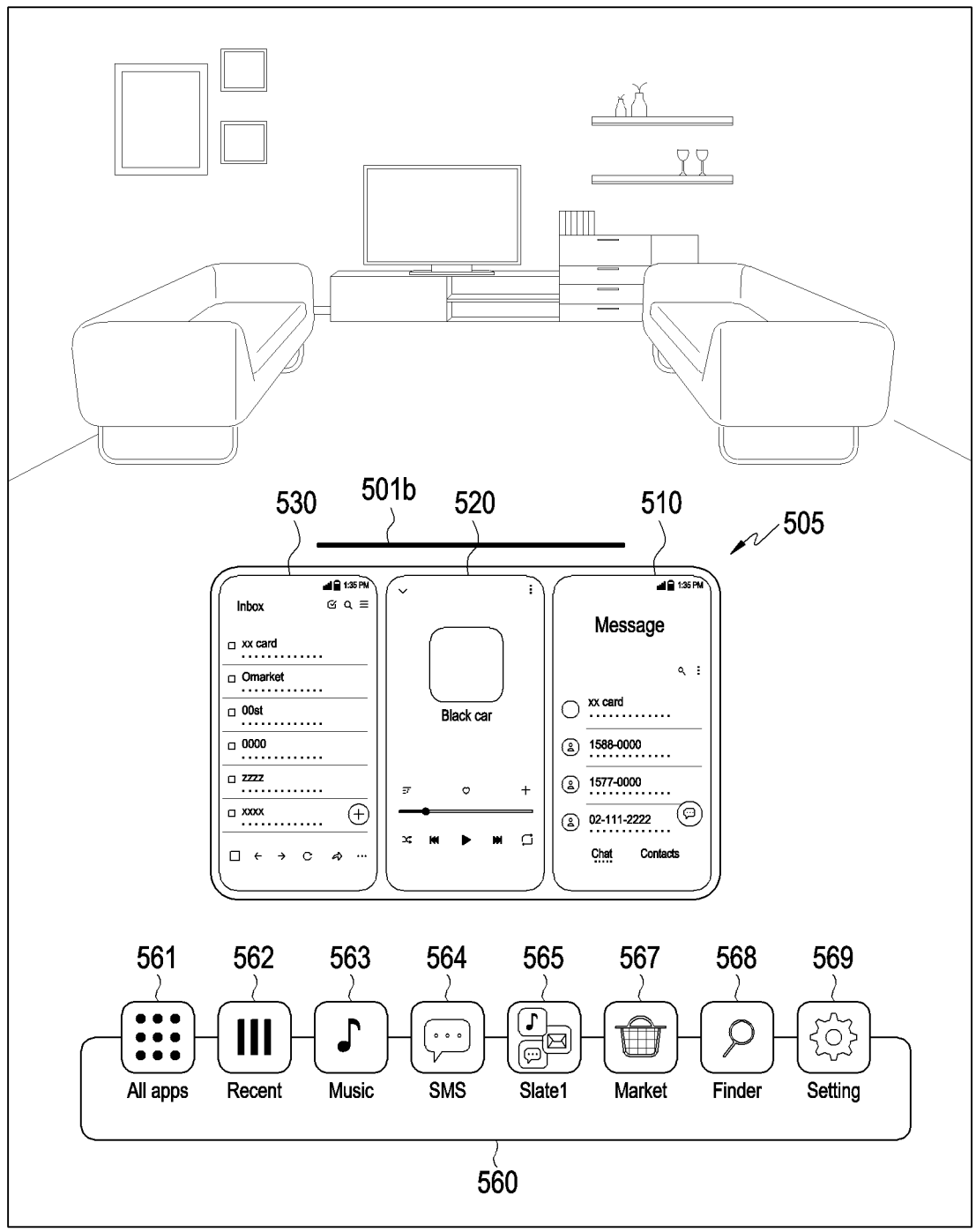

According to an embodiment of the disclosure, in operation 1740, the wearable device 100 may group the first application execution screen (e.g., music application execution screen 520), the second application execution screen (e.g., email application execution screen 530), and the third application execution screen (e.g., the SMS application execution screen 510) into one group. Referring to FIG. 18E, according to an embodiment of the disclosure, the wearable device 100 may control the display module 150 to allow the first application execution screen (e.g., music application execution screen 520), the second application execution screen (e.g., email application execution screen 530), and the third application execution screen (e.g., the SMS application execution screen 510) to be included and shown in the same slate.

Figure 19:
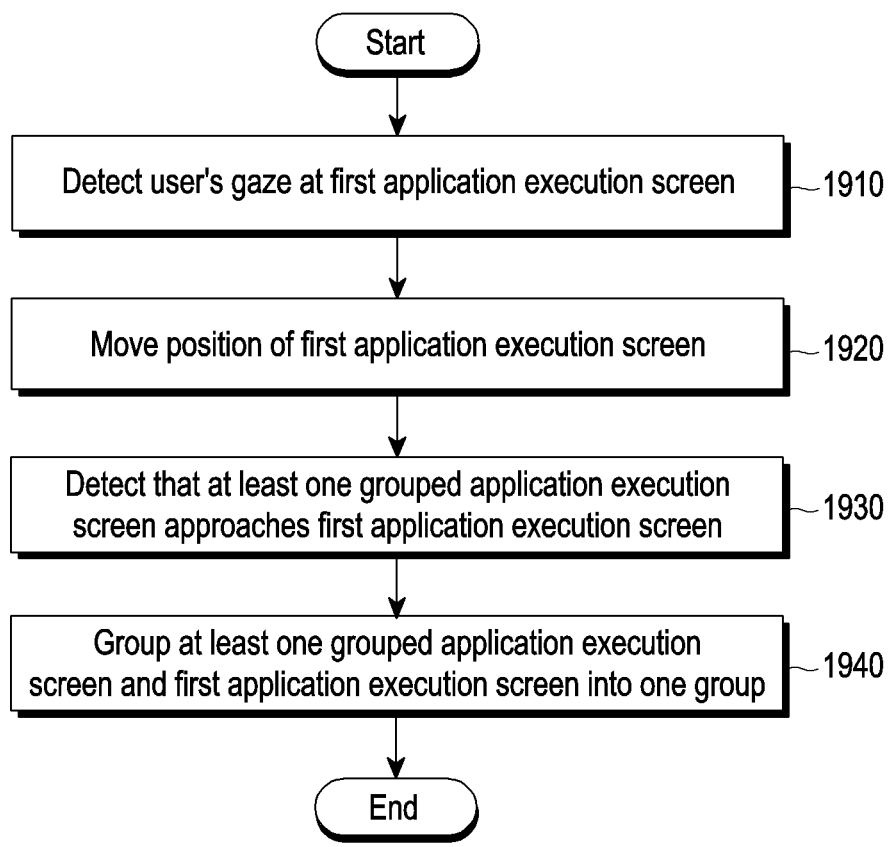
FIG. 19 illustrates a function or operation of moving a position in which at least one application execution screen is shown according to a user input (e.g., a user's gaze) and grouping the at least one moved application execution screen and at least one different application execution screen into one group by a wearable device according to an embodiment of the disclosure.

FIG. 19 illustrates a function or operation of moving a position in which at least one application execution screen is shown according to a user input (e.g., a user's gaze) and grouping the at least one moved application execution screen and at least one different application execution screen into one group by a wearable device according to an embodiment of the disclosure.

FIGS. 20A, 20B, 20C, and 20D illustrate a function or operation described in connection with FIG. 19 in light of a graphic user interface according to various embodiments of the disclosure.

Figure 20A:
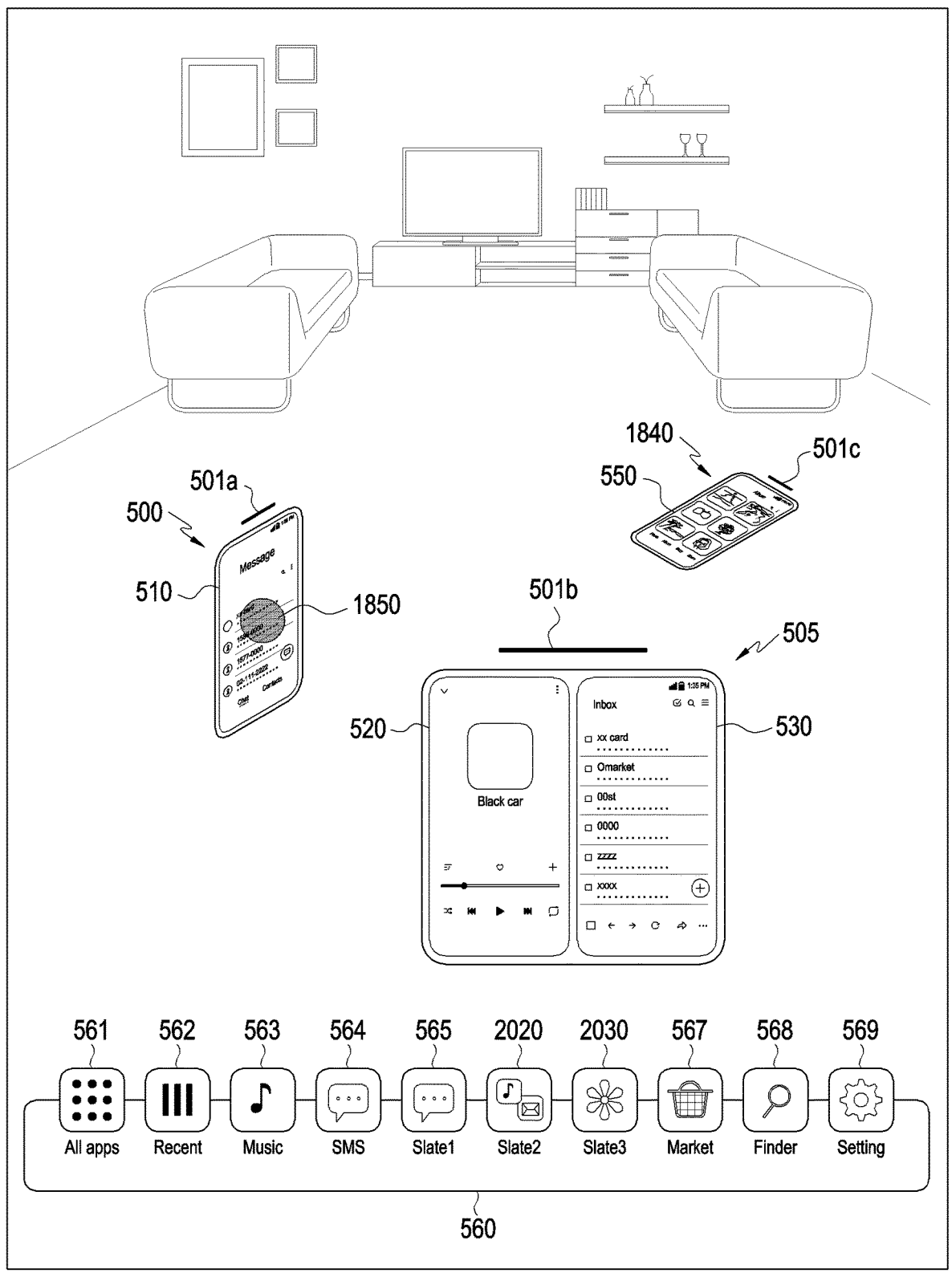
FIGS. 20A, 20B, 20C, and 20D illustrate a function or operation described in connection with FIG. 19 in light of a graphic user interface according to various embodiments of the disclosure.
Figure 20B:
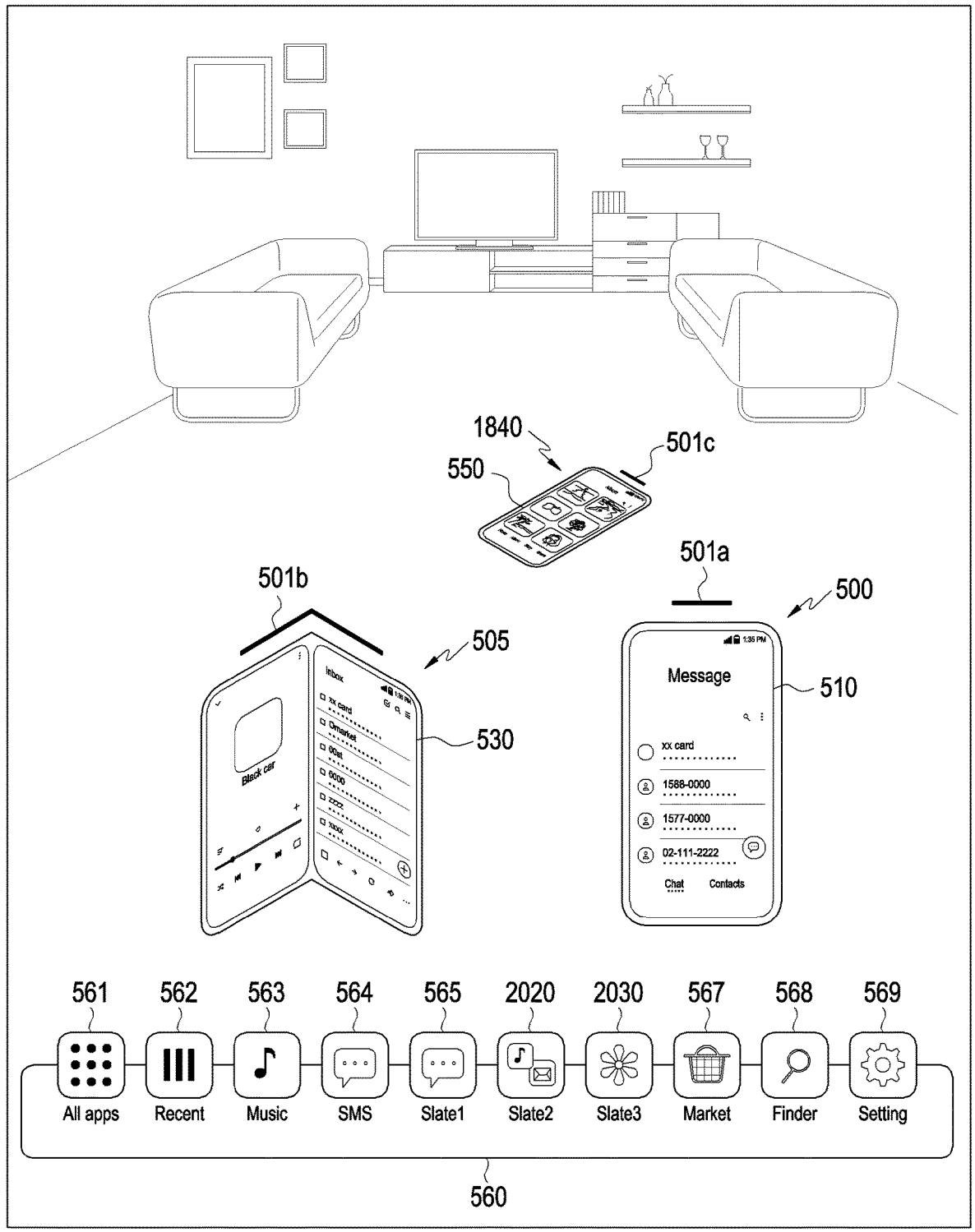

Referring to FIG. 19, according to an embodiment of the disclosure, the wearable device 100 may detect the user's gaze at the first application execution screen (e.g., SMS application execution screen 510) in operation 1910. According to an embodiment of the disclosure, in operation 1920, the wearable device 100 may move the position of the first application execution screen. Referring to FIG. 20A, according to an embodiment of the disclosure, upon identifying that the direction of the user's gaze is toward the first application execution screen (e.g., SMS application execution screen 510), the wearable device 100 may provide a visual effect 1850 to indicate that the first application execution screen (e.g., SMS application execution screen 510) is selected. Referring to FIG. 20B, in this case, according to an embodiment of the disclosure, the wearable device 100 may control the display module 150 to allow the first application execution screen (e.g., SMS application execution screen 510) to be shown in a moved position.

Figure 20C:
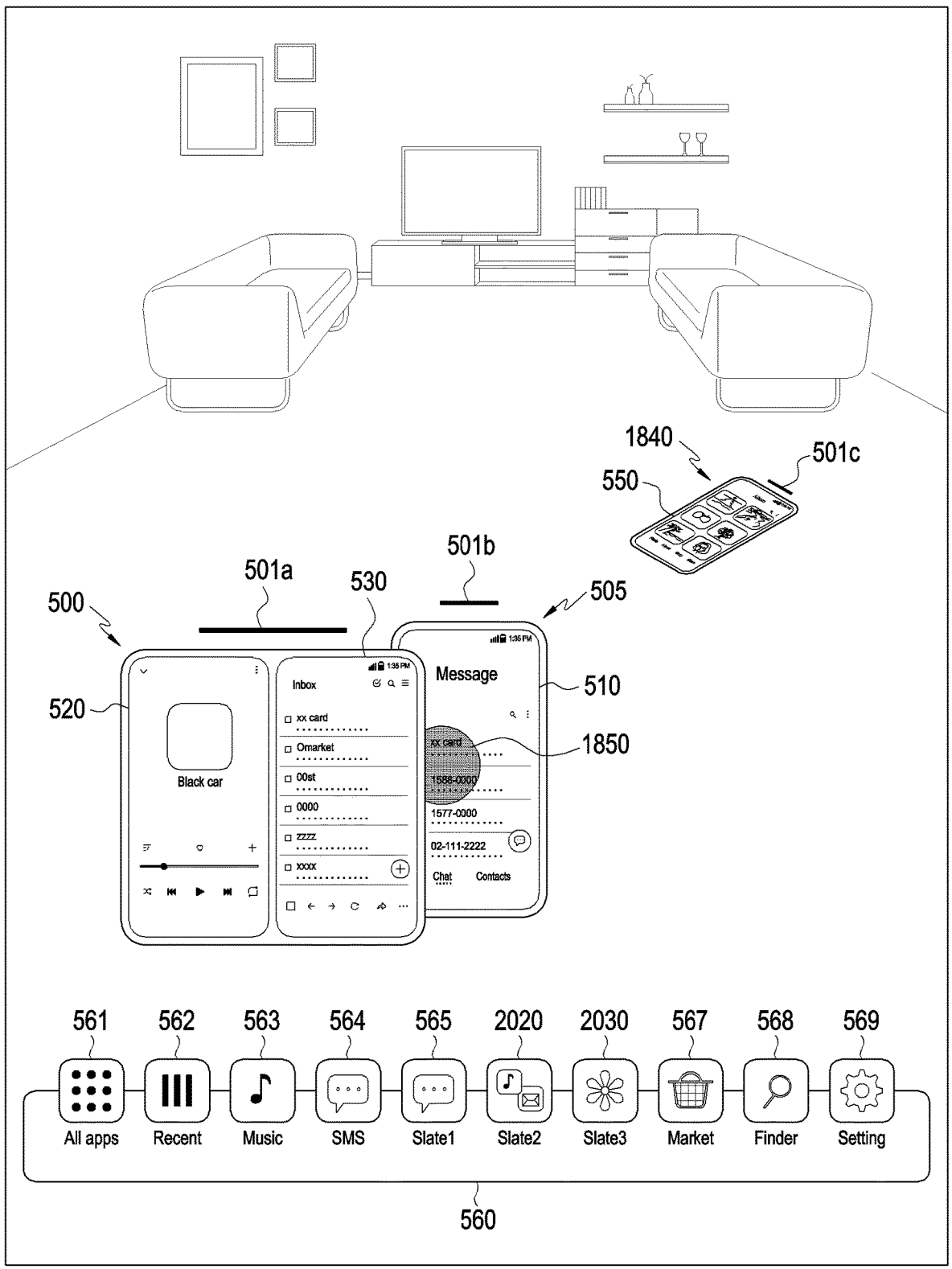
Figure 20D:
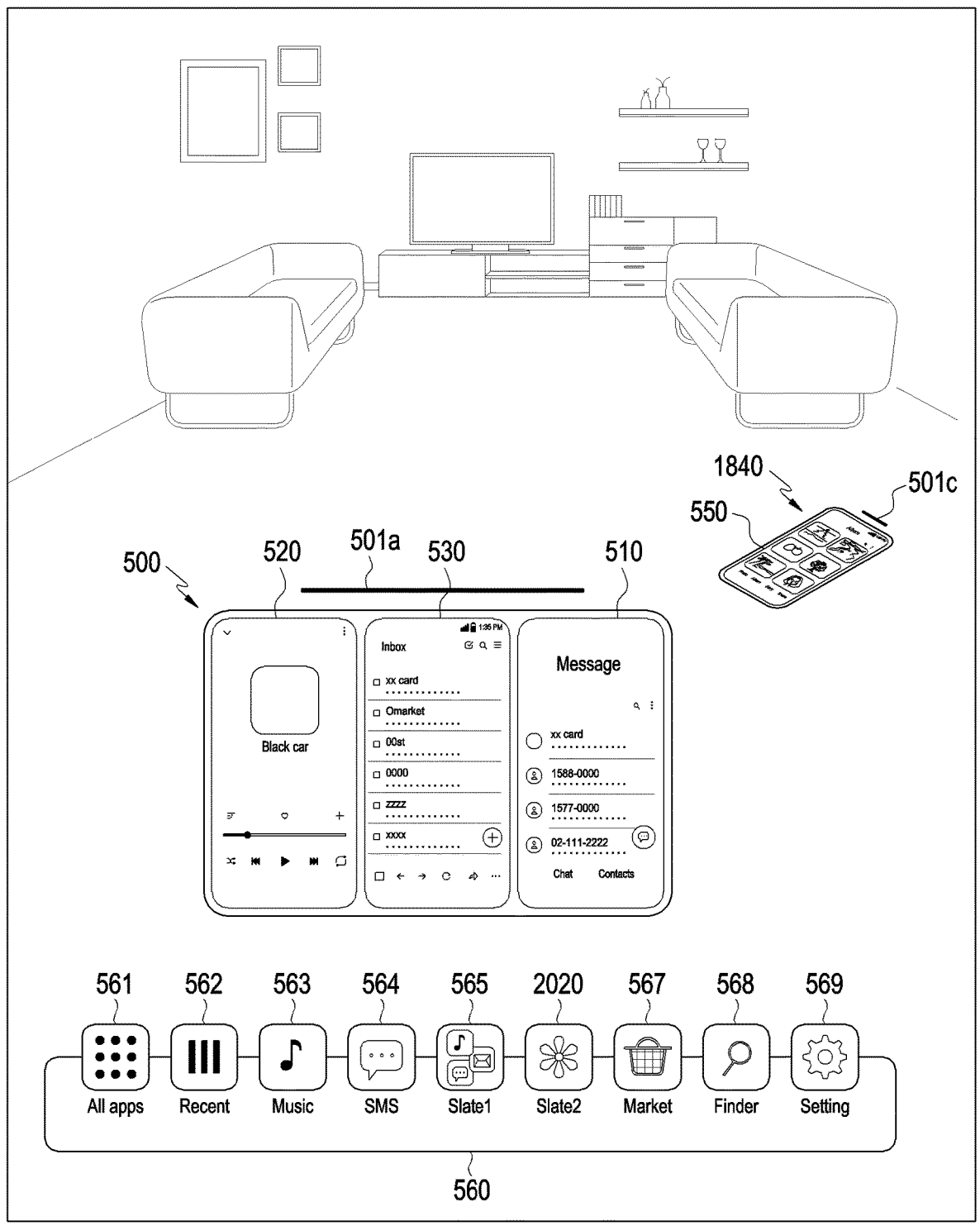

According to an embodiment of the disclosure, in operation 1930, the wearable device 100 may detect that the first application execution screen (e.g., SMS application execution screen 510) moves closer to the at least one grouped application execution screen. According to an embodiment of the disclosure, in operation 1940, the wearable device 100 may group the at least one grouped application execution screen and the first application execution screen into one group. Referring to FIG. 20C, according to an embodiment of the disclosure, the wearable device 100 may detect that the first application execution screen (e.g., SMS application execution screen 510) moves closer to the at least one grouped application execution screen. In this case, a visual effect 1850 may be shown according to an embodiment of the disclosure. Referring to FIG. 20D, according to an embodiment of the disclosure, the wearable device 100 may control the display module 150 to allow the at least one grouped application execution screen and the first application execution screen (e.g., SMS application execution screen 510) to be grouped and shown in one group.

Figure 21:
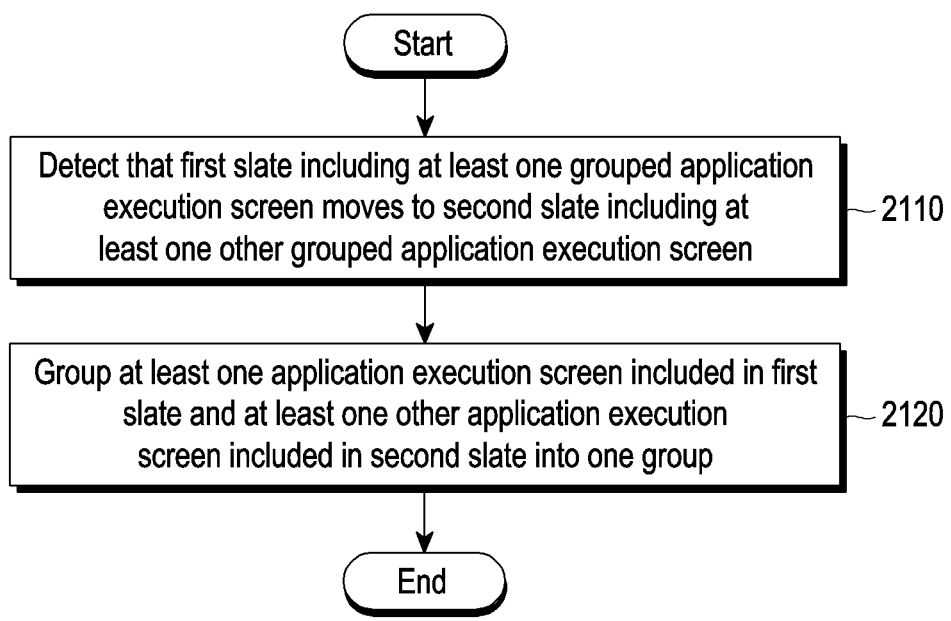
FIG. 21 illustrates a function or operation of grouping at least one grouped application execution screen and at least one different grouped application execution screen into a same group by a wearable device according to an embodiment of the disclosure.

FIG. 21 illustrates a function or operation of grouping at least one grouped application execution screen and at least one different grouped application execution screen into the same group by a wearable device 100 according to an embodiment of the disclosure.

Figure 22A:
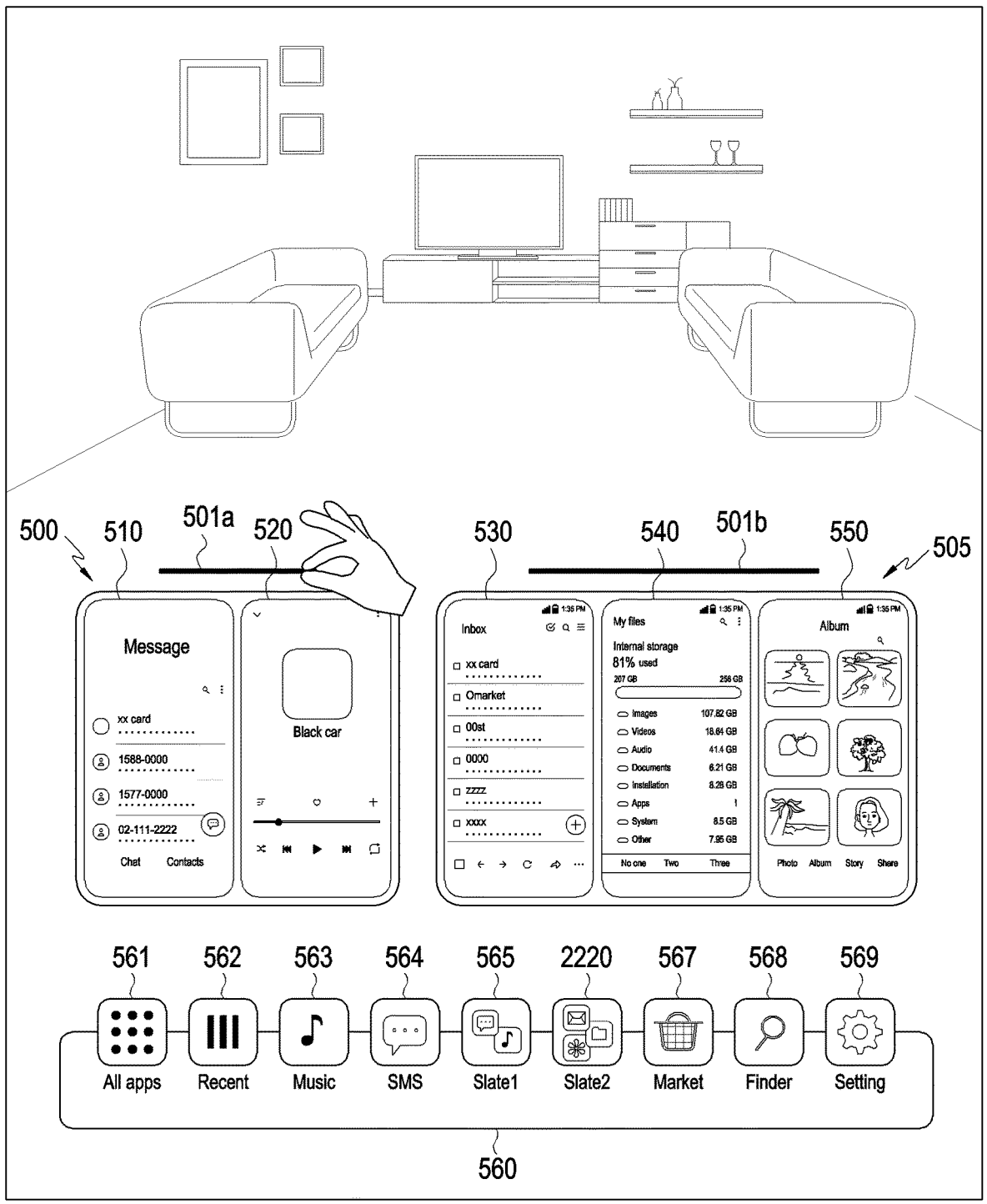
FIGS. 22A, 22B, and 22C illustrate a function or operation described in connection with FIG. 21 in light of a graphic user interface according to various embodiments of the disclosure.
Figure 22B:
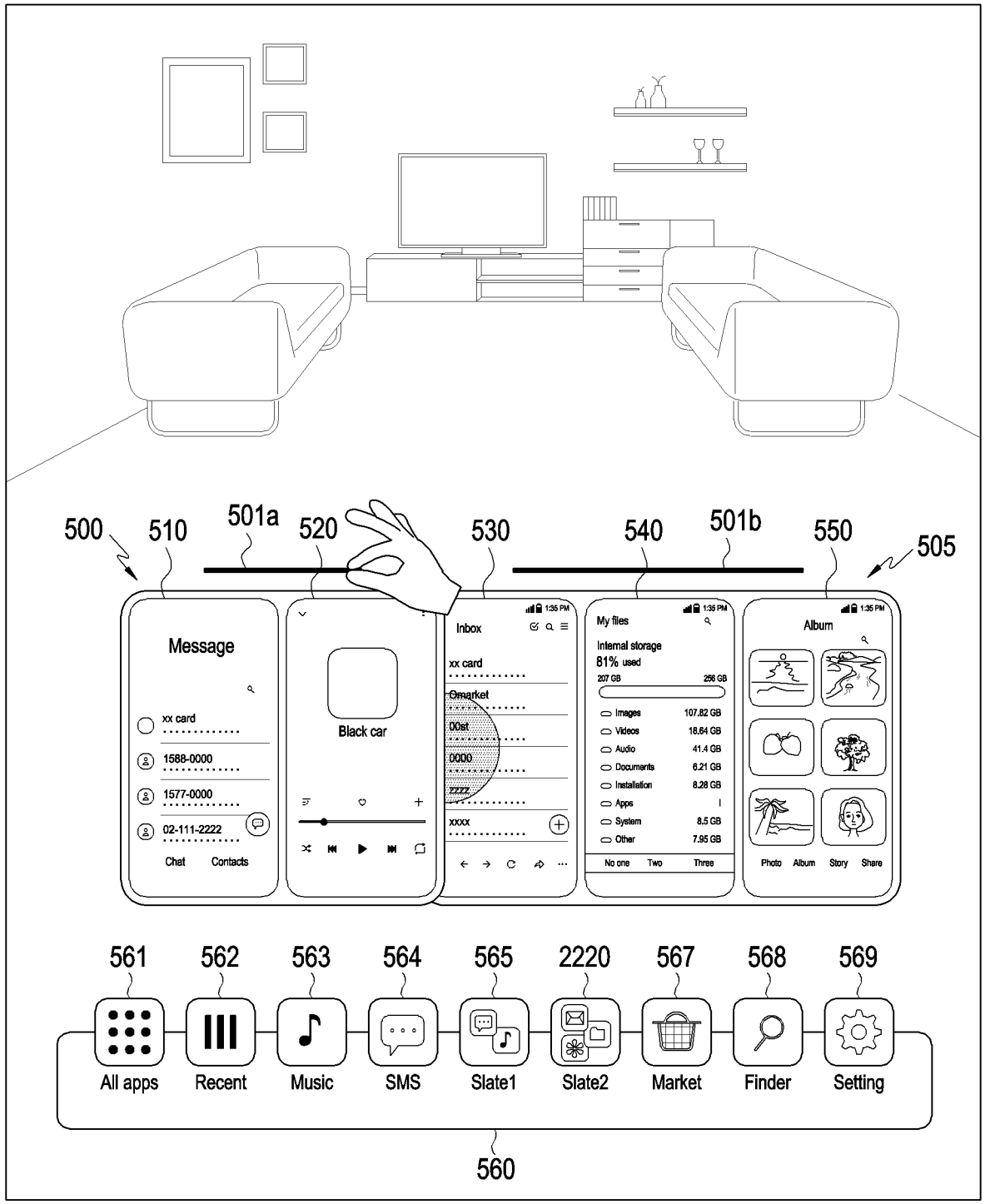
Figure 22C:
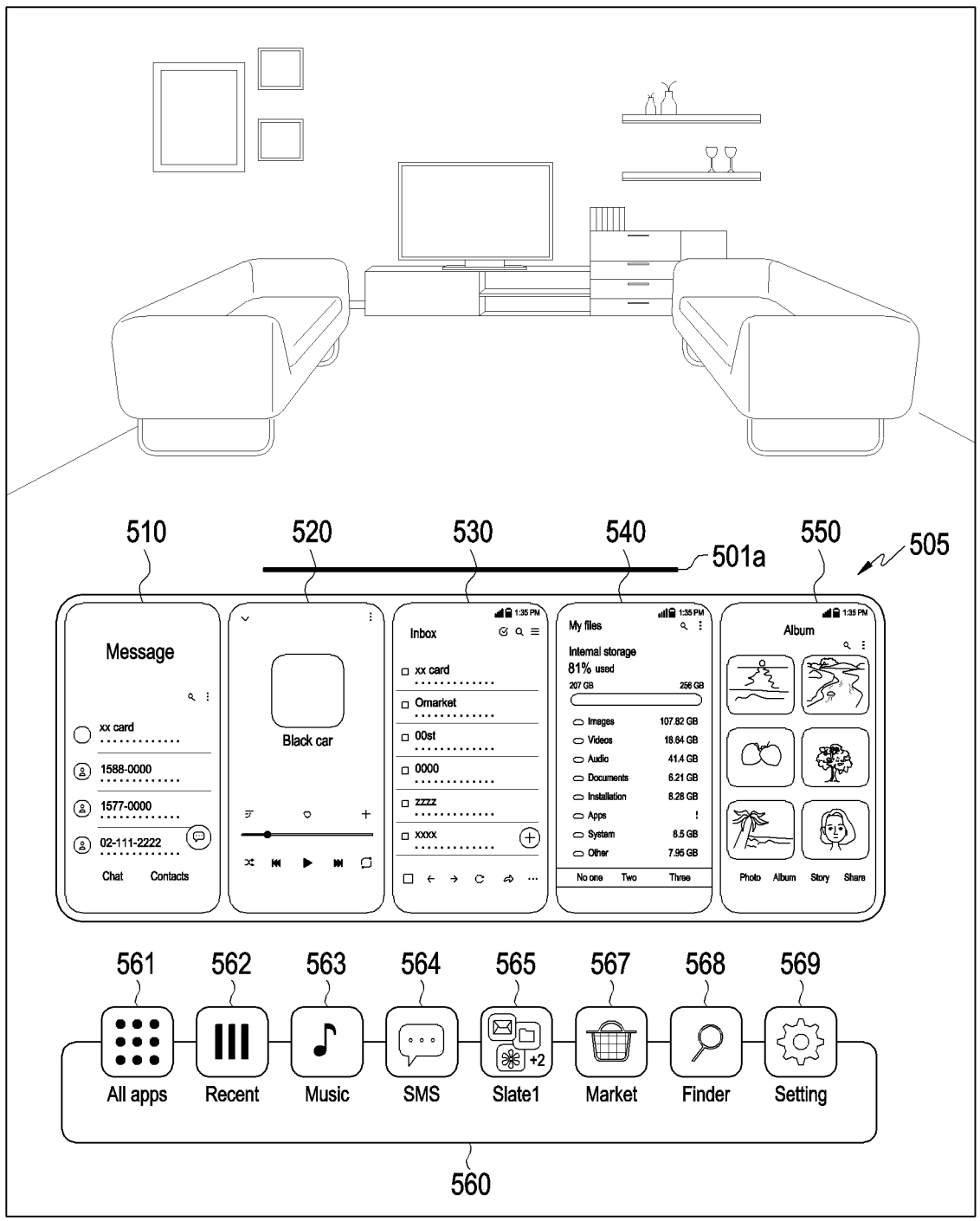

FIGS. 22A, 22B, and 22C illustrate a function or operation described in connection with FIG. 21 in light of a graphic user interface according to various embodiments of the disclosure.

Referring to FIG. 21, according to an embodiment of the disclosure, in operation 2110, the wearable device 100 may detect that the first slate including at least one grouped application execution screen is moved to the second slate including at least one other grouped application execution screen. Referring to FIG. 22A, according to an embodiment of the disclosure, the wearable device 100 may detect a gesture to grip a specific slate (e.g., the first slate 500). Referring to FIG. 22B, according to an embodiment of the disclosure, the wearable device 100 may detect a gesture to move the specific slate (e.g., the first slate 500).

According to an embodiment of the disclosure, in operation 2120, the wearable device 100 may group the at least one application execution screen included in the first slate and the at least one other application execution screen included in the second slate into one group. Referring to FIG. 22C, according to an embodiment of the disclosure, the wearable device 100 may control the display module 150 to allow the plurality of application execution screens included in each slate (e.g., the first slate 500 and the second slate 505) to be grouped and shown in one group.

Figure 23:
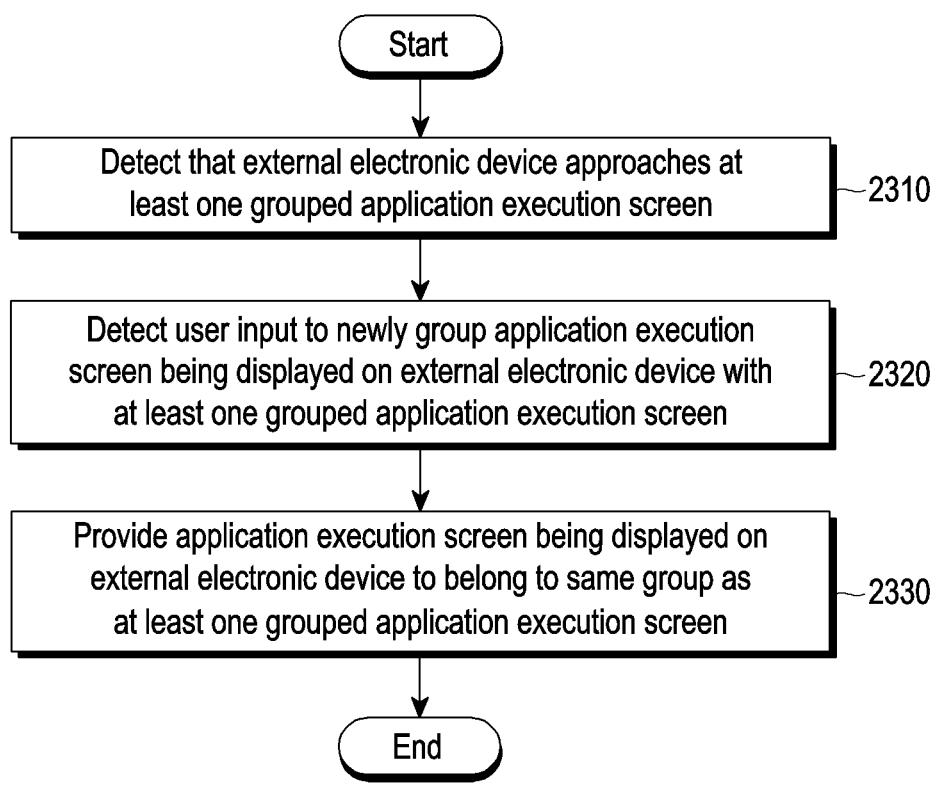
FIG. 23 illustrates a function or operation of controlling a wearable device to show an application execution screen running on an external electronic device operably connected with the wearable device, as a virtual object according to a user's gesture, by the wearable device according to an embodiment of the disclosure.

FIG. 23 illustrates a function or operation of controlling a wearable device to show an application execution screen running on an external electronic device operably connected with a wearable device, as a virtual object according to a user's gesture, by the wearable device according to an embodiment of the disclosure.

Figure 24A:
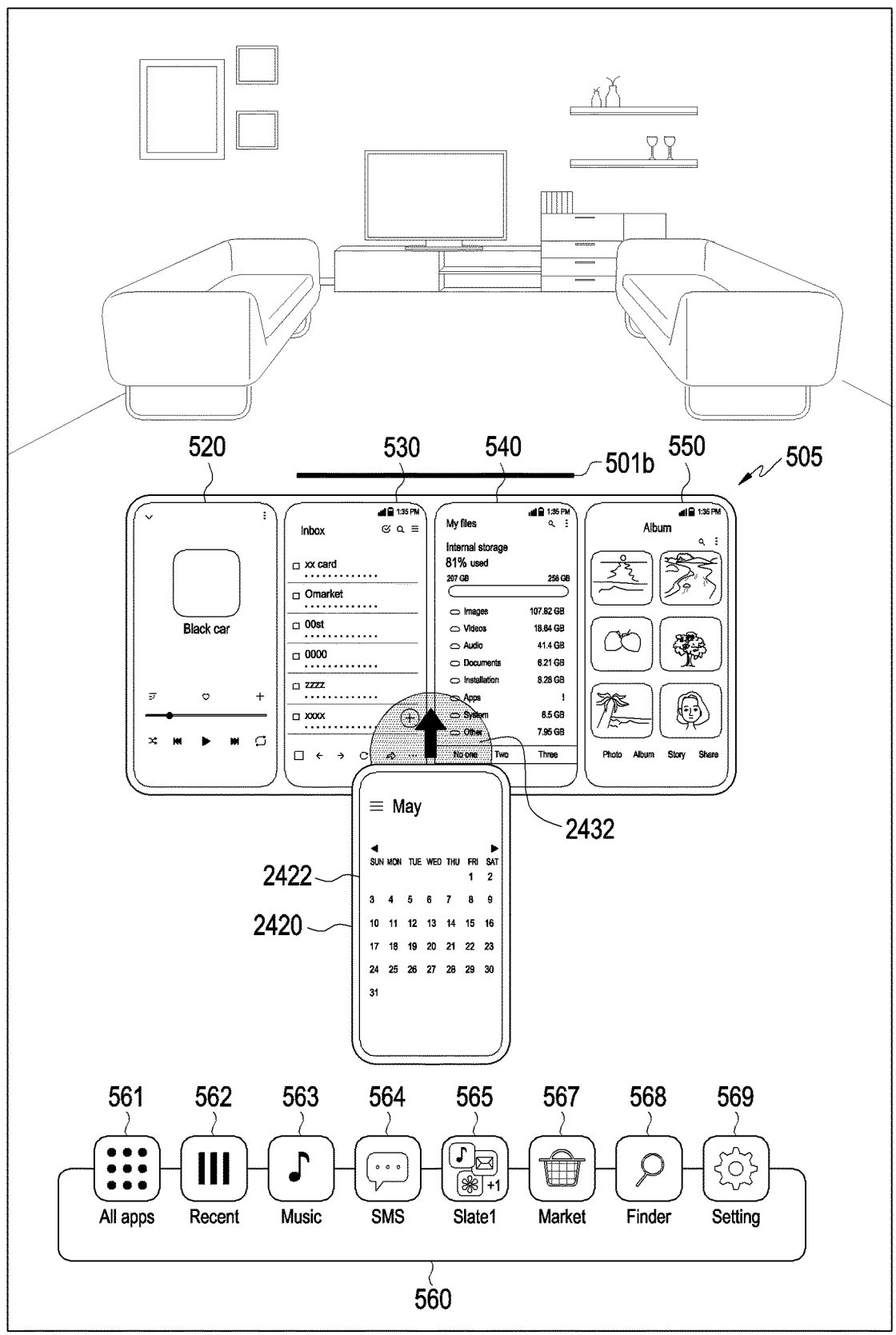
FIGS. 24A, 24B, and 24C illustrate a function or operation described in connection with FIG. 19 in light of a graphic user interface according to various embodiments of the disclosure.
Figure 24B:
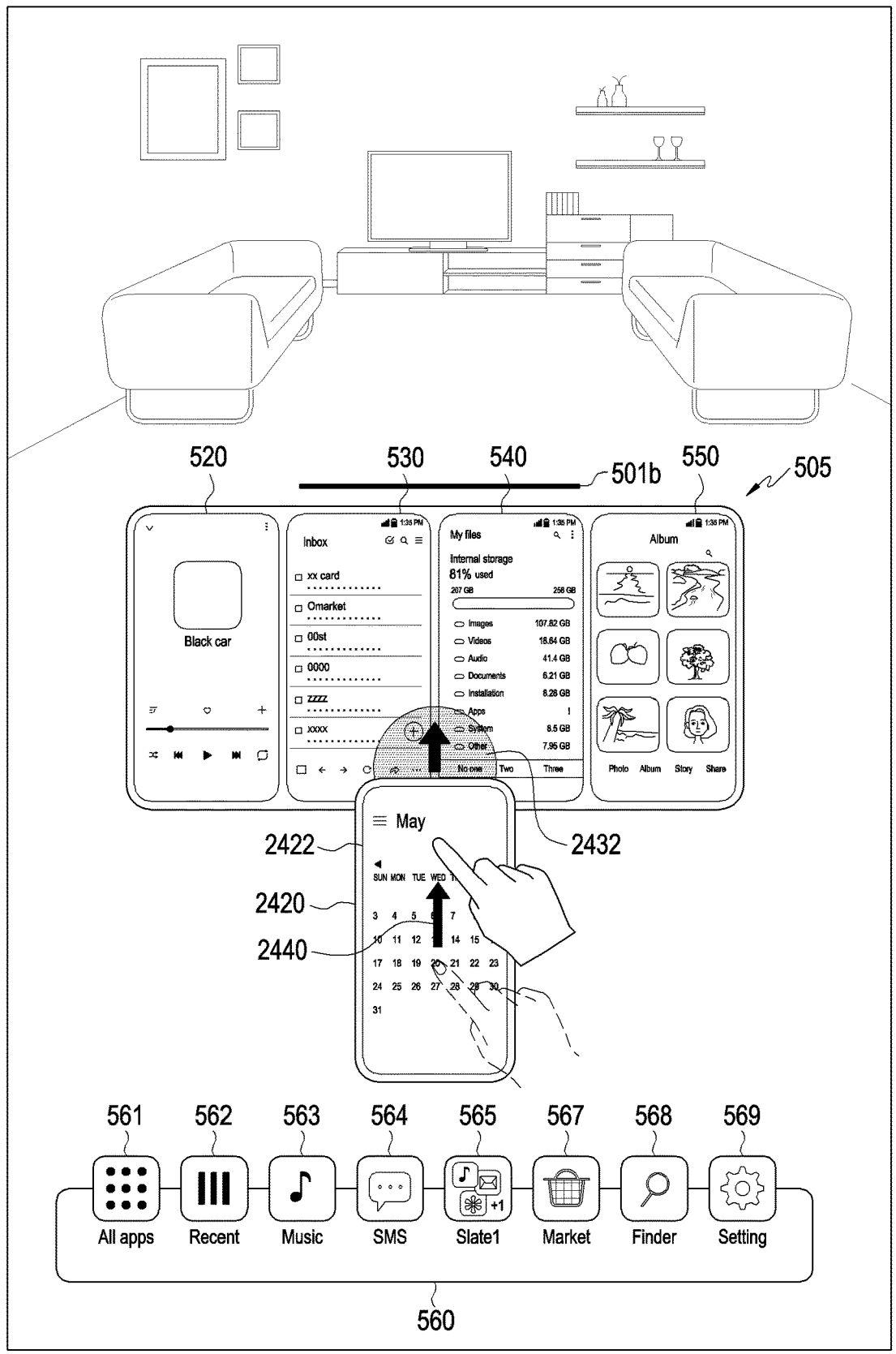
Figure 24C:
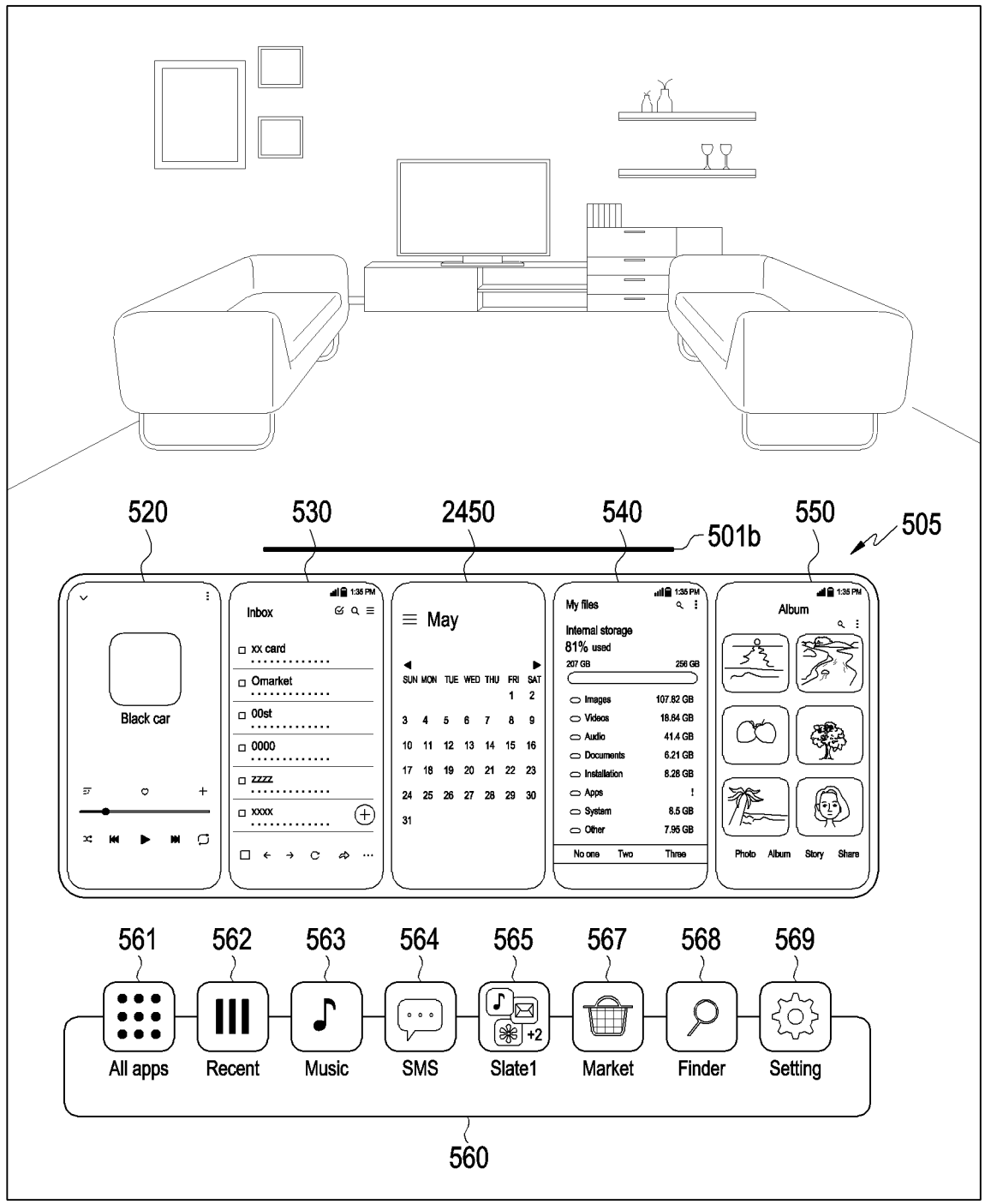

FIGS. 24A, 24B, and 24C illustrate a function or operation described in connection with FIG. 19 in light of a graphic user interface according to various embodiments of the disclosure.

Referring to FIG. 23, according to an embodiment of the disclosure, in operation 2310, the wearable device 100 may detect that an external electronic device (e.g., the second external electronic device 2420) approaches at least one grouped application execution screen (e.g., the music application execution screen 520, the email application execution screen 530, the file application execution screen 540, and/or the gallery application execution screen 550). According to an embodiment of the disclosure, the wearable device 100 may identify the shape of the external electronic device (e.g., the second external electronic device 2420) based on an image obtained by the camera of the wearable device 100 and compare the identified shape with a pre-stored shape, identifying the type of the external electronic device (e.g., the second external electronic device 2420) and/or the real-world position of the external electronic device (e.g., the second external electronic device 2420). According to an embodiment of the disclosure, when the identified shape of the external electronic device overlaps the application execution screen, the wearable device 100 may determine that the external electronic device (e.g., the second external electronic device 2420) has approached the at least one grouped application execution screen (e.g., the music application execution screen 520, the email application execution screen 530, the file application execution screen 540, and/or the gallery application execution screen 550). According to an embodiment of the disclosure, upon determining that the external electronic device (e.g., the second external electronic device 2420) has approached, the wearable device 100 may control the display module 150 to allow a predesignated visual effect (e.g., blur effect and arrow) 2432 to be shown around the external electronic device (e.g., the second external electronic device 2420).

According to an embodiment of the disclosure, in operation 2320, the wearable device 100 may detect a user input (e.g., swipe gesture) to newly group the application execution screen (e.g., the calendar application execution screen 2422) being displayed on the external electronic device (e.g., the second external electronic device 2420) with the at least one grouped application execution screen (e.g., the music application execution screen 520, the email application execution screen 530, the file application execution screen 540, and/or the gallery application execution screen 550). Referring to FIG. 24B, according to an embodiment of the disclosure, the wearable device 100 may detect that a swipe gesture for the external electronic device (e.g., the second external electronic device 2420) is input. According to an embodiment of the disclosure, the wearable device 100 may detect that a swipe gesture for the external electronic device (e.g., the second external electronic device 2420) is input based on the image obtained by the camera of the wearable device 100. Alternatively, according to an embodiment of the disclosure, the wearable device 100 may receive a signal indicating that the swipe gesture is input through the network, from the external electronic device (e.g., the second external electronic device 2420). According to an embodiment of the disclosure, the wearable device 100 may detect that the swipe gesture for the external electronic device (e.g., the second external electronic device 2420) is input based on the signal indicating that the swipe gesture is input.

According to an embodiment of the disclosure, in operation 2330, the wearable device 100 may provide the application execution screen, being displayed on the external electronic device (e.g., the second external electronic device 2420), to belong to the same group as the at least one grouped application execution screen. Referring to FIG. 24C, according to an embodiment of the disclosure, the wearable device 100 may control the display module 150 to include and show, in the same slate, the virtual object 2450 corresponding to the application execution screen (e.g., the calendar application execution screen 2422) being displayed on the external electronic device (e.g., the second external electronic device 2420). According to an embodiment of the disclosure, when the specific application (e.g., calendar application) is not installed on the wearable device 100, the wearable device 100 may receive data for the specific application from the external electronic device (e.g., the second external electronic device 2420) and install the specific application and then control the display module 150 to show the virtual object 2450 corresponding to the application execution screen (e.g., the calendar application execution screen 2422) being displayed on the external electronic device (e.g., the second external electronic device 2420).

Figure 25:
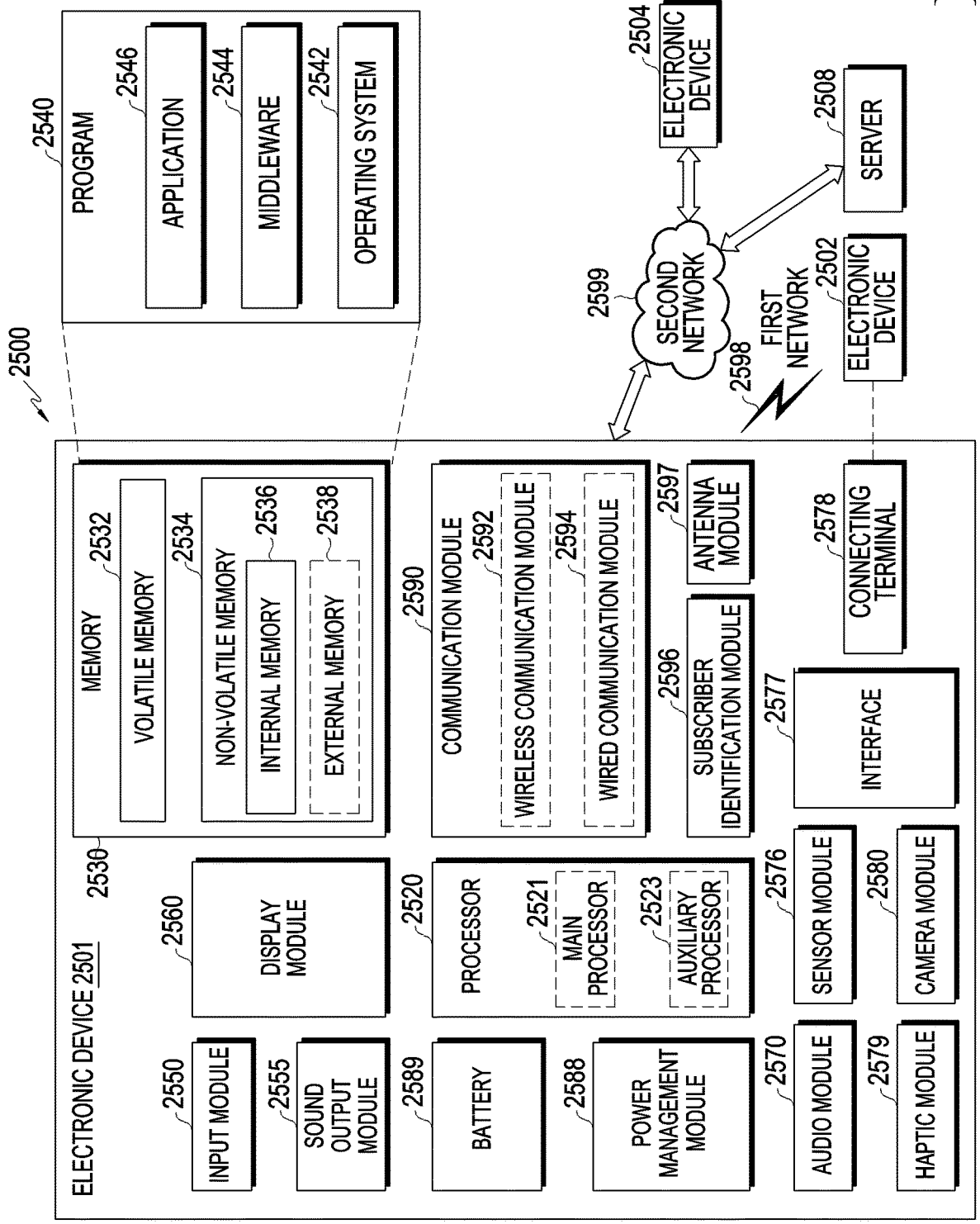
FIG. 25 is a block diagram illustrating an electronic device in a network environment according to an embodiment of the disclosure.

FIG. 25 is a block diagram illustrating an electronic device in a network environment according to an embodiment of the disclosure.

Referring to FIG. 25, an electronic device 2501 in a network environment 2500 may communicate with at least one of an external electronic device 2502 via a first network 2598 (e.g., a short-range wireless communication network), or an external electronic device 2504 or a server 2508 via a second network 2599 (e.g., a long-range wireless communication network). According to an embodiment of the disclosure, the electronic device 2501 may communicate with the external electronic device 2504 via the server 2508. According to an embodiment of the disclosure, the electronic device 2501 may include a processor 2520, a memory 2530, an input module a, a sound output module 2555, a display module 2560, an audio module 2570, a sensor module 2576, an interface 2577, a connecting terminal 2578, a haptic module 2579, a camera module 2580, a power management module 2588, a battery 2589, a communication module 2590, a subscriber identification module (SIM) 2596, or an antenna module 2597. In some embodiments of the disclosure, at least one (e.g., the connecting terminal 2578) of the components may be omitted from the electronic device 2501, or one or more other components may be added in the electronic device 101. According to an embodiment of the disclosure, some (e.g., the sensor module 2576, the camera module 2580, or the antenna module 2597) of the components may be integrated into a single component (e.g., the display module 2560).

The processor 2520 may execute, for example, software (e.g., a program 2540) to control at least one other component (e.g., a hardware or software component) of the electronic device 2501 coupled with the processor 2520, and may perform various data processing or computation.

According to one embodiment of the disclosure, as at least part of the data processing or computation, the processor 2520 may store a command or data received from another component (e.g., the sensor module 2576 or the communication module 2590) in a volatile memory 2532, process the command or the data stored in the volatile memory 2532, and store resulting data in a non-volatile memory 2534. According to an embodiment of the disclosure, the processor 2520 may include a main processor 2521 (e.g., a central processing unit (CPU) or an application processor (AP)), or an auxiliary processor 2523 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 2501 includes the main processor 2521 and the auxiliary processor 2523, the auxiliary processor 2523 may be configured to use lower power than the main processor 2521 or to be specified for a designated function. The auxiliary processor 2523 may be implemented as separate from, or as part of the main processor 2521.

The auxiliary processor 2523 may control at least some of functions or states related to at least one component (e.g., the display module 2560, the sensor module 2576, or the communication module 2590) among the components of the electronic device 2501, instead of the main processor 2521 while the main processor 2521 is in an inactive (e.g., sleep) state, or together with the main processor 2521 while the main processor 2521 is in an active state (e.g., executing an application). According to an embodiment of the disclosure, the auxiliary processor 2523 (e.g., an image signal processor or a communication processor) may be implemented as part of another component (e.g., the camera module 2580 or the communication module 2590) functionally related to the auxiliary processor 123. According to an embodiment of the disclosure, the auxiliary processor 2523 (e.g., the neural processing unit) may include a hardware structure specified for artificial intelligence model processing. The artificial intelligence model may be generated via machine learning. Such learning may be performed, e.g., by the electronic device 2501 where the artificial intelligence is performed or via a separate server (e.g., the server 2508). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 2530 may store various data used by at least one component (e.g., the processor 2520 or the sensor module 2576) of the electronic device 2501. The various data may include, for example, software (e.g., the program 2540) and input data or output data for a command related thereto. The memory 2530 may include the volatile memory 2532 or the non-volatile memory 2534. The non-volatile memory 2534 includes an internal memory 2536 and an external memory 2538.

The program 2540 may be stored in the memory 2530 as software, and may include, for example, an operating system (OS) 2542, middleware 2544, or an application 2546.

The input module 2550 may receive a command or data to be used by other component (e.g., the processor 2520) of the electronic device 2501, from the outside (e.g., a user) of the electronic device 2501. The input module 2550 may include, for example, a microphone, a mouse, a keyboard, keys (e.g., buttons), or a digital pen (e.g., a stylus pen).

The sound output module 2555 may output sound signals to the outside of the electronic device 2501. The sound output module 2555 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 2560 may visually provide information to the outside (e.g., a user) of the electronic device 2501. The display 2560 may include, for example, a display, a hologram device, or a projector and control circuitry to control a corresponding one of the display, hologram device, and projector. According to an embodiment of the disclosure, the display 2560 may include a touch sensor configured to detect a touch, or a pressure sensor configured to measure the intensity of a force generated by the touch.

The audio module 2570 may convert a sound into an electrical signal and vice versa. According to an embodiment of the disclosure, the audio module 2570 may obtain the sound via the input module 2550, or output the sound via the sound output module 2555 or a headphone of an external electronic device (e.g., the external electronic device 2502) directly (e.g., wiredly) or wirelessly coupled with the electronic device 2501.

The sensor module 2576 may detect an operational state (e.g., power or temperature) of the electronic device 2501 or an environmental state (e.g., a state of a user) external to the electronic device 101, and then generate an electrical signal or data value corresponding to the detected state. According to an embodiment of the disclosure, the sensor module 2576 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 2577 may support one or more specified protocols to be used for the electronic device 2501 to be coupled with the external electronic device (e.g., the external electronic device 2502) directly (e.g., wiredly) or wirelessly. According to an embodiment of the disclosure, the interface 2577 may include, for example, a high definition multimedia interface (HDMI), a universal serial bus (USB) interface, a secure digital (SD) card interface, or an audio interface.

A connecting terminal 2578 may include a connector via which the electronic device 2501 may be physically connected with the external electronic device (e.g., the external electronic device 2502). According to an embodiment of the disclosure, the connecting terminal 2578 may include, for example, a HDMI connector, a USB connector, an SD card connector, or an audio connector (e.g., a headphone connector).

The haptic module 2579 may convert an electrical signal into a mechanical stimulus (e.g., a vibration or motion) or electrical stimulus which may be recognized by a user via his tactile sensation or kinesthetic sensation. According to an embodiment of the disclosure, the haptic module 2579 may include, for example, a motor, a piezoelectric element, or an electric stimulator.

The camera module 2580 may capture a still image or moving images. According to an embodiment of the disclosure, the camera module 2580 may include one or more lenses, image sensors, image signal processors, or flashes.

The power management module 2588 may manage power supplied to the electronic device 2501. According to one embodiment of the disclosure, the power management module 2588 may be implemented as at least part of, for example, a power management integrated circuit (PMIC).

The battery 2589 may supply power to at least one component of the electronic device 2501. According to an embodiment of the disclosure, the battery 2589 may include, for example, a primary cell which is not rechargeable, a secondary cell which is rechargeable, or a fuel cell.

The communication module 2590 may support establishing a direct (e.g., wired) communication channel or a wireless communication channel between the electronic device 2501 and the external electronic device (e.g., the external electronic device 2502, the external electronic device 2504, or the server 2508) and performing communication via the established communication channel. The communication module 2590 may include one or more communication processors that are operable independently from the processor 2520 (e.g., the application processor (AP)) and supports a direct (e.g., wired) communication or a wireless communication. According to an embodiment of the disclosure, the communication module 2590 may include a wireless communication module 2592 (e.g., a cellular communication module, a short-range wireless communication module, or a global navigation satellite system (GNSS) communication module) or a wired communication module 2594 (e.g., a local area network (LAN) communication module or a power line communication (PLC) module). A corresponding one of these communication modules may communicate with the external electronic device 2504 via a first network 2598 (e.g., a short-range communication network, such as Bluetooth™, wireless-fidelity (Wi-Fi) direct, or infrared data association (IrDA)) or a second network 2599 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 2592 may identify or authenticate the electronic device 2501 in a communication network, such as the first network 2598 or the second network 2599, using subscriber information (e.g., international mobile subscriber identity (IMSI)) stored in the subscriber identification module 2596.

The wireless communication module 2592 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 2592 may support a high-frequency band (e.g., the mmWave band) to achieve, e.g., a high data transmission rate. The wireless communication module 2592 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 2592 may support various requirements specified in the electronic device 2501, an external electronic device (e.g., the external electronic device 2504), or a network system (e.g., the second network 2599). According to an embodiment of the disclosure, the wireless communication module 2592 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 2597 may transmit or receive a signal or power to or from the outside (e.g., the external electronic device). According to an embodiment of the disclosure, the antenna module 2597 may include one antenna including a radiator formed of a conductor or conductive pattern formed on a substrate (e.g., a printed circuit board (PCB)). According to an embodiment of the disclosure, the antenna module 2597 may include a plurality of antennas (e.g., an antenna array). In this case, at least one antenna appropriate for a communication scheme used in a communication network, such as the first network 2598 or the second network 2599, may be selected from the plurality of antennas by, e.g., the communication module 2590. The signal or the power may then be transmitted or received between the communication module 2590 and the external electronic device via the selected at least one antenna. According to an embodiment of the disclosure, other parts (e.g., radio frequency integrated circuit (RFIC)) than the radiator may be further formed as part of the antenna module 2597.

According to various embodiments of the disclosure, the antenna module 2597 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 2501 and the external electronic device 2504 via the server 2508 coupled with the second network 2599. The external electronic devices 2502 or 2504 each may be a device of the same or a different type from the electronic device 2501. According to an embodiment of the disclosure, all or some of operations to be executed at the electronic device 2501 may be executed at one or more of the external electronic devices 2502, 2504, or 2508. For example, if the electronic device 2501 should perform a function or a service automatically, or in response to a request from a user or another device, the electronic device 2501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 2501. The electronic device 2501 may provide the outcome, with or without further processing of the outcome, as at least part of a reply to the request. To that end, a cloud computing, distributed computing, mobile edge computing (MEC), or client-server computing technology may be used, for example. The electronic device 2501 may provide ultra low-latency services using, e.g., distributed computing or mobile edge computing. In another embodiment of the disclosure, the external electronic device 2504 may include an Internet-of-things (IoT) device. The server 2508 may be an intelligent server using machine learning and/or a neural network. According to an embodiment of the disclosure, the external electronic device 2504 or the server 2508 may be included in the second network 2599. The electronic device 2501 may be applied to intelligent services (e.g., smart home, smart city, smart car, or health-care) based on 5G communication technology or IoT-related technology.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program products may be traded as commodities between sellers and buyers. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment of the disclosure, each component (e.g., a module or a program) of the above-described components may include a single entity or multiple entities. Some of the plurality of entities may be separately disposed in different components. According to an embodiment of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to an embodiment of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A wearable device comprising:
   memory storing one or more computer programs;
   a display; and
   one or more processors communicatively coupled to the memory and the display;
   wherein the one or more computer programs include computer-executable instructions that, when executed by the one or more processors individually or collectively, cause the wearable device to:

control the display to display a first execution screen of a first application and a first handler as a virtual object, detect a first user input for executing a second application in a state in which the first execution screen of the first application is displayed as the virtual object, based on identifying that a user's gaze of the wearable device is directed to the first execution screen, identify that a second user input is detected for requesting to display a second execution screen of the second application as being included in a same group as the first execution screen of the first application, based on identifying that the second user input is detected, control the display to display the first execution screen and the second execution screen by grouping the first execution screen and the second execution screen into a first region, detect that an execution screen insertion request is obtained through an external electronic device while the first execution screen and the second execution screen are displayed to be included in the same group, and based on the execution screen insertion request, display an execution screen of an application being displayed on the external electronic device to be included in the same group.

2. The wearable device of claim 1, wherein a visual element corresponding to the second execution screen of the second application is spatially separated from the first execution screen of the first application and is displayed.

3. The wearable device of claim 1, wherein a visual element for executing the first application is spatially separated from the first execution screen of the first application and is displayed.

4. The wearable device of claim 1, wherein a visual element corresponding to the first execution screen of the first application and a visual element corresponding to the second execution screen of the second application included in the same group are displayed while forming one group.

5. The wearable device of claim 1, further comprising: communication circuitry,
wherein the one or more computer programs further include computer-executable instructions that, when executed by the one or more processors individually or collectively, cause the wearable device to:
transmit, through the communication circuitry to the external electronic device operably connected with the wearable device, information about the first execution screen and the second execution screen to instruct the external electronic device to display a plurality of visual elements in which at least one of the plurality of visual elements indicates the first execution screen and the second execution screen as being included in the same group.

6. The wearable device of claim 1, wherein the one or more computer programs further include computer-executable instructions that, when executed by the one or more processors individually or collectively, cause the wearable device to:
control the display to display at least one application execution screen through the wearable device and display a visual element for providing information about an application running on the external electronic device operably connected with the wearable device.

7. The wearable device of claim 1, wherein the one or more computer programs further include computer-executable instructions that, when executed by the one or more processors individually or collectively, cause the wearable device to:
provide a predesignated visual effect around a visual element corresponding to an execution screen of a specific application being viewed by a user, based on a direction of the user's gaze.

8. The wearable device of claim 1, wherein the one or more computer programs further include computer-executable instructions that, when executed by the one or more processors individually or collectively, cause the wearable device to:
control the display to display the first execution screen and the second execution screen in the same group upon detecting that the first execution screen and the second execution screen overlap each other according to a user input while the first execution screen and the second execution screen are displayed independently from each other.

9. A method performed by a wearable device, the method comprising:
controlling, by the wearable device, a display of the wearable device to display a first execution screen of a first application and a first handler as a virtual object;
detecting, by the wearable device, a first user input for executing a second application in a state in which the first execution screen of the first application is displayed as the virtual object;
based on identifying that a user's gaze of the wearable device is directed to the first execution screen, identifying, by the wearable device, that a second user input is detected for requesting to display a second execution screen of the second application as being included in a same group as the first execution screen of the first application;
based on identifying that the second user input is detected, controlling, by the wearable device, the display to display the first execution screen and the second execution screen by grouping the first execution screen and the second execution screen into a first region, wherein a second handler different from the first handler is displayed outside of the first region;
detecting, by the wearable device, a third user input with respect to the second handler while the first execution screen and the second execution screen are grouped and displayed;
based on the third user input, controlling, by the wearable device, the first execution screen and the second execution screen to be terminated together;
detecting, by the wearable device, that an execution screen insertion request is obtained through an external electronic device while the first execution screen and the second execution screen are displayed to be included in the same group; and
based on the execution screen insertion request, displaying, by the wearable device, an execution screen of an application being displayed on the external electronic device to be included in the same group.

10. The method of claim 9, wherein a visual element corresponding to the second execution screen of the second application is spatially separated from the first execution screen of the first application and is displayed.

11. The method of claim 9, wherein a visual element for executing the first application is spatially separated from the first execution screen of the first application and is displayed.

12. The method of claim 9, wherein a visual element corresponding to the first execution screen of the first application and a visual element corresponding to the second execution screen of the second application included in the same group are displayed while forming one group.

13. The method of claim 9,
wherein the wearable device includes communication circuitry, and
wherein the method further comprises:
  transmitting, by the wearable device through the communication circuitry to the external electronic device operably connected with the wearable device, information about the first execution screen and the second execution screen to instruct the external electronic device to display a plurality of visual elements in which at least one of the plurality of visual elements indicates the first execution screen and the second execution screen as being included in the same group.

14. The method of claim 9, further comprising:
controlling, by the wearable device, the display to display at least one application execution screen through the wearable device; and
controlling, by the wearable device, the display to display a visual element for providing information about an application running on the external electronic device operably connected with the wearable device.

15. The method of claim 9, further comprising:
providing, by the wearable device, a predesignated visual effect around a visual element corresponding to an execution screen of a specific application being viewed by a user, based on a direction of the user's gaze.

16. The method of claim 9, further comprising:
controlling, by the wearable device, the display to display the first execution screen and the second execution screen in the same group upon detecting that the first execution screen and the second execution screen overlap each other according to a user input while the first execution screen and the second execution screen are displayed independently from each other.

* * * * *